US006741649B1

United States Patent
Ishiyama et al.

(10) Patent No.: US 6,741,649 B1
(45) Date of Patent: May 25, 2004

(54) CODING APPARATUS FOR AUDIO AND PICTURE SIGNALS

(75) Inventors: Kiyoshi Ishiyama, Tokyo (JP); Hidenobu Harasaki, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/497,544

(22) Filed: Feb. 3, 2000

(30) Foreign Application Priority Data

Feb. 10, 1999 (JP) ............................................. 10-032789

(51) Int. Cl.⁷ ...................... H04N 7/12; H04N 11/04; H04N 11/02
(52) U.S. Cl. .................... 375/240.12; 375/240.05; 375/240.28; 370/465
(58) Field of Search .................. 375/240.05, 240.12, 375/240.28; 370/465

(56) References Cited

U.S. PATENT DOCUMENTS

| 5,617,145 A | * | 4/1997 | Huang et al. ............. 348/423.1 |
| 5,751,356 A | * | 5/1998 | Suzuki .................. 375/240.01 |
| 5,929,921 A | * | 7/1999 | Taniguchi et al. ........... 348/484 |
| 6,002,687 A | * | 12/1999 | Magee et al. ............... 370/394 |
| 6,061,399 A | * | 5/2000 | Lyons et al. ................ 375/240 |
| 6,088,360 A | * | 7/2000 | Amaral et al. .............. 370/412 |
| 6,098,039 A | * | 8/2000 | Nishida ...................... 704/229 |
| 6,333,763 B1 | * | 12/2001 | Tanaka ........................ 348/484 |
| 6,373,855 B1 | * | 4/2002 | Downing et al. ........... 370/468 |
| 6,504,850 B1 | * | 1/2003 | Kato et al. .................. 370/465 |
| 6,584,125 B1 | * | 6/2003 | Katto ......................... 370/537 |

FOREIGN PATENT DOCUMENTS

| JP | 63-232589 | 9/1988 |
| JP | 63-252083 | 10/1988 |
| JP | 2-246431 | 10/1990 |
| JP | 6-216779 | 8/1994 |

* cited by examiner

*Primary Examiner*—Andy Rao
*Assistant Examiner*—Charles E Parsons
(74) *Attorney, Agent, or Firm*—Dickstein, Shapiro, Morin & Oshinsky, LLP

(57) ABSTRACT

To improve qualities of audio and picture signals by distributing adaptively the code quantities of audio codes and picture codes and by adopting variable rate audio coding. The audio/picture processing apparatus handles audio presence information, audio characteristics information, audio quality information, picture quality information, code quantity distribution information, and line capacity information. A code quantity control means decides the distribution of the audio and picture codes, an audio coding format, and a coding rate, whereby the audio signal and picture signal are coded by a picture encoder and an audio encoder. The outputs from the picture encoder and the audio encoder are multiplexed by a multiplexer in order to transmit a multiplexed bit stream onto the network.

64 Claims, 67 Drawing Sheets

CODING APPARATUS FOR AUDIO AND PICTURE SIGNALS

BACKGROUND OF THE INVENTION

1. Technical Field of the Invention

The present invention relates to a picture/audio coding apparatus wherein the coding is executed by determining a distribution of quantities of codes allocated to the picture and the audio signal.

2. Description of the Prior Art

Recently, multi-media communications have been developed greatly, wherein moving pictures are handled, as well as text data, audio data, and graphics data. For the multi-media communications, the integrated service digital network (ISDN) has been spread widely. Further, TV phone and TV conference are implemented, due to high speed modems in public switched telephone network (PSTN). Particularly, picture signal and audio signals are multiplexed for transmission in the TV phone system in the digital or analogue networks. The communication protocols and coding formats according to the kinds of communication networks are provided by the recommendations of ITU-T (International Telecommunication Union—Telecommunication Standardization Sector).

A block diagram of a conventional picture/audio encoding apparatus which is used in the ISDN, PSTN, and mobile communication networks is shown in FIG. 66. As shown in FIG. 66, picture encoder 1 encodes inputted picture signal according to the variable length coding formats such as H.261 or H.263 provided by the ITU-T recommendations, in order to output the coded picture signal toward buffer 2. Audio encoder 3 encodes inputted audio signal according to the formats such as AD-PCM ( adaptive-differential pulse code modulation) or CELP (code-exited linear predictive coding), in order to output the coded audio signal toward buffer 4. Buffer 2 stores temporarily the coded picture signal from picture encoder 1 and then outputs them toward multiplexer 5, while buffer 4 stores temporarily the coded audio signal from audio encoder 3 and then outputs them toward multiplexer 5. Finally, multiplexer 5 mutiplexes the coded picture signal outputted from buffer 2 and the coded audio signal outputted from buffer 4, in order to output the combined bit stream onto a non-shown transmission channel. Picture encoder 1 monitors the code quantity of in buffer 2 for controlling the code quantity generated in the encoding process in picture encoder 1.

A block diagram of a conventional picture/audio decoding apparatus is shown in FIG. 67. As shown in FIG. 67, demultiplexer 6 separates the combined bit stream from picture/audio encoder 1 and then outputs the coded picture signal toward buffer 7 and the coded audio signal toward buffer 9. Buffer 7 stores temporarily the coded picture signal from demultiplexer 6 and then outputs it toward picture decoder 8, while buffer 9 stores temporarily the coded audio signal from demultiplexer 6 and then outputs it toward audio decoder 10.

The data transmission rate of the combined bit stream outputted from the encoder as shown in FIG. 66 and inputted toward the decoder as shown in FIG. 67 is decided by that of the transmission lines which is employed.

The data transmission rate of the combined data stream is fixed, for example, to 64 kbits/sec in ISDN and 56 kbits/sec in PSTN.

Although variable rate is obtainable in the Internet or ATM (asynchronous transfer mode), the fixed rate is preferable.

It is of importance to distribute the quantity of information or the code quantity for the picture information and audio information, when the fixed rate is employed.

Conventionally, the rate for audio signal is fixed at first, and then the rate for picture signal is fixed.

JP 6-216779 A (1994) discloses a code distribution system, wherein audio encoder notifies the picture buffer of the presence of audio signal. Therefore, when the audio signal is absent, the code quantity allocated to the audio signal is re-allocated to the picture signal, whereby it is avoided that silent audio signal is transmitted in vain, and the quality of picture is improved by the re-allocation.

JP 2-246431 A (1990) discloses a coding and transmission system for audio and visual information, wherein the transmission bandwidth is distributed, according to the presence or absence of the audio signal. Concretely, a clock signal for the bandwidth distribution is generated. The receiver side demultiplexes the audio-visual signal on the basis of the clock.

JP 63-252083 A (1988) discloses a time slot multiplexing system, wherein inputted level of audio data is always monitored in order to utilize the audio presence information which is multiplexed on prescribed time slot. When the audio signal is present, the audio signal and visual signal are multiplexed on the time slots for each signal. On the contrary, when the audio signal is absent, visual signal is multiplexed on the time slot which is once allocated for audio signal.

These three Japanese patent applications relate to a deprivation of the bandwidth for audio signal in case of the absence of audio signal, whereby the picture quality is improved, in place of transmitting silent audio information.

However, the conventional prior art as explained above have a disadvantage that only the fixed length coding is employed for the audio signal. Although it is detected only whether or not audio signal is present in case of the fixed length coding, a variation in the code quantity as well as the presence of audio signal should be taken into account, when the variable length coding is employed.

Further, the conventional prior art has a disadvantage that the quality of audio signal is neglected, because the audio quality varies, even when the code quantity is fixed the fixed length coding system.

Further, the conventional prior art has a disadvantage that the audio quality is apt to be degraded greatly, because the coding format is the same, regardless of the kinds of audio signal such as human voice or music. Therefore, a plurality of coding formats are required.

Further, the conventional prior art has a disadvantage that the picture quality varies, because the allocated code quantity for visual signal is the same every frame. Actually, the code quantity is increased, when picture movements are very active or scenes change very often.

Further, the conventional prior art has a disadvantage that degree of freedom for controlling the qualities of audio/visual signal is strictly restricted, because the code distribution is executed only by detecting the audio signal presence. Accordingly, visual priority control, audio priority control, or audio-visual minimum guarantee is not available.

SUMMARY OF THE INVENTION

Therefore, an object of the present invention is to distribute available signal codes adaptively under the variable rate coding, in order to improve the audio-visual quality.

The coding apparatus for picture and audio signals of the present invention comprises: a picture encoder for compressing and coding a picture signal; a rate control means for storing the picture signal coded by the picture encoder and for controlling a quantity of code of the picture signal; a frequency conversion means for converting a samplimg frequency of an audio signal; an audio encoder for compressing and coding the audio signal of which sampling frequency is converted by the frequency conversion means; a code quantity control means for executing a distribution of a quantity of code to the picture signal coded by the picture encoder and the audio signal coded by the audio encoder; and a multiplexer for multiplexing the picture signal coded by the picture encoder and the audio signal coded by the audio encoder. The code quantity control means outputs a result of the distribution toward the rate control means, the frequency conversion means and the audio encoder.

According to the present invention, the variable length audio signal coding which is not adopted by the conventional picture/audio coding equipment becomes available, whereby audio signals can be processed under variable rates.

Concretely, coding formats and coding rates suitable for the kinds of audioignals can be selected.

Further, picture qualities can be maintained by changing the distribution of codes for audio and pictures.

Audio qualities also can be maintained by changing the distribution of codes for audio and pictures.

Therefore, qualities of audio and pictures are controlled adaptively by changing the distribution of codes for audio and pictures.

PREFERRED EMBODIMENT OF THE INVENTION

Figure 1:
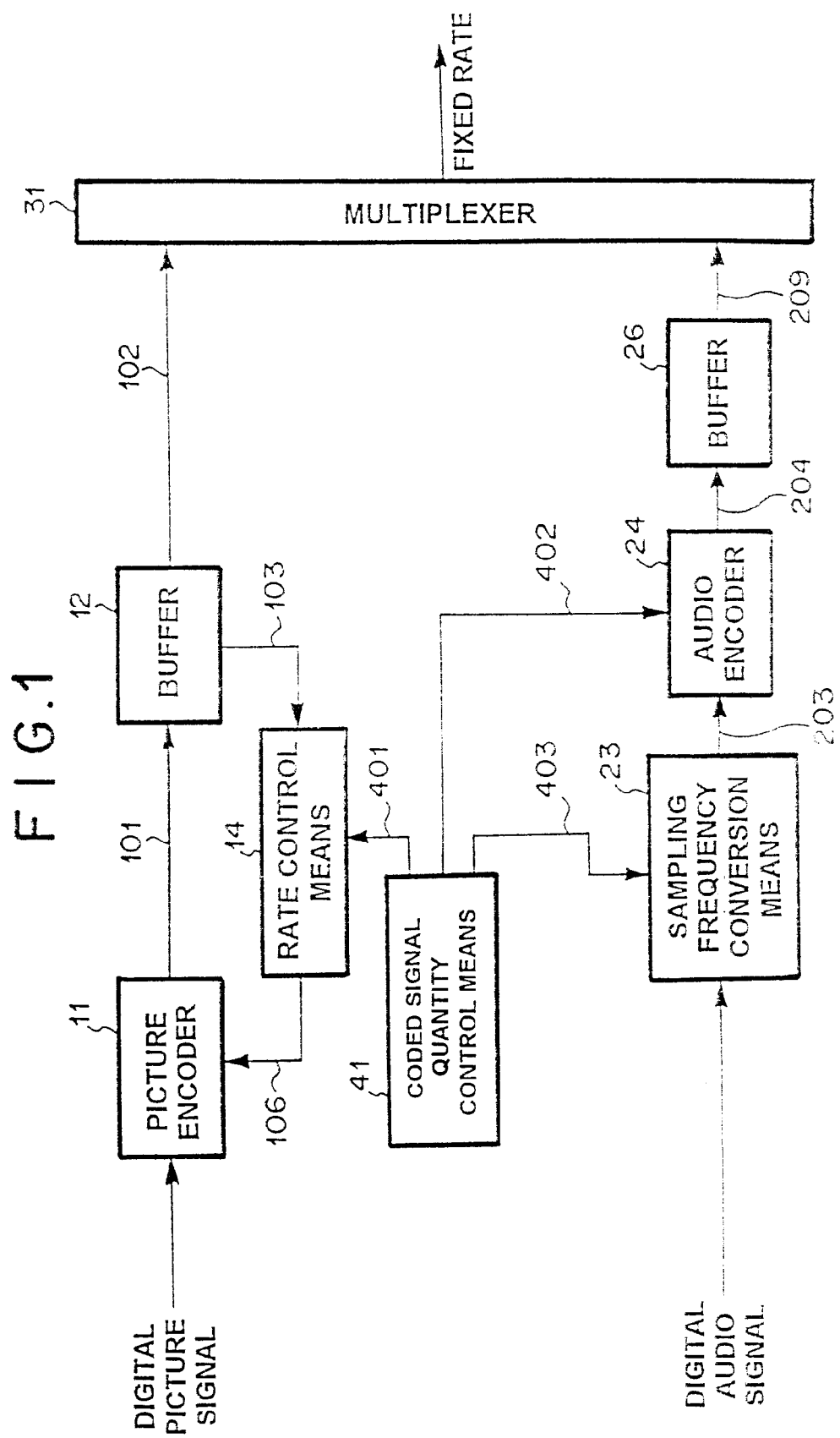
FIG. 1 is a block diagram of 1st mode of embodiment of the picture/audio coding apparatus of the present invention.

Modes of embodiment of the present invention is explained, referring to the drawings.

A 1st embodiment is shown in FIG. 1. The audio-picture coding apparatus as shown in FIG. 1 comprises picture encoder 11, buffer 12, rate control means 14, sampling frequency conversion means 23, audio encoder 24, buffer 26, multiplexer 31, and coded signal quantity control means 41.

Coded signal quantity control means 41 decides the distribution of the audio and picture signal, then outputs sampling frequency information 403 toward sampling frequency conversion means 23, and outputs coded picture signal quantity information 401 toward rate control means 14.

Picture encoder 11 encodes the inputted picture signal on the basis of the variable length coding format, and then outputs coded picture signal 101 toward buffer 12, and controls the generated code quantity on the basis of generated coded picture signal quantity information 106 which is outputted from rate control means 14.

Buffer 12 outputs the stored picture as coded picture signal 102 toward multiplexer 31.

Rate control means 14 decides the code quantity to be generated by picture code encoder 11 on the basis of data remainder 103 outputted from buffer 12 and coded picture signal quantity information 401 outputted from coded signal quantity control means 41, and outputs generated code quantity information 106 toward picture encoder 11.

Sampling frequency conversion means 23 converts the sampling frequency of the inputted audio signal on the basis of sampling frequency information 403 outputted from coded signal quantity control means 41, and outputs audio signal 203 toward audio encoder 24.

Audio encoder 24 encodes audio signal, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to to transmit a series of combined bit stream onto a non-shown communication channel.

Figure 2:
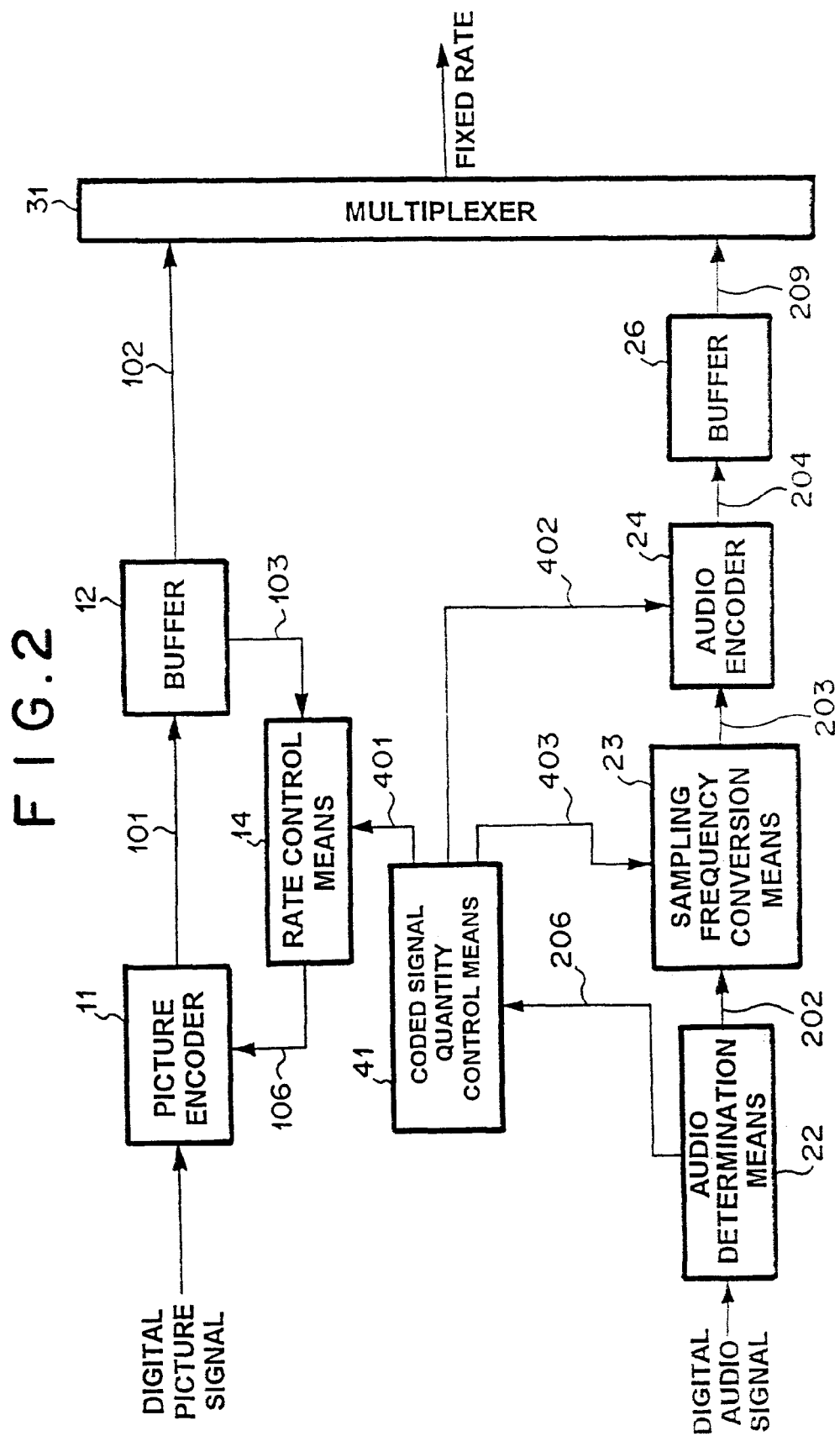
FIG. 2 is a block diagram of 2nd mode of embodiment of the picture/audio coding apparatus of the present invention.

A 2nd embodiment is shown in FIG. 2. The audio-picture coding apparatus as shown in FIG. 2 comprises picture encoder 11, buffer 12, rate control means 14, audio determination means 22, sampling frequency conversion means 23, audio encoder 24, buffer 26, multiplexer 31, and coded signal quantity control means 41.

Coded signal quantity control means 41 decides the distribution of the audio and picture signal on the basis of audio characteristics information 206 outputted from audio determination means 22, then outputs sampling frequency information 403 toward sampling frequency conversion means 23, and outputs coded picture signal quantity information 401 toward rate control means 14.

For example, when audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole quantity of code is limited adaptively within a prescribed bandwidth of the available transmission channel.

Picture encoder 11 encodes the inputted picture signal on the basis of the variable length coding format, and then outputs coded picture signal 101 toward buffer 12, and controls the generated code quantity on the basis of generated coded picture signal quantity information 106 which is outputted from rate control means 14.

Buffer 12 outputs the stored picture as coded picture signal 102 toward multiplexer 31.

Rate control means 14 decides the code quantity generated by picture code encoder 11 on the basis of data remainder 103 outputted from buffer 12 and coded picture signal quantity information 401, and outputs generated code quantity information 106 toward picture encoder 11.

Audio determination means 22 determines the characteristics of the inputted audio signal, and outputs audio characteristics information 206 toward coded signal quantity-control means 41.

Audio determination means 22 also outputs audio signal 202 as it is toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit streamo nto a non-shown communication channel.

Figure 3:
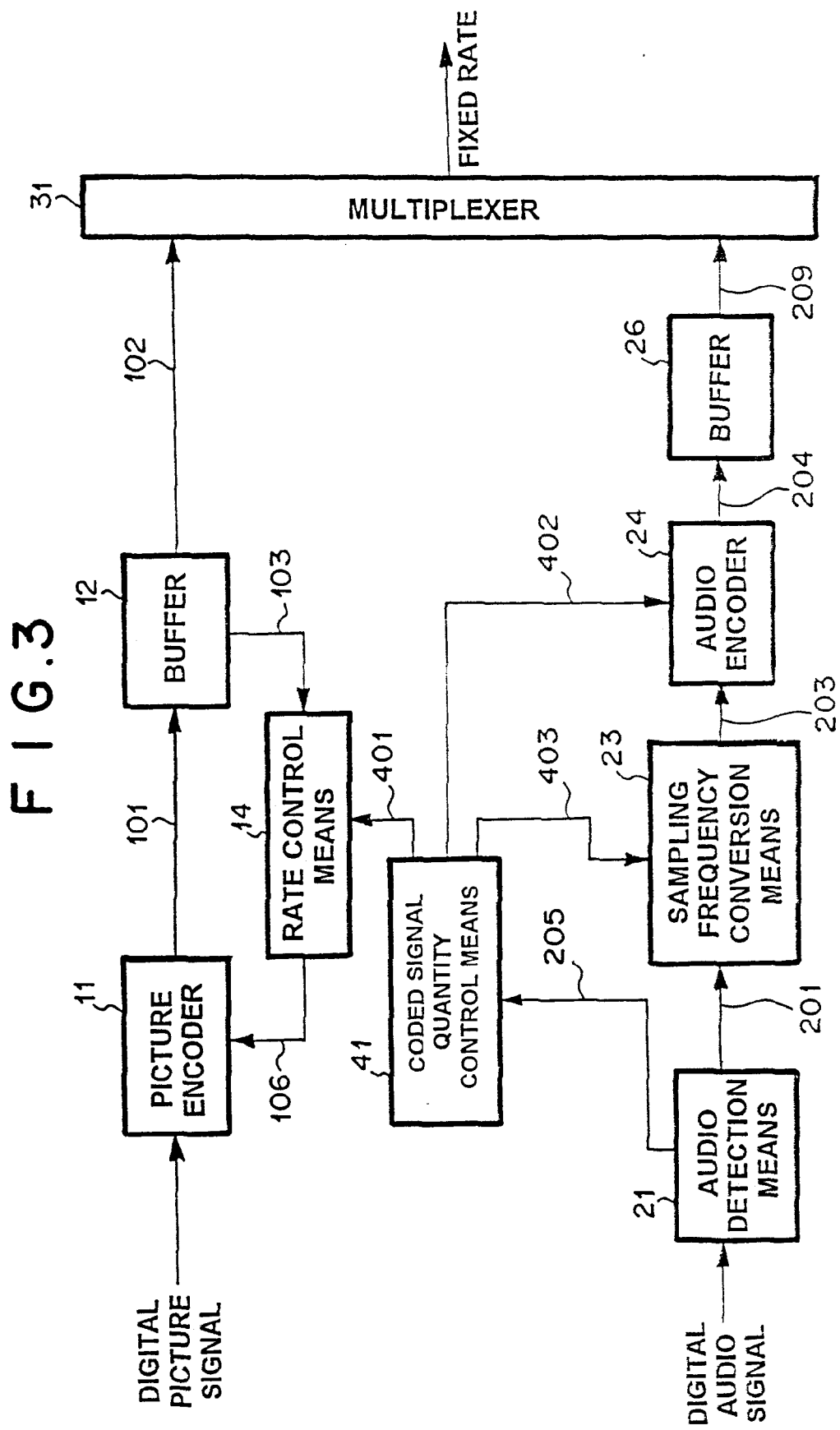
FIG. 3 is a block diagram of 3rd mode of embodiment of the picture/audio coding apparatus of the present invention.

A 3rd embodiment is shown in FIG. 3. The audio-picture coding apparatus as shown in FIG. 3 comprises picture encoder 11, buffer 12, rate control means 14, audio detection means 21, sampling frequency conversion means 23, audio encoder 24, buffer 26, multiplexer 31, and coded signal quantity control means 41.

Coded signal quantity control means 41 decides the distribution of the audio and picture signal on the basis of audio signal presence information 205 outputted from audio detection means 21, then outputs sampling frequency information 403 toward sampling frequency conversion means 23, and outputs coded picture signal quantity information 401 toward rate control means 14.

When audio signal presence information 205 indicates absence of audio signal, sampling frequency information 403 and coded audio signal quantity information 402 for stopping calculations are fed into sampling frequency conversion means 23 and audio code encoder 24, respectively.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the generated code quantity on the basis of generated coded picture signal quantity information 106 which is outputted from rate control means 14.

Buffer 12 outputs the stored picture as coded picture signal 102 toward multiplexer 31.

Rate control means 14 decides the code quantity generated by picture code encoder 11 on the basis of data remainder 103 outputted from buffer 12 and coded picture signal quantity information 401 outputted from coded signal quantity control means 41, and outputs generated code quantity information 106 toward picture encoder 11.

Audio detection means 21 detects presence or absence of audio signal, and outputs audio signal presence information 205 toward coded signal quantity control means 41.

Audio detection means 21 also outputs audio signal 201 as it is toward sampling frequency conversion means 23.

Sampling frequency conversion means 23 converts the sampling frequency of the inputted audio signal 201 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit streamo nto a non-shown communication channel.

Figure 4:
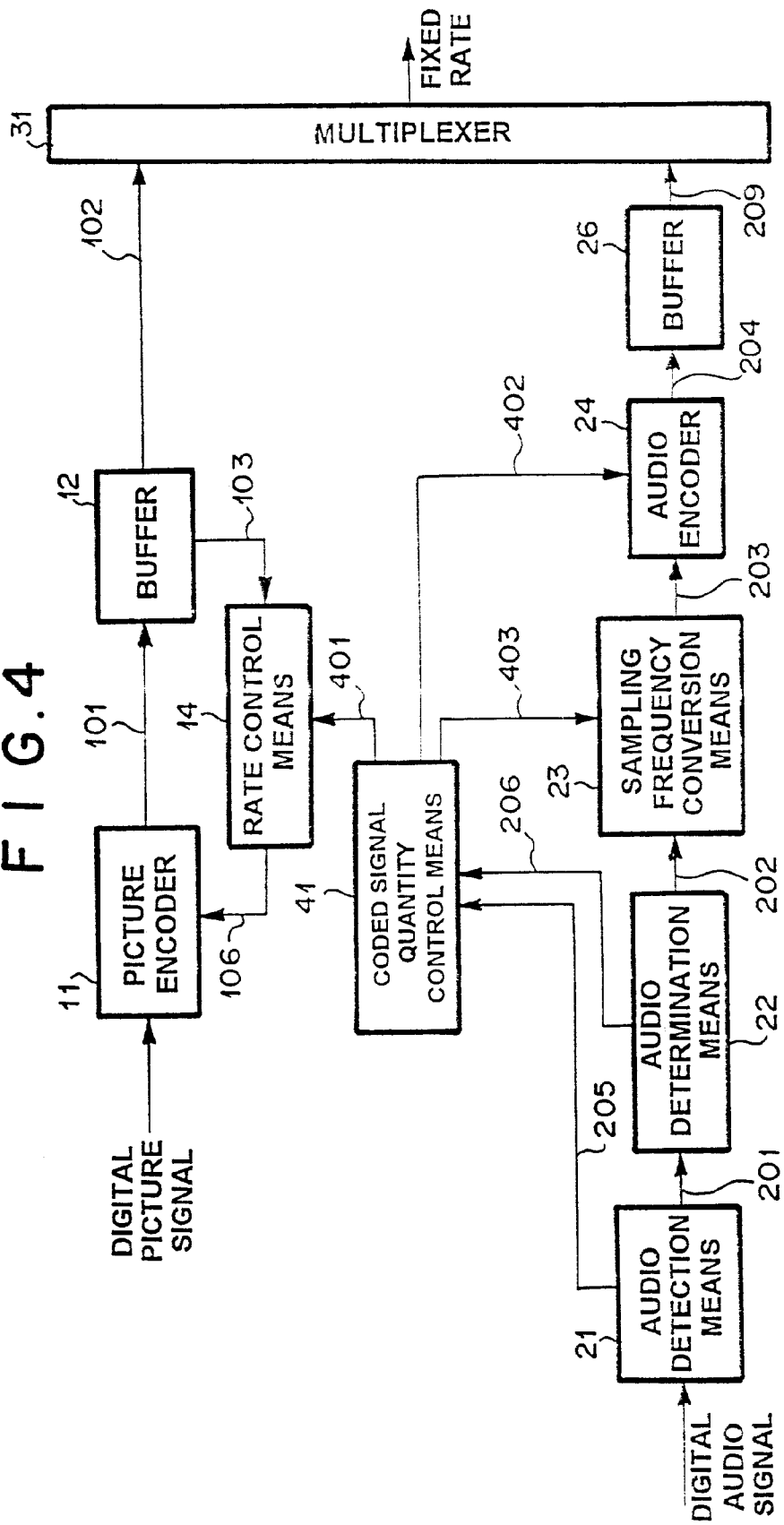
FIG. 4 is a block diagram of 4th mode of embodiment of the picture/audio coding apparatus of the present invention.

A 4th embodiment is shown in FIG. 4. The audio-picture coding apparatus as shown in FIG. 4 comprises picture encoder 11, buffer 12, rate control means 14, audio detection means 21, audio determination means 22, sampling frequency conversion means 23, audio encoder 24, buffer 26, multiplexer 31, and coded signal quantity control means 41.

Coded signal quantity control means 41 decides the distribution of the audio and picture signal on the basis of audio signal presence information 205 outputted from audio determination means 22 and audio characteristics information 206 outputted from audio determination means 22, then outputs sampling frequency information 403 toward sampling frequency conversion means 23, outputs coded audio signal quantity information 402 toward audio encoder 24, and outputs coded picture signal quantity information 401 toward rate control means 14.

Therefore, for example, when audio characteristics information 206 is human voice, a format and rate for coding suitable for the human voice are determined.

Further, for example, when audio characteristics information 206 is music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

Further, when audio signal presence information 206 indicates absence of audio signal, sampling frequency information 403 and coded audio signal quantity information 402 for stopping calculations are fed into sampling frequency conversion means 23 and audio code encoder 24, respectively.

Furthermore, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the generated code quantity on the basis of generated coded picture signal quantity information 106 which is outputted from rate control means 14.

Buffer 12 outputs the stored picture as coded picture signal 102 toward multiplexer 31.

Rate control means 14 decides the code quantity generated by picture code encoder 11 on the basis of data remainder 103 outputted from buffer 12 and coded picture signal quantity information 401, and outputs generated code quantity information 106 toward picture encoder 11.

Audio signal detection means 21 detects presence or absence of audio signal, and outputs audio signal presence information 205 toward coded signal quantity control means 41.

Audio detection means 21 also outputs audio signal 201 as it is toward sampling frequency conversion means 23.

Audio determination means 22 determines the characteristics of the inputted audio signal, and outputs audio characteristics information 206 toward coded signal quantity control means 41.

Audio determination means 22 also outputs audio signal 202 as it is toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit streamo nto a non-shown communication channel.

Figure 5:
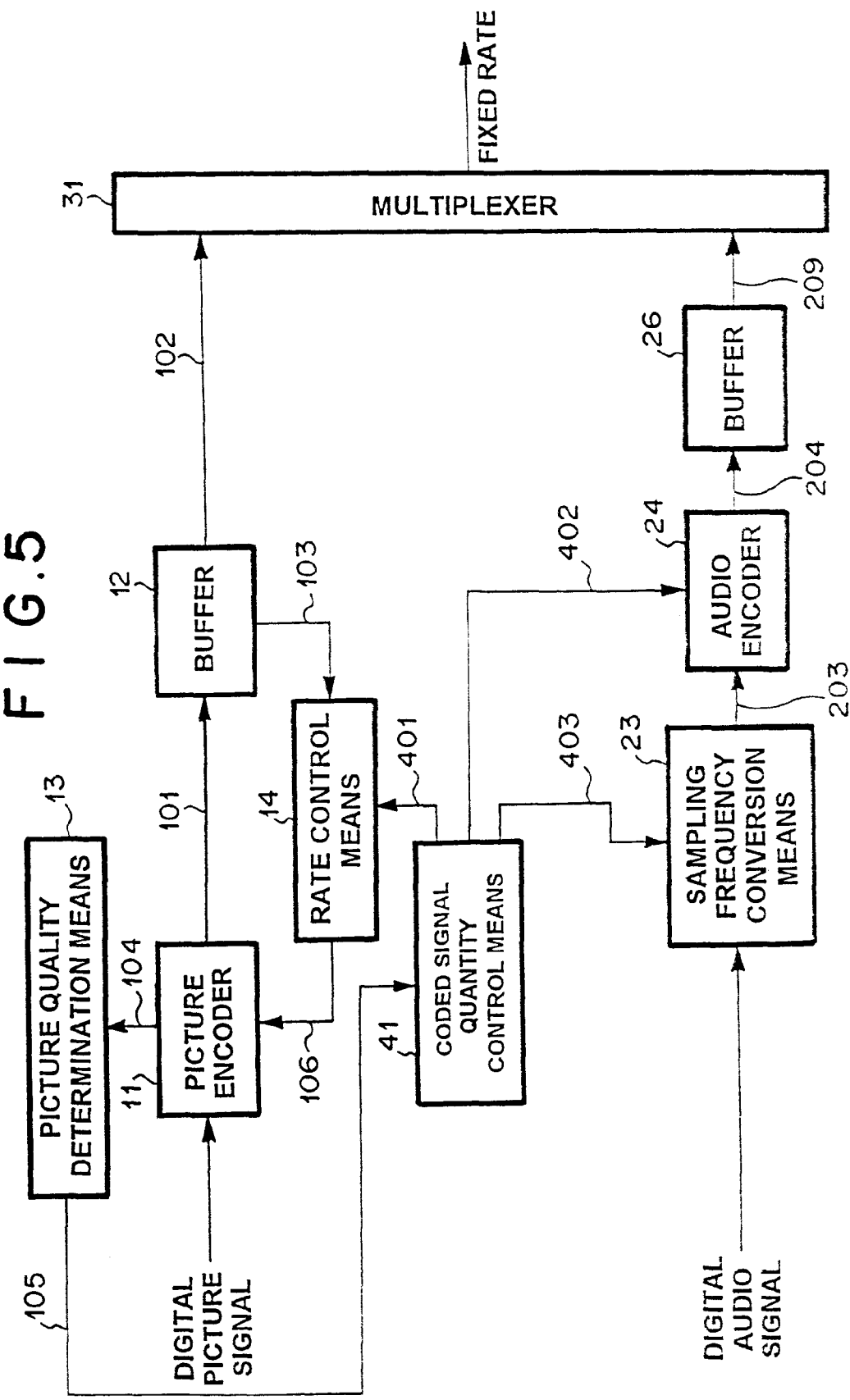
FIG. 5 is a block diagram of 5th mode of embodiment of the picture/audio coding apparatus of the present invention.

A 5th embodiment is shown in FIG. 5. The audio-picture coding apparatus as shown in FIG. 5 comprises picture encoder 11, buffer 12, picture quality determination means 13, rate control means 14, sampling frequency conversion means 23, audio encoder 24, buffer 26, multiplexer 31, and coded signal quantity control means 41.

Coded signal quantity control means 41 decides the distribution of the audio and picture signal on the basis of picture quality information 105 outputted from picture quality determination means 13, then outputs sampling frequency information 403 toward sampling frequency conversion means 23, outputs coded audio signal quantity information 402 toward rate control means audio encoder 24, and outputs coded picture signal quantity information 401 toward rate control means 14.

For example, when picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality is maintained.

Picture encoder 11 encodes the inputted picture signal on the basis of the variable length coding format, and then outputs coded picture signal 101 toward buffer 12, and controls the generated code quantity on the basis of generated coded picture signal quantity information 106 which is outputted from rate control means 14.

Picture encoder 11 also outputs picture quality information 104 toward picture quality determination means 13.

Buffer 12 outputs the stored picture as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity generated by picture code encoder 11 on the basis of data remainder 103 outputted from buffer 12 and coded picture signal quantity information 401 outputted from coded signal quantity control means 41, and outputs generated code quantity information 106 toward picture encoder 11.

Sampling frequency conversion means 23 converts the sampling frequency of the inputted audio signal on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 6:
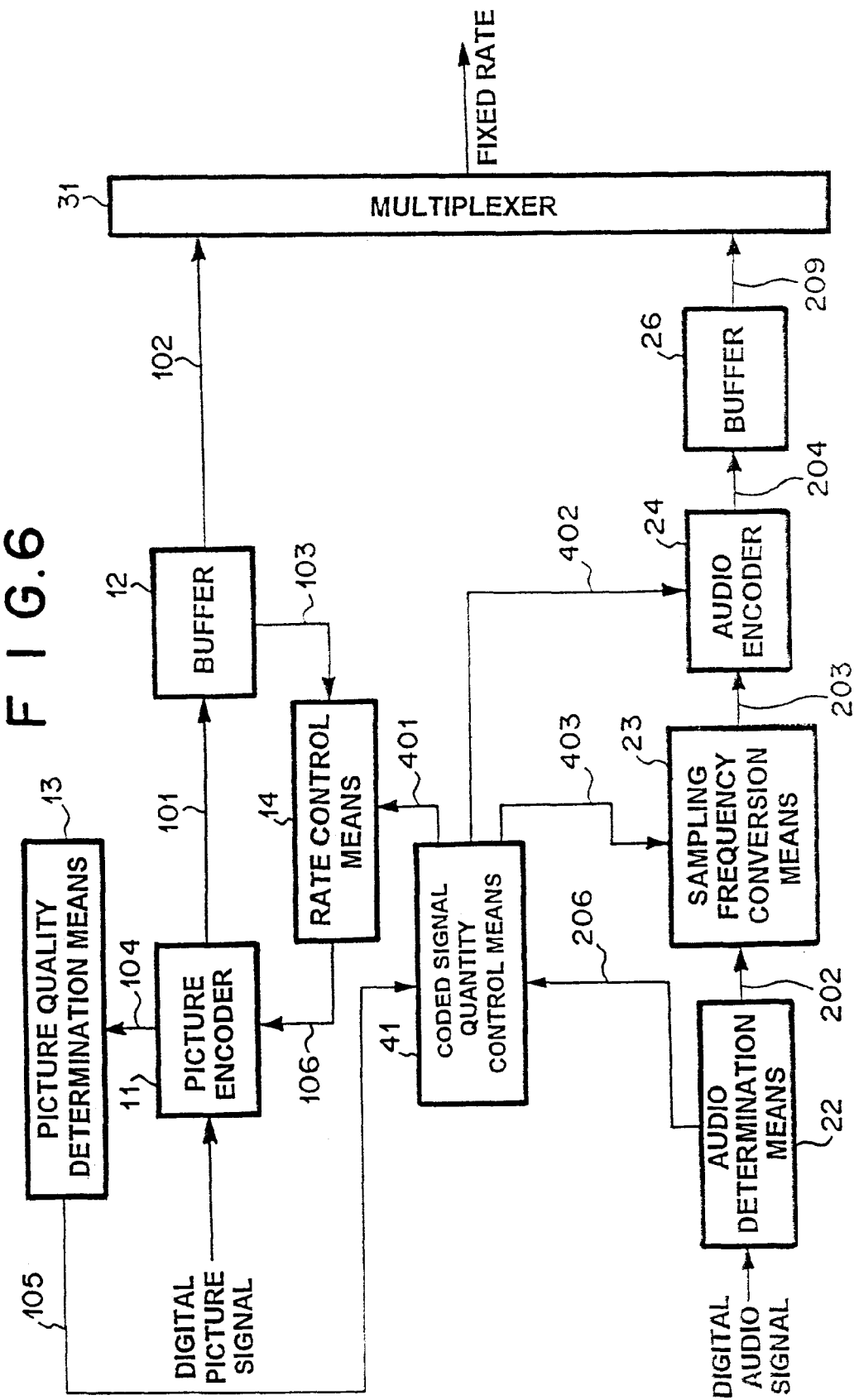
FIG. 6 is a block diagram of 6th mode of embodiment of the picture/audio coding apparatus of the present invention.

A 6th embodiment is shown in FIG. 6. The audio-picture coding apparatus as shown in FIG. 6 comprises picture encoder 11, buffer 12, picture quality determination means 13, rate control means 14, audio determination means 22, sampling frequency conversion means 23, audio encoder 24, buffer 26, multiplexer 31, and coded signal quantity control means 41.

Coded signal quantity control means 41 decides the distribution of the audio and picture signal on the basis of picture quality information 105 outputted from picture quality determination means 13 and audio characteristics information 206 outputted from audio determination means 22, then outputs sampling frequency information 403 toward sampling frequency conversion means 23, outputs coded audio signal quantity information 402 toward audio encoder 24, and outputs coded picture signal quantity information 401 toward rate control means 14.

For example, when audio characteristics information 206 is human voice, a format and rate for coding suitable for the human voice are determined.

Further, for example, when audio characteristics information 206 is music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively adaptively within a prescribed bandwidth of the available transmission channel.

Further, when picture quality information 105 indicates that the picture quality is degraded, the audio code quantity is decreased, and picture code quantity is increased. On the contrary, when picture quality information 105 indicates that the picture quality is good, the audio code quantity is increased, while picture code quantity is decreased without causing extreme degradation of picture quality.

Thus, the picture quality is maintained.

Picture encoder 11 encodes the inputted picture signal on the basis of the variable length coding format, and then outputs coded picture signal 101 toward buffer 12, and controls the generated code quantity on the basis of generated coded picture signal quantity information 106 which is outputted from rate control means 14.

Picture encoder 11 also outputs picture quality information 104 toward picture quality determination means 13.

Buffer 12 outputs the stored picture as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity generated by picture code encoder 11 on the basis of data remainder 103 outputted from buffer 12 and coded picture signal quantity information 401outputted from coded signal quantity control means 41, and outputs generated code quantity information 106 toward picture encoder 11.

Audio determination means 22 determines the characteristics of the inputted audio signal, and outputs audio characteristics information 206 toward coded signal quantity control means 41.

Audio determination means 22 also outputs audio signal 202 as it is toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit streamo nto a non-shown communication channel.

Figure 7:
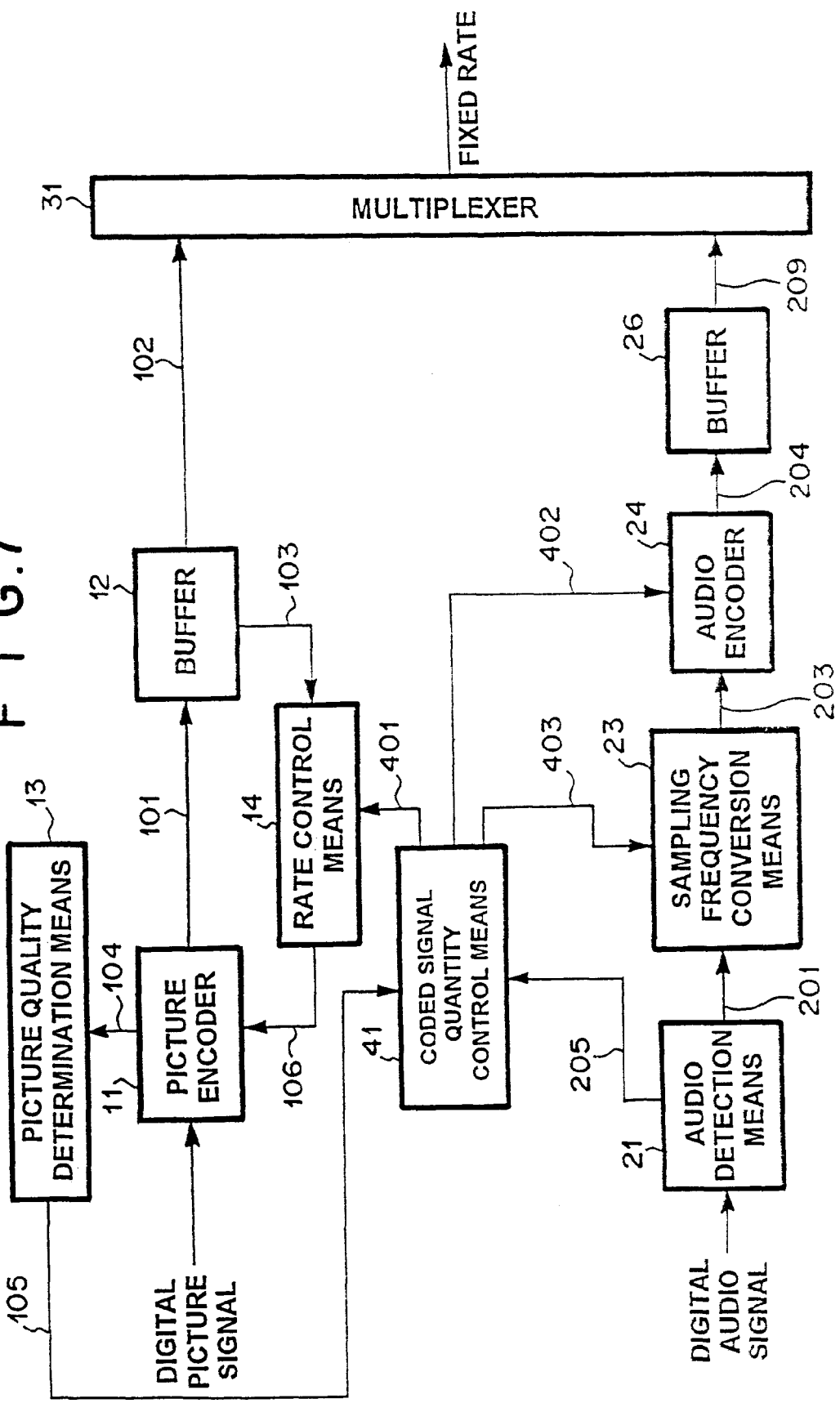
FIG. 7 is a block diagram of 7th mode of embodiment of the picture/audio coding apparatus of the present invention.

A 7th embodiment is shown in FIG. 7. The audio-picture coding apparatus as shown in FIG. 7 comprises picture encoder 11, buffer 12, picture quality determination means 13, rate control means 14, audio detection means 21, sampling frequency conversion means 23, audio encoder 24, buffer 26, multiplexer 31, and coded signal quantity control means 41.

Coded signal quantity control means 41 decides the distribution of the audio and picture signal on the basis of audio presence information 205 outputted from audio detection means 21 sten outputs sampling frequency information 403 toward sampling frequency conversion means 23, outputs coded audio signal quantity information 402 toward audio encoder 24, and outputs coded picture signal quantity information 401 toward rate control means 14.

When picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality is maintained.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of picture data remainder information 103.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal as is inputted toward sampling frequency conversion means 23.

Sampling frequency conversion means 23 converts the sampling frequency of the inputted audio signal 201 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 8:
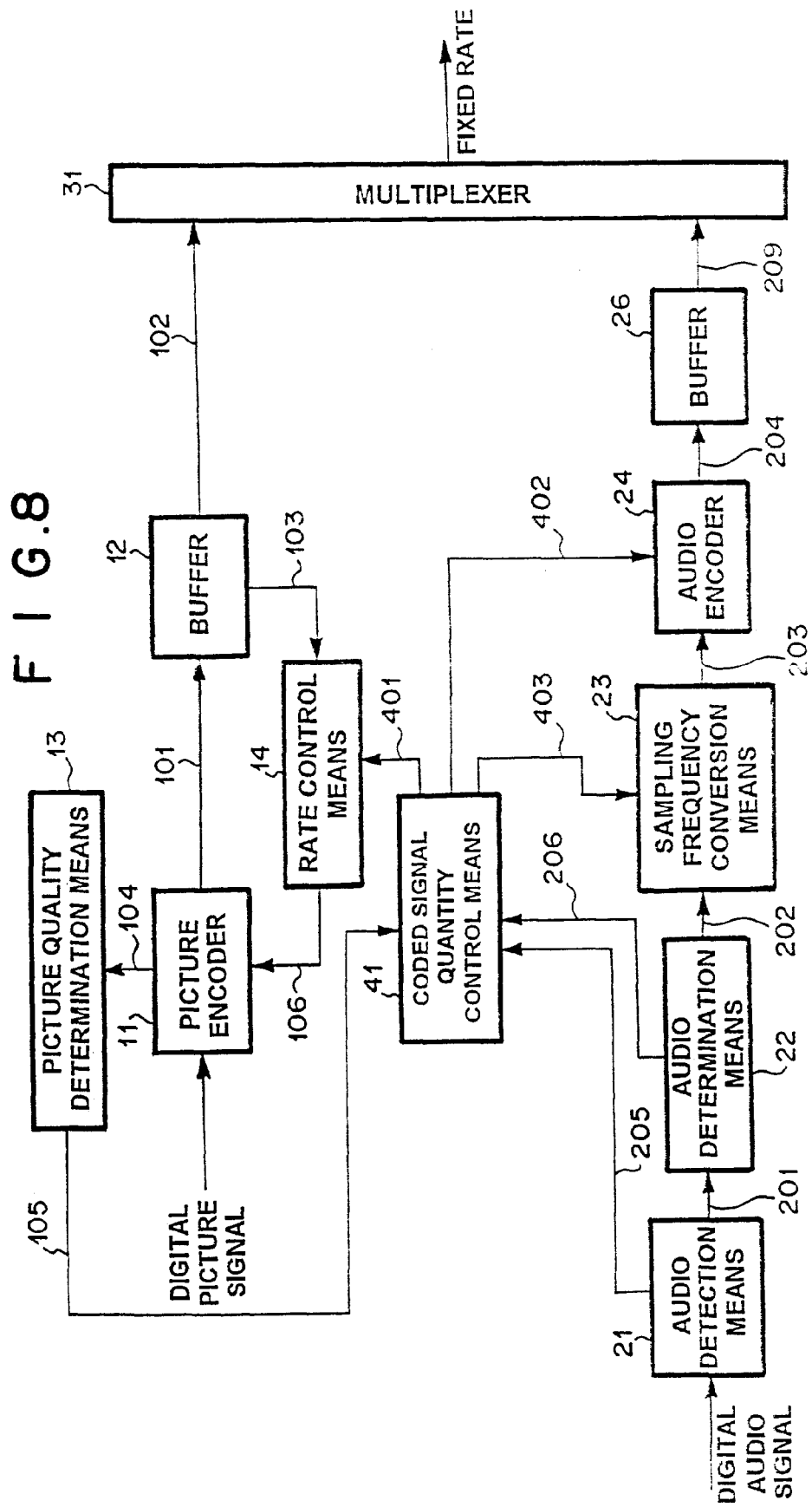
FIG. 8 is a block diagram of 8th mode of embodiment of the picture/audio coding apparatus of the present invention.

A 8th embodiment is shown in FIG. 8. The audio-picture coding apparatus as shown in FIG. 8 comprises picture encoder 11, buffer 12, picture quality determination means 13, rate control means 14, audio detection means 21, audio determination means 22, sampling frequency conversion means 23, audio encoder 24, buffer 26, multiplexer 31, and coded signal quantity control means 41.

Coded signal quantity control means 41 decides the distribution of the audio and picture signal on the basis of audio presence information 205 outputted from audio detection means 21 and audio characteristics information 206 outputted from audio determination means 22, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

Further, when picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality is maintained.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward audio determination means 22.

Audio determination means 22 determines the characteristics of inputted audio signal 201, and outputs audio characteristics information 206 toward coded signal quantity control means 41.

Audio determination means 22 also outputs the inputted audio signal 201 as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 9:
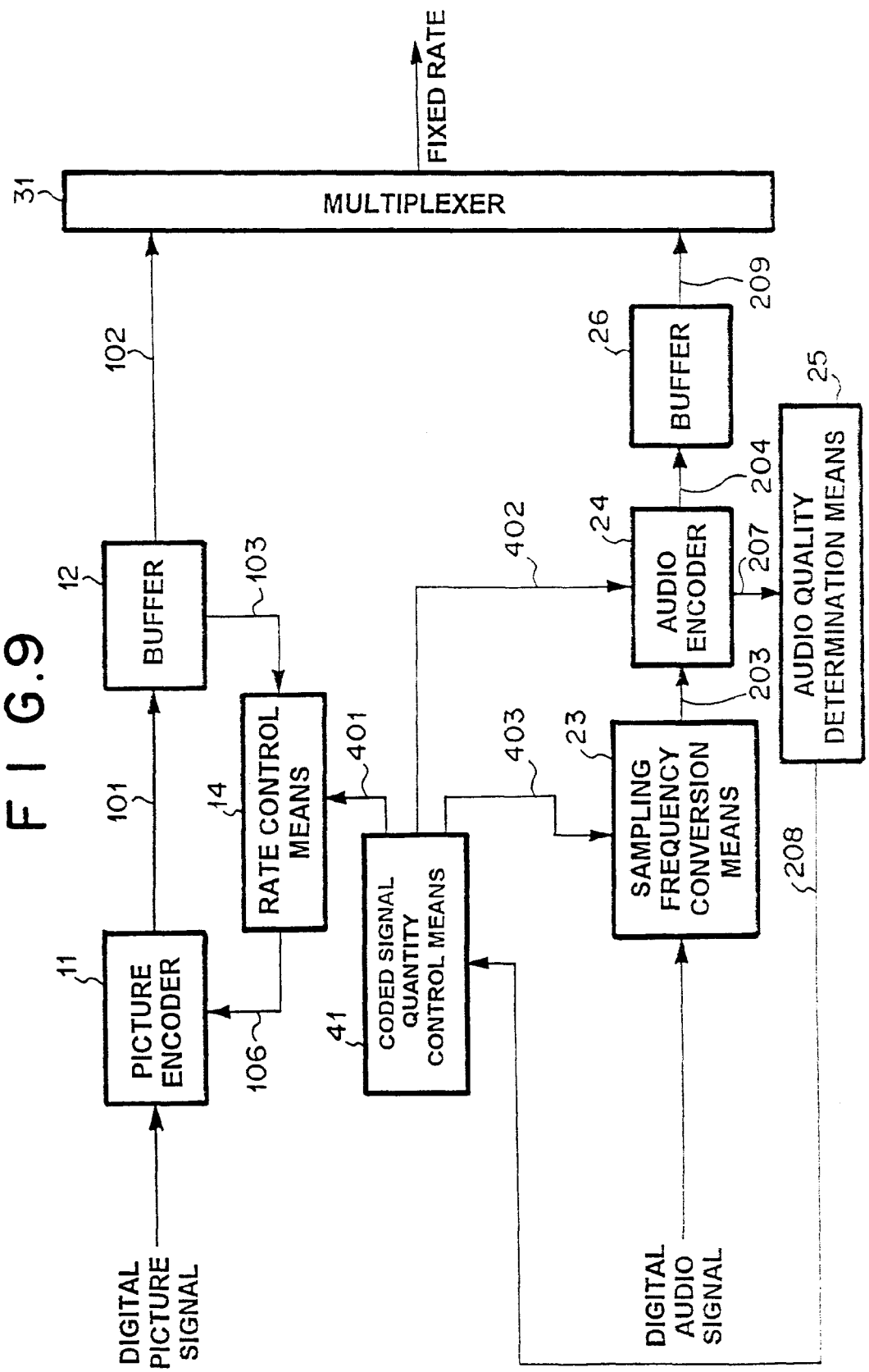
FIG. 9 is a block diagram of 9th mode of embodiment of the picture/audio coding apparatus of the present invention.

A 9th embodiment is shown in FIG. 9. The audio-picture coding apparatus as shown in FIG. 9 comprises picture encoder 11, buffer 12, rate control means 14, sampling frequency conversion means 23, audio encoder 24, audio quality determination means 25, buffer 26, multiplexer 31, and coded signal quantity control means 41.

Coded signal quantity control means 41 decides the distribution of the audio and picture signal on the basis of audio quality information 208 outputted from audio quality determination means 25, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased, the picture code quantity being decreased, in order to suppress the degradation of audio quality.

On the contrary, when audio quality information 208 indicates that the audio quality is good, the audio code quantity is decreased, the picture code quantity being increased, in order to improve the picture quality without causing severe degradation of audio quality.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Sampling frequency conversion means 23 converts the sampling frequency of the inputted audio signal on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 10:
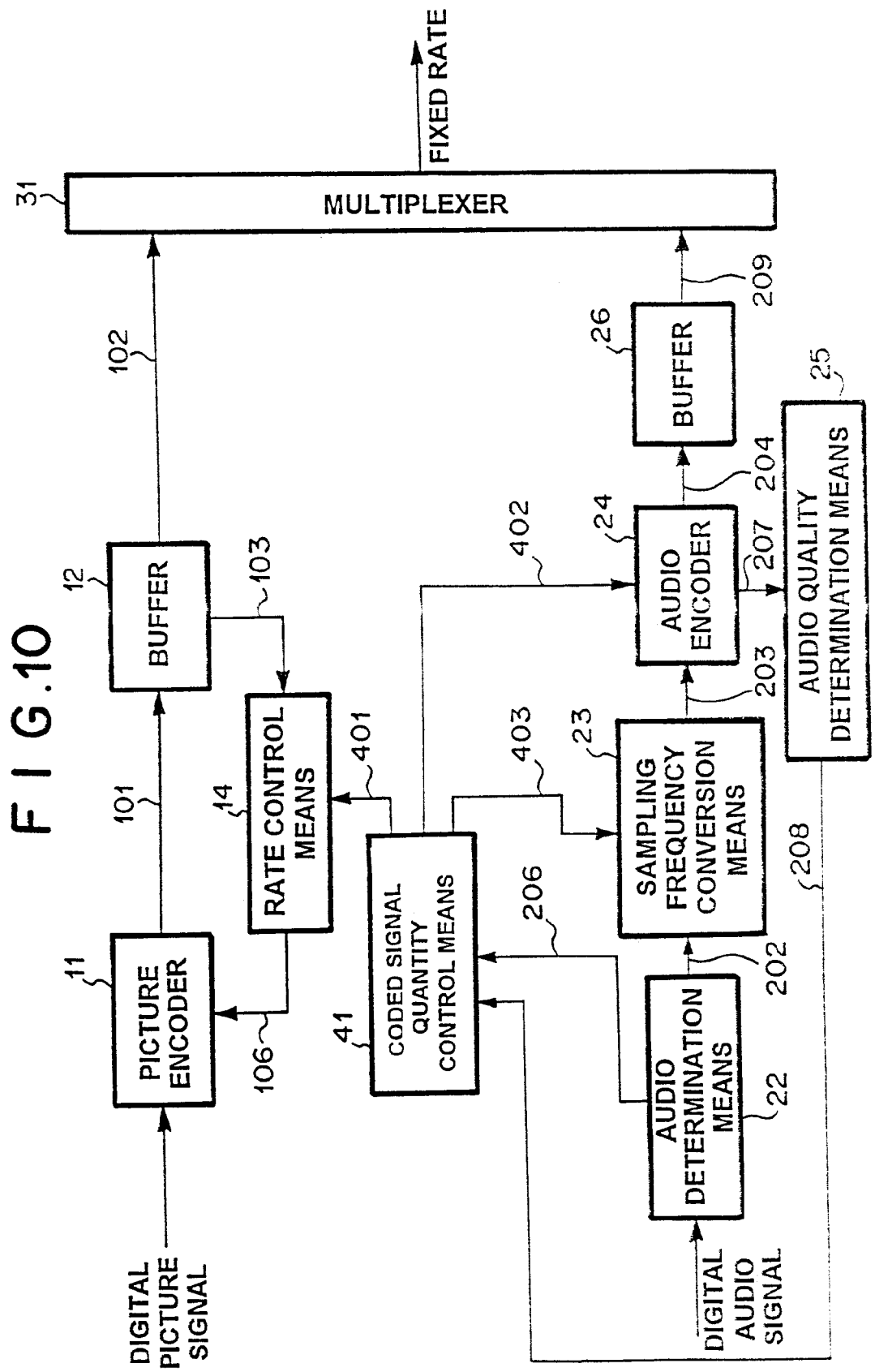
FIG. 10 is a block diagram of 10th mode of embodiment of the picture/audio coding apparatus of the present invention.

A 10th embodiment is shown in FIG. 10. The audio-picture coding apparatus as shown in FIG. 8 comprises picture encoder 11, buffer 12, rate control means 14, audio determination means 22, sampling frequency conversion means 23, audio encoder 24, audio quality determination means 25, buffer 26, multiplexer 31, and coded signal quantity control means 41.

Coded signal quantity control means 41 decides the distribution of the audio and picture signal on the basis of audio characteristics information 206 outputted from audio determination 22 and audio quality information 208 outputted from audio quality determination means 25, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When audio quality information 208 indicates that the audio quality is degraded, the audio code quantity is increased, picture code quantity being decreased, in order to suppress the degradation of audio quality.

On the contrary, when audio quality information 208 indicates that the audio quality is good, the audio code quantity is decreased, while picture code quantity is increased without causing severe degradation of audio quality.

Thus, the audio quality is maintained.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio determination means 22 determines the characteristics of inputted audio signal, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 11:
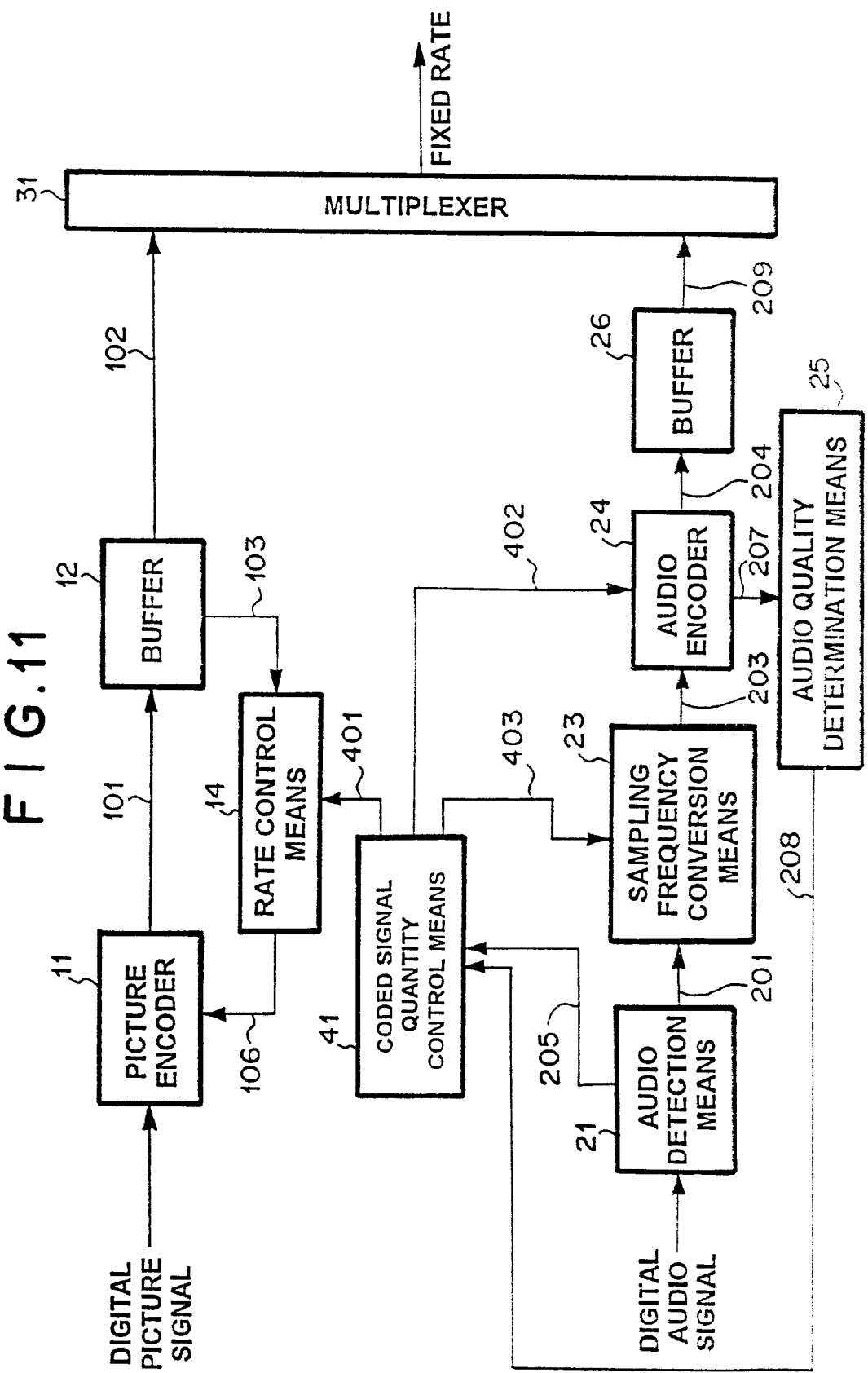
FIG. 11 is a block diagram of 11st mode of embodiment of the picture/audio coding apparatus of the present invention.

A 11st embodiment is shown in FIG. 11. The audio-picture coding apparatus as shown in FIG. 8 comprises picture encoder 11, buffer 12, rate control means 14, audio detection means 21, sampling frequency conversion means 23, audio encoder 24, audio quality determination means 25, buffer 26, multiplexer 31, and coded signal quantity control means 41.

Coded signal quantity control means 41 decides the distribution of the audio and picture signal on the basis of audio presence information 205 outputted from audio detection means 21 and audio quality information 208 outputted from audio quality determination means 25, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased in order to suppress the degradation of audio quality, and picture code quantity is decreased.

On the contrary, when audio quality is good, the audio code quantity is increased, while picture code quantity is decreased without causing extreme degradation of audio quality.

Thus, the audio quality is maintained.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward sampling frequency conversion means 23.

Sampling frequency conversion means 23 converts the sampling frequency of the inputted audio signal 201 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation od audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 12:
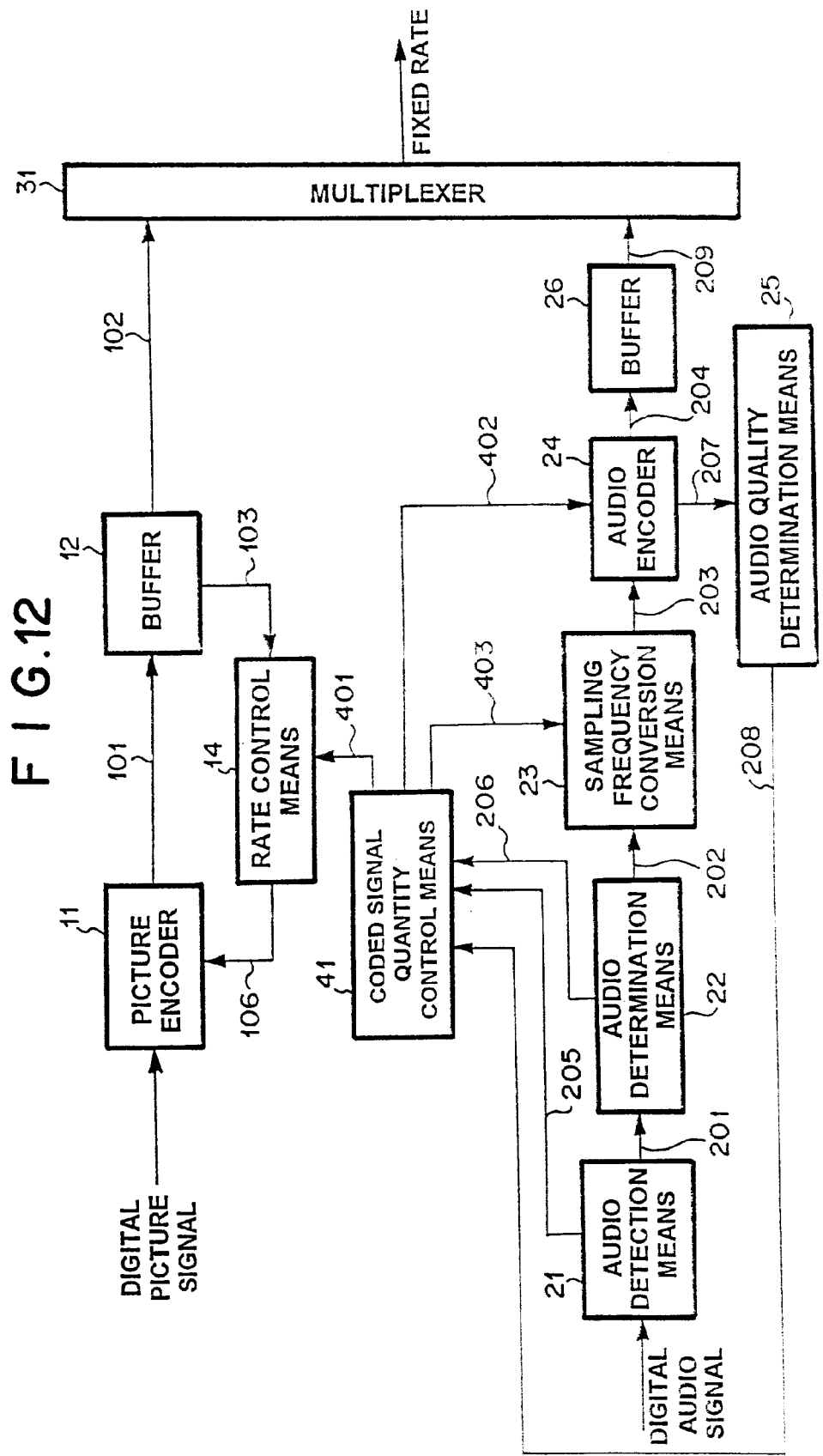
FIG. 12 is a block diagram of 12nd mode of embodiment of the picture/audio coding apparatus of the present invention.

A 12nd embodiment is shown in FIG. 12. The audio-picture coding apparatus as shown in FIG. 12 comprises picture encoder 11, buffer 12, rate control means 14, audio detection means 21, audio determination means 22, sampling frequency conversion means 23, audio encoder 24, audio quality determination means 25, buffer 26, multiplexer 31, and coded signal quantity control means 41.

Coded signal quantity control means 41 decides the distribution of the audio and picture signal on the basis of audio presence information 205 outputted from audio detection means 21, audio characteristics information 206 outputted from audio determination means 22 and audio quality information 208 outputted from audio quality determination means 25, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When audio quality information 208 indicates that the audio quality is degraded, the audio code quantity is increased, and picture code quantity is decreased.

On the contrary, when audio quality information 208 indicates that the audio quality is good, the audio code quantity is decreased, while picture code quantity is increased in order to improve the picture quality without causing severe degradation of audio quality.

Thus, the audio quality is maintained.

When audio signal presence information 205 indicates that audio signal is absent, sampling frequency information 403 and coded audio signal quantity information 402 are fed into sampling frequency conversion means 23 and audio code encoder 24, respectively, for stopping calculations. Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward coded signal quantity control means 41.

Audio detection means 21 also outputs audio signal 201 as is inputted toward audio determination means 22.

Audio determination means 22 determines the characteristics of inputted audio signal 201, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 13:
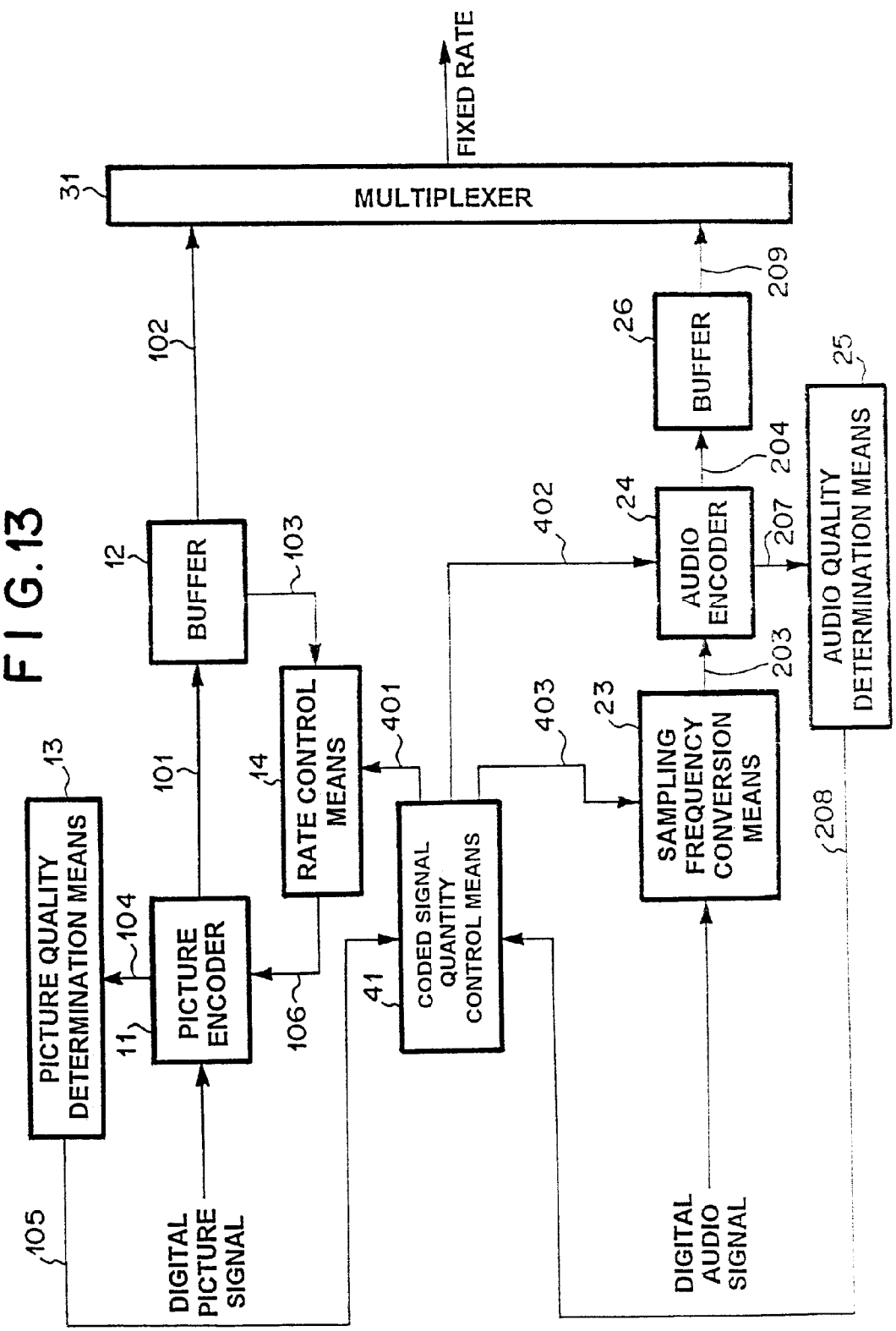
FIG. 13 is a block diagram of 13rd mode of embodiment of the picture/audio coding apparatus of the present invention.

A 13rd embodiment is shown in FIG. 13. The audio-picture coding apparatus as shown in FIG. 13 comprises picture encoder 11, buffer 12, picture quality determination means 13, rate control means 14, sampling frequency conversion means 23, audio encoder 24, audio quality determination 25, buffer 26, multiplexer 31, and coded signal quantity control means 41.

Coded signal quantity control means 41 decides the distribution of the audio and picture signal on the basis of audio quality information 208 outputted from audio quality determination means 25 and picture quality information 105 outputted from picture quality determination means 13, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased, picture code quantity bring decreased.

On the contrary, when audio quality is good, the audio code quantity is decreased, while picture code quantity is increased to improve the picture quality without causing extreme degradation of audio quality.

Thus, the audio quality is maintained constant.

When picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality is maintained constant.

Qualities of picture and audio information are controlled adaptively by utilizing both picture quality information 105 and audio quality information 208.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Sampling frequency conversion means 23 converts the sampling frequency of the inputted audio code on the basis of sampling frequency information 403 outputted from coded signal quantity control means 41, and outputs audio code 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis og audio quality information 207 outputted from audio encoder 24, and outputs audio quality information 206 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 14:
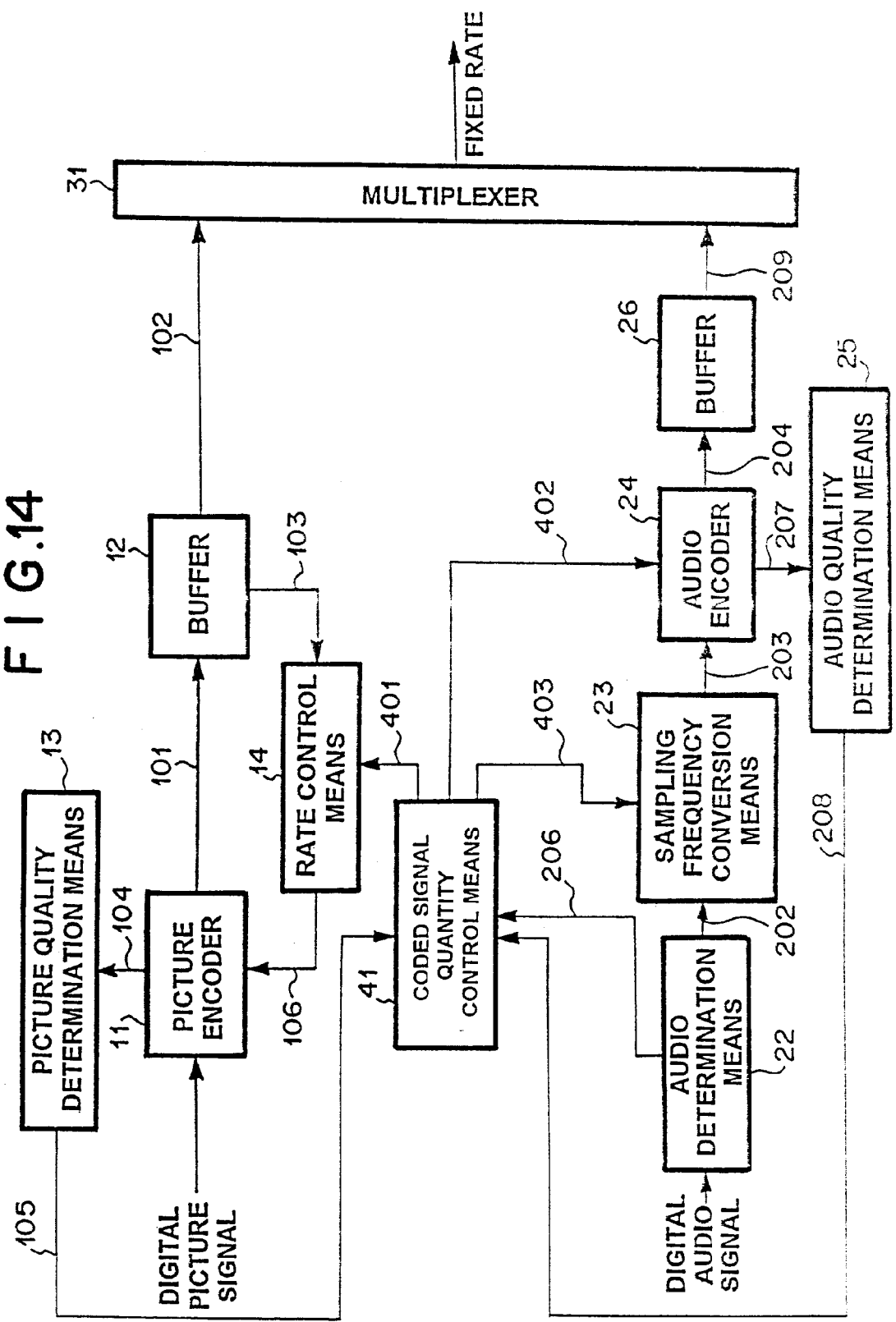
FIG. 14 is a block diagram of 14th mode of embodiment of the picture/audio coding apparatus of the present invention.

A 14th embodiment is shown in FIG. 14. The audio-picture coding apparatus as shown in FIG. 14 comprises picture encoder 11, buffer 12, picture quality determination means 13, rate control means 14, audio determination means 22, sampling frequency conversion means 23, audio encoder 24, buffer 26, multiplexer 31, and coded signal quantity control means 41.

Coded signal quantity control means 41 decides the distribution of the audio and picture signal on the basis of audio characteristics information 206 outputted from audio determination means 22, audio quality information 208 outputted from audio quality determination means 25 and picture quality information 105 outputted from picture quality determination means 13, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When audio quality information 208 indicates that the audio quality is degraded, the audio code quantity is increased, and picture code quantity is decreased.

On the contrary, when audio quality information 208 indicates that the audio quality is good, the audio code quantity is decreased, while picture code quantity is increased so as not to cause serious degradation of picture quality.

When picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture and audio qualities are controlled as awhole by utilizing both picture quality information 105 and audio quality information 208.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio determination means 22 determines the characteristics of inputted audio signal, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 15:
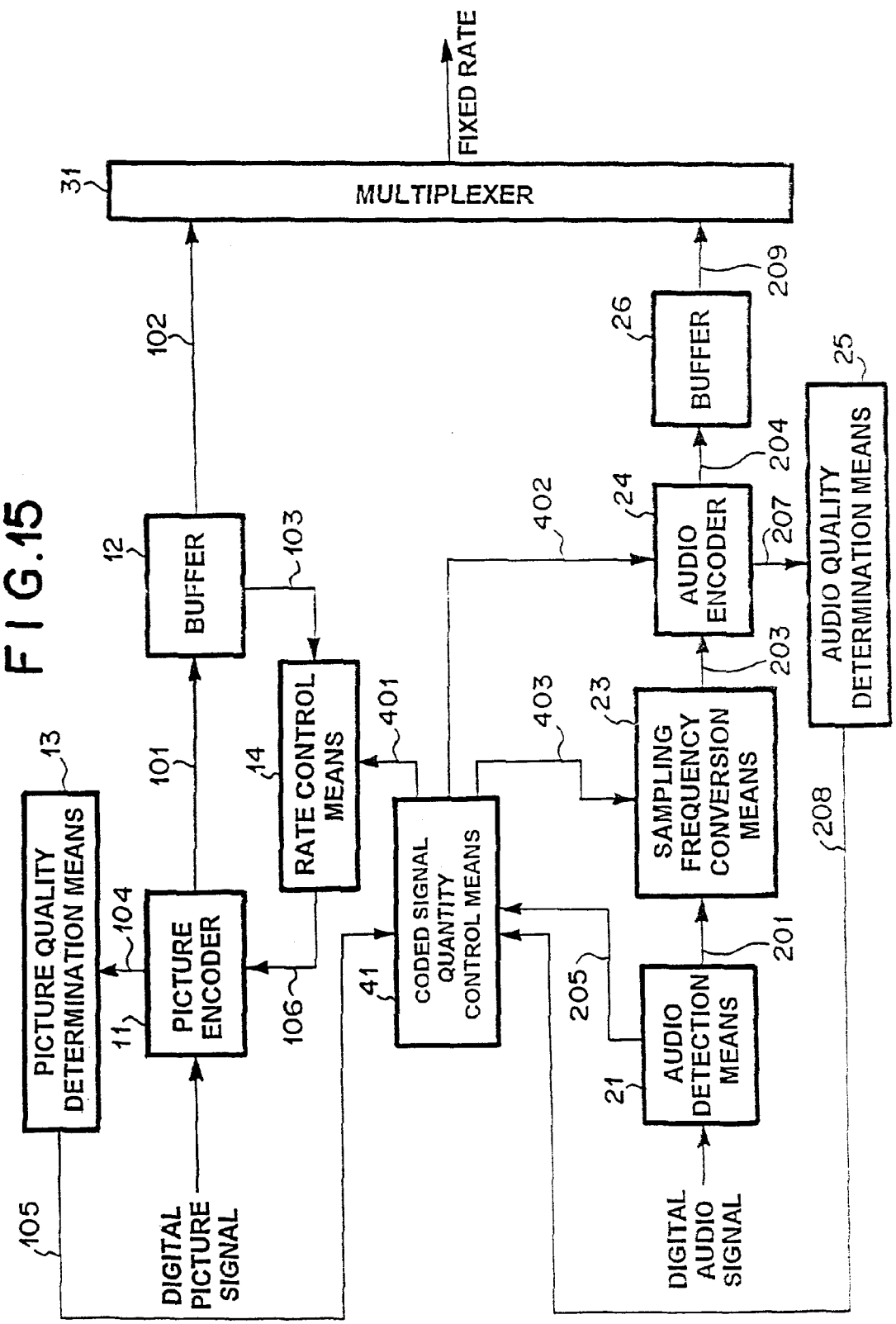
FIG. 15 is a block diagram of 15th mode of embodiment of the picture/audio coding apparatus of the present invention.

A 15th embodiment is shown in FIG. 15. The audio-picture coding apparatus as shown in FIG. 15 comprises picture encoder 11, buffer 12, picture quality determination means 13, rate control means 14, audio detection means 21, sampling frequency conversion means 23, audio encoder 24, audio quality determination means 25, buffer 26, multiplexer 31, and coded signal quantity control means 41.

Coded signal quantity control means 41 decides the distribution of the audio and picture signal on the basis of audio presence information 205 outputted from audio detection means 21, audio quality information 208 outputted from audio quality determination means 25 and picture quality information 105 outputted from picture quality determination means 13, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased, and picture code quantity is decreased.

On the contrary, when audio quality information 208 indicates that the picture quality is good, the audio code quantity is decreased, while picture code quantity is increased without causing extreme degradation of audio quality.

Thus, the audio quality is maintained.

When picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality and audio quality are controlled as a whole by utilizing both picture quality information 105 and audio quality information 208.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward audio determination means 22.

Sampling frequency conversion means 23 converts the sampling frequency of the inputted audio signal 201 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 16:
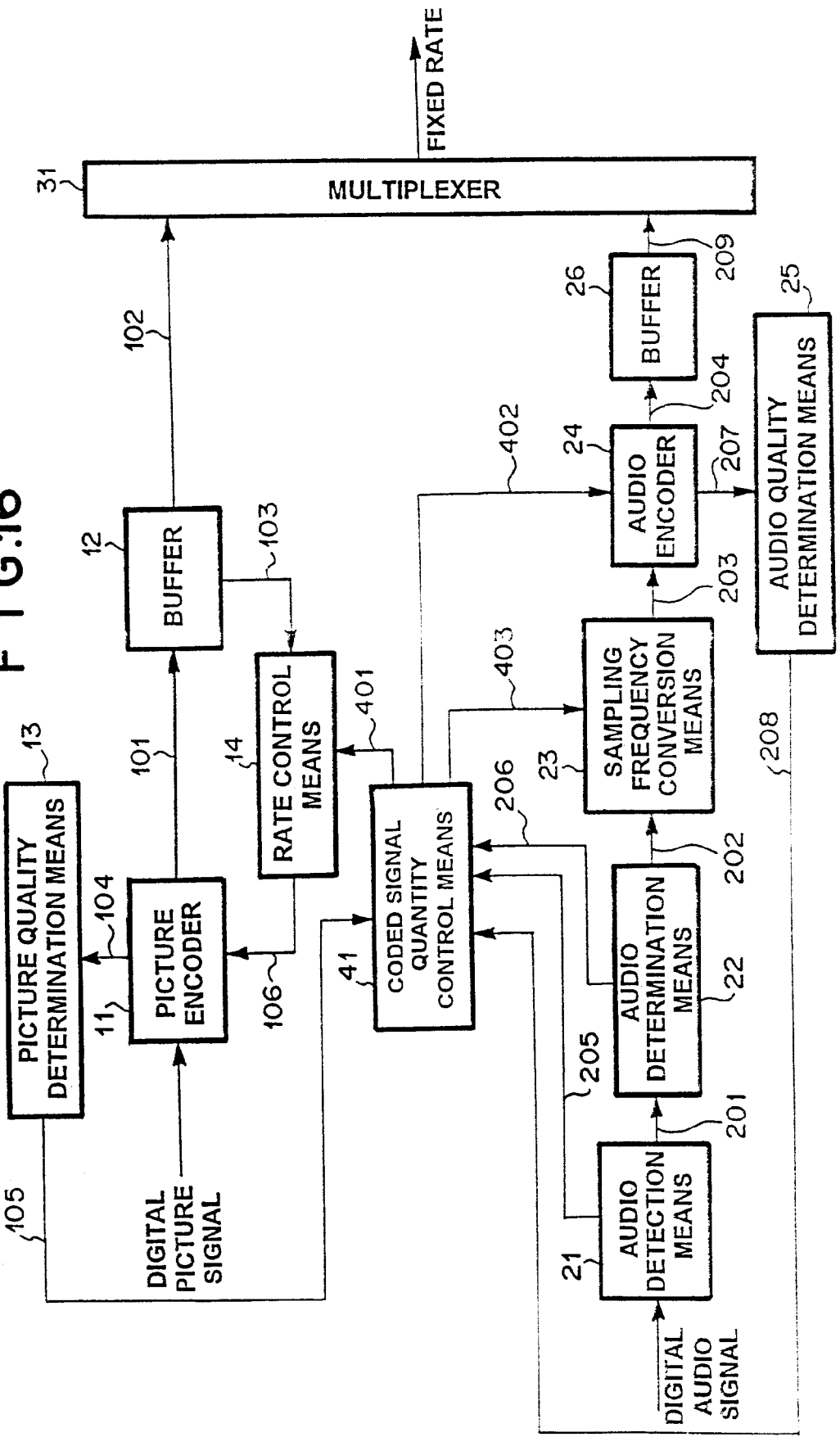
FIG. 16 is a block diagram of 16th mode of embodiment of the picture/audio coding apparatus of the present invention.

A 16th embodiment is shown in FIG. 16. The audio-picture coding apparatus as shown in FIG. 16 comprises picture encoder 11, buffer 12, picture quality determination means 13, rate control means 14, audio detection means 21, audio determination means 22, sampling frequency conversion means 23, audio encoder 24, audio quality determination means 25, buffer 26, multiplexer 31, and coded signal quantity control means 41.

Coded signal quantity control means 41 decides the distribution of the audio and picture signal on the basis of audio presence information 205 outputted from audio detection means 21, audio characteristics information 206 outputted from audio determination means 22, audio quality information 208 outputted from audio quality determination means 25 and picture quality information 105 outputted from picture quality determination means 13, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When audio quality information 208 indicates that the audio quality is degraded, the audio code quantity is increased, and picture code quantity is decreased.

On the contrary, when audio quality information 208 indicates that the picture quality is good, the audio code quantity is decreased, while picture code quantity is increased not so as to cause extreme degradation of audio quality.

Thus, the audio quality is maintained.

When picture quality information 105 indicates that the picture quality is degraded, the audio code quantity is decreased, and picture code quantity, is increased. On the contrary, when picture quality information 105 indicates that the picture quality is good, the audio code quantity is increased, while picture code quantity is decreased without causing extreme degradation of picture quality. Thus, the picture quality and audio quality are controlled as a whole by utilizing both picture quality information 105 and audio quality information 208.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by, picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward audio determination means 22.

Audio determination means 22 determines the characteristics of inputted audio signal 201, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Figure 17:
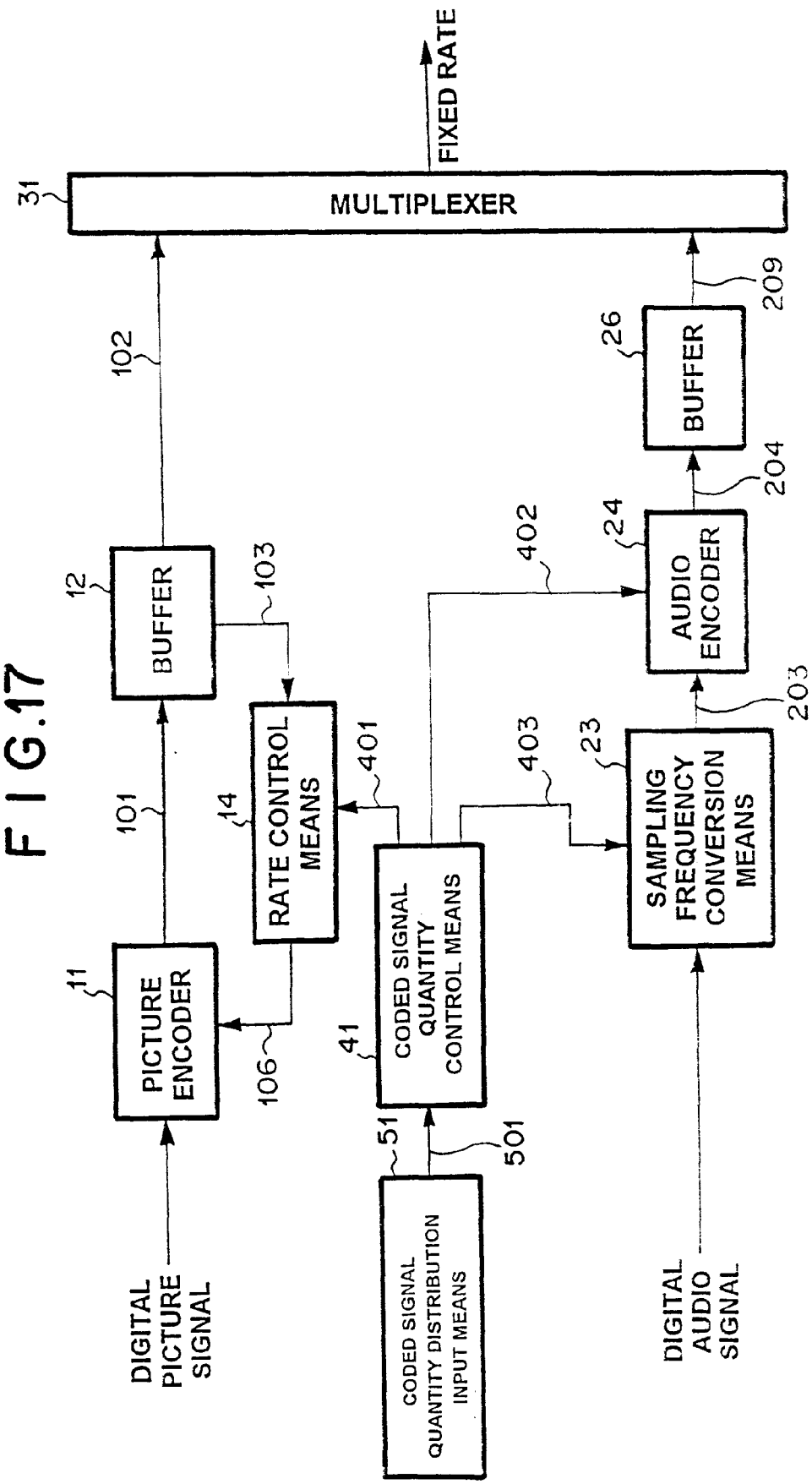
FIG. 17 is a block diagram of 17th mode of embodiment of the picture/audio coding apparatus of the present invention.

A 17th embodiment is shown in FIG. 17. The audio-picture coding apparatus as shown in FIG. 17 comprises picture encoder 11, buffer 12, rate control means 14, sampling frequency conversion means 23, audio encoder 24, buffer 26, multiplexer 31, coded signal quantity control means 41, and coded signal quantity distribution input means 51.

Coded signal quantity control means 41 decides the distribution of the audio and picture signal on the basis of code quantity dirtribution information 501 outputted from coded signal quantity dirtribution input means 51, then outputs sampling frequency information 403 toward sampling frequency conversion means 23, outputs coded audio signal quantity information 402 toward audio encoder 24, and outputs coded picture signal quantity information 401 toward rate control means 14.

Coded signal quantity distribution information 501 includes quantities distributed for the audio and picture codes.

In order to obtain the audio code and picture code as didtributed by coded signal quantity distribution information 501, coded signal quantity control means 41 outputs sampling frequency information 403 toward sampling frequency conversion means 23, outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Sampling frequency conversion means 23 converts the sampling, frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 accepts inputs such as request of users to distribute available quantity of codes for audio and picture signals.

Therefore, a priority of distribution for audio signal or picture signal is selected by the users.

Figure 18:
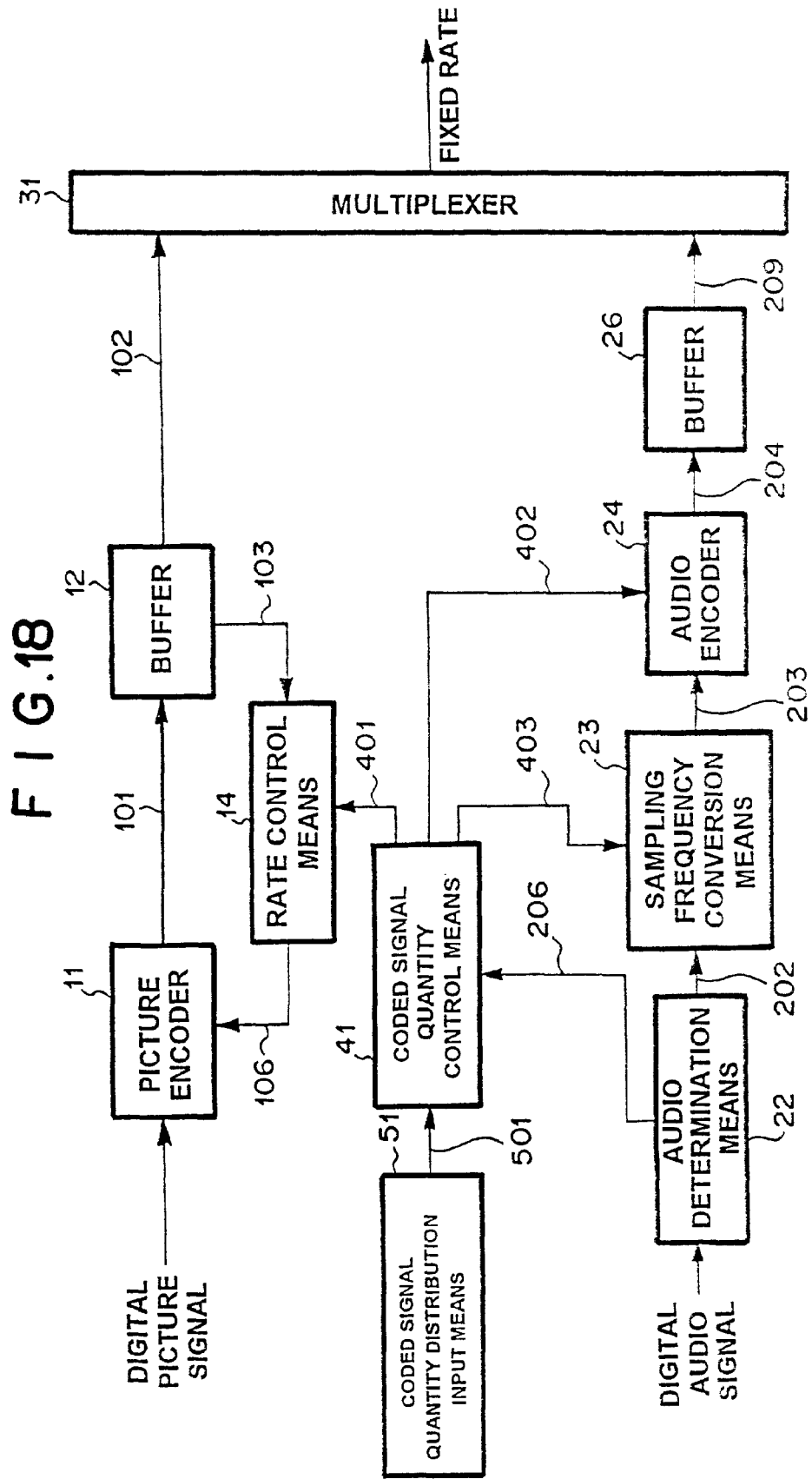
FIG. 18 is a block diagram of 18th mode of embodiment of the picture/audio coding apparatus of the present invention.

An 18th embodiment is shown in FIG. 18. The audio-picture coding apparatus as shown in FIG. 18 comprises picture encoder 11, buffer 12, rate control means 14, audio determination means 22, sampling frequency conversion means 23, audio encoder 24, buffer 26, multiplexer 31, coded signal quantity control means 41, and coded signal quantity distribution input means 51.

Coded signal quantity control means 41 decides the distribution of the audio and picture signal on the basis of audio characteristics information 206 outputted from audio determination means 22 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

Coded signal quantity distribution information 501 includes quantities distributed for the audio and picture codes.

In order to obtain the audio code and picture code as didtributed by coded signal quantity distribution information 501, coded signal quantity control means 41 outputs sampling frequency information 403 toward sampling frequency conversion means 23, outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio determination means 22 determines the characteristics of inputted audio signal 201, and outputs audio characteristics information 206 toward coded signal quantity control means 41.

Audio determination means 22 also outputs the inputted audio signal 201 as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 accepts inputs such as request of users to distribute available quantity of codes for audio and picture signals.

Therefore, a priority of distribution for audio signal or picture signal is selected by the users.

Figure 19:
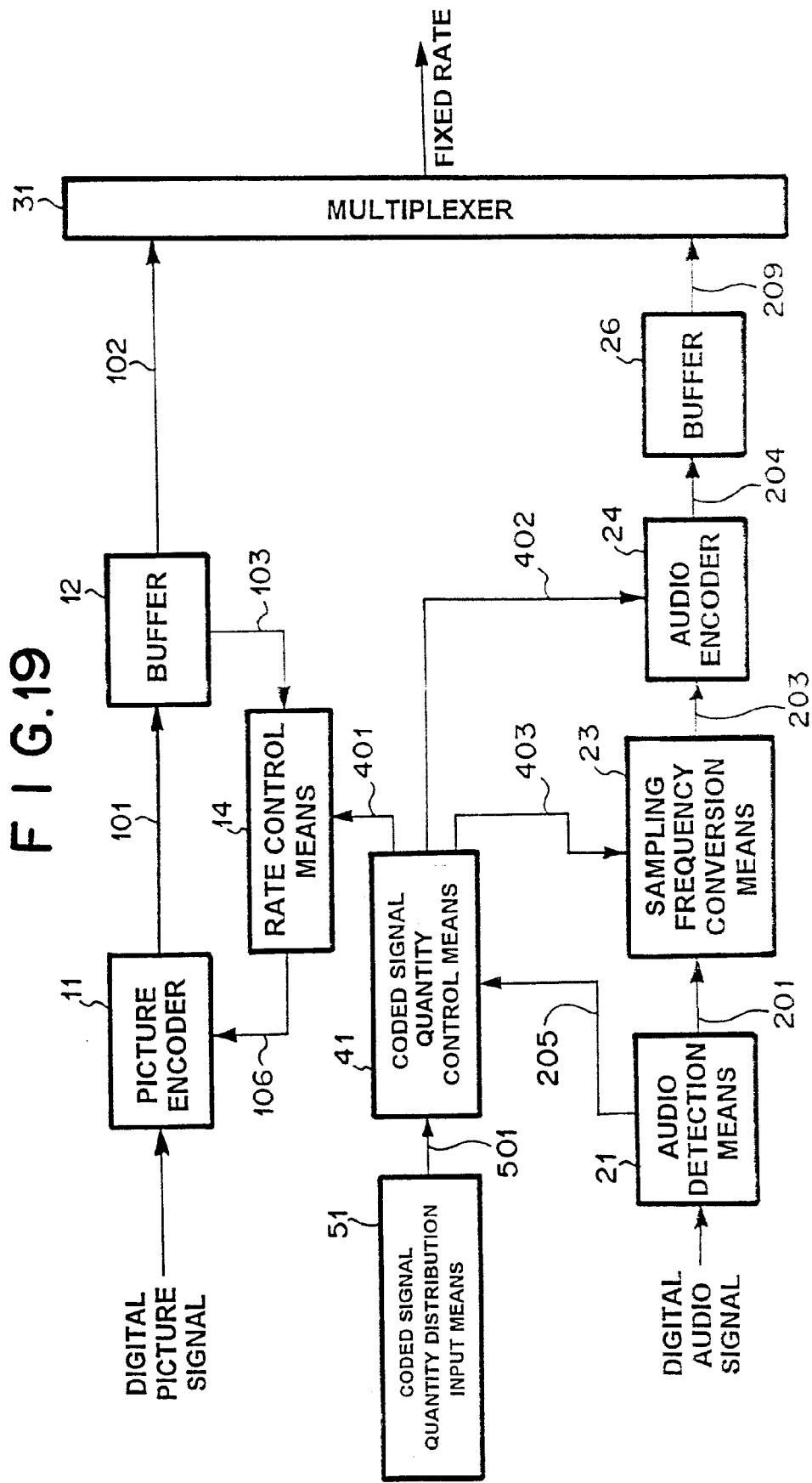
FIG. 19 is a block diagram of 19th mode of embodiment of the picture/audio coding apparatus of the present invention.

A 19th embodiment is shown in FIG. 19. The audio-picture coding apparatus as shown in FIG. 19 comprises picture encoder 11, buffer 12, rate control means 14, audio detection means 21, sampling frequency conversion means 23, audio encoder 24, buffer 26, multiplexer 31, coded signal quantity control means 41, and coded signal quantity distribution input means 51.

Coded signal quantity control means 41 decides the distribution of the audio and picture signal on the basis of audio presence information 205 outputted from audio detection means 21 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward audio determination means 22.

Sampling frequency conversion means 23 converts the sampling frequency of the inputted audio signal 201 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 20:
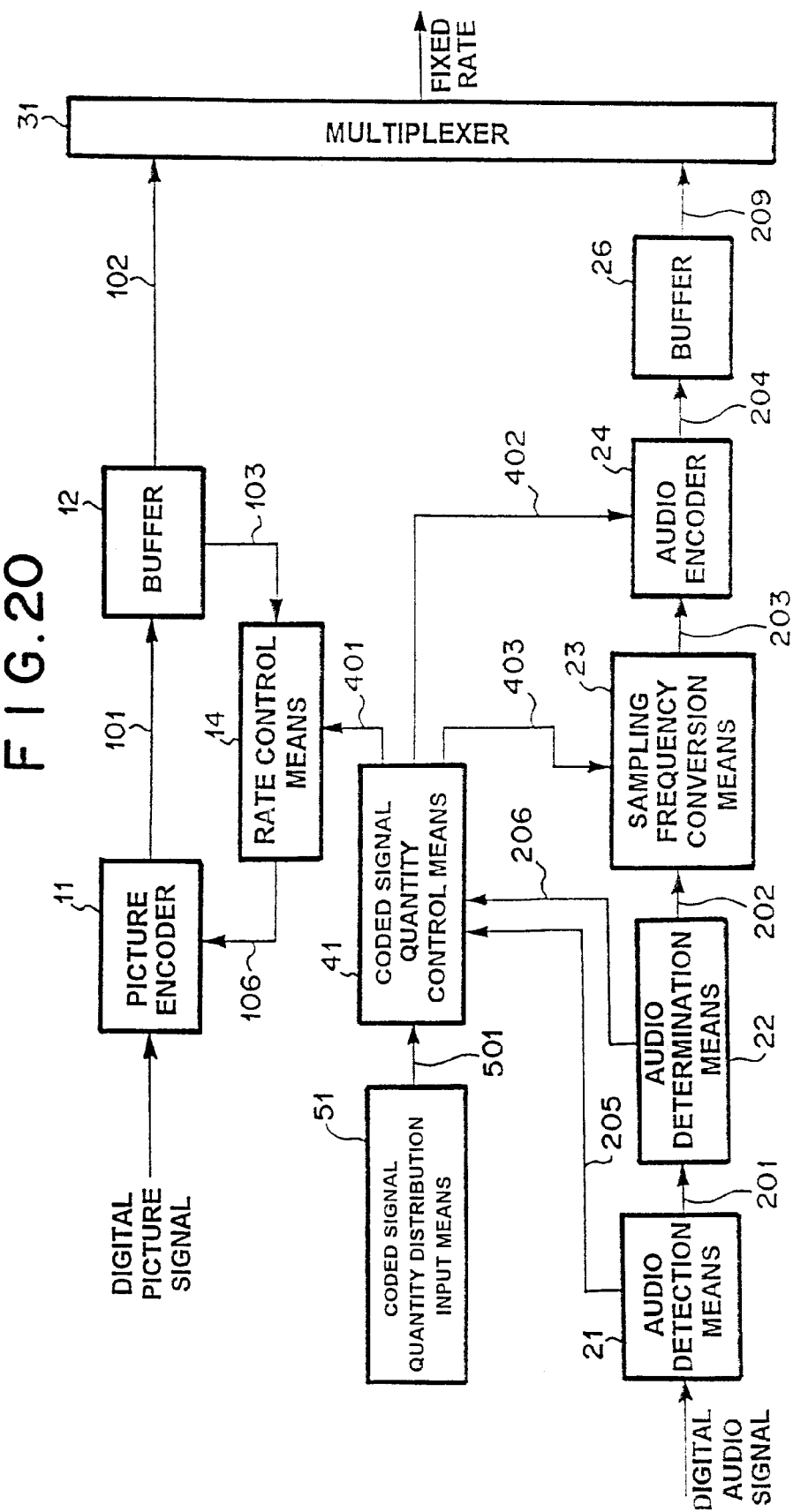
FIG. 20 is a block diagram of 20th mode of embodiment of the picture/audio coding apparatus of the present invention.

A 20th embodiment is shown in FIG. 20. The audio-picture coding apparatus as shown in FIG. 20 comprises picture encoder 11, buffer 12, rate control means 14, audio detection means 21, audio determination means 22, sampling frequency conversion means 23, audio encoder 24, buffer 26, multiplexer 31, coded signal quantity control means 41 and coded signal quantity distribution input means 51.

Coded signal quantity control means 41 decides the distribution of the audio and picture signal on the basis of audio presence information 205 outputted from audio detection means 21, audio characteristics information 206 outputted from audio determination means 22 and code quantity dirtribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14. Further, when audio presence information 205 indicates that audio signal is absent, coded signal quantity control means 41 outputs sampling frequency information 403 and coded audio signal quantity information 402 as an instruction for stopping calculation in sampling frequency conversion means 23 and audio encoder 24.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward coded signal quantity control means 41.

Audio detection means 21 also outputs audio signal 201 as is inputted toward audio determination means 22.

Audio determination means 22 determines the characteristics of inputted audio signal 201, and outputs audio characteristics information 206 toward coded signal quantity control means 41.

Audio determination means 22 also outputs the inputted audio signal 201 as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 21:
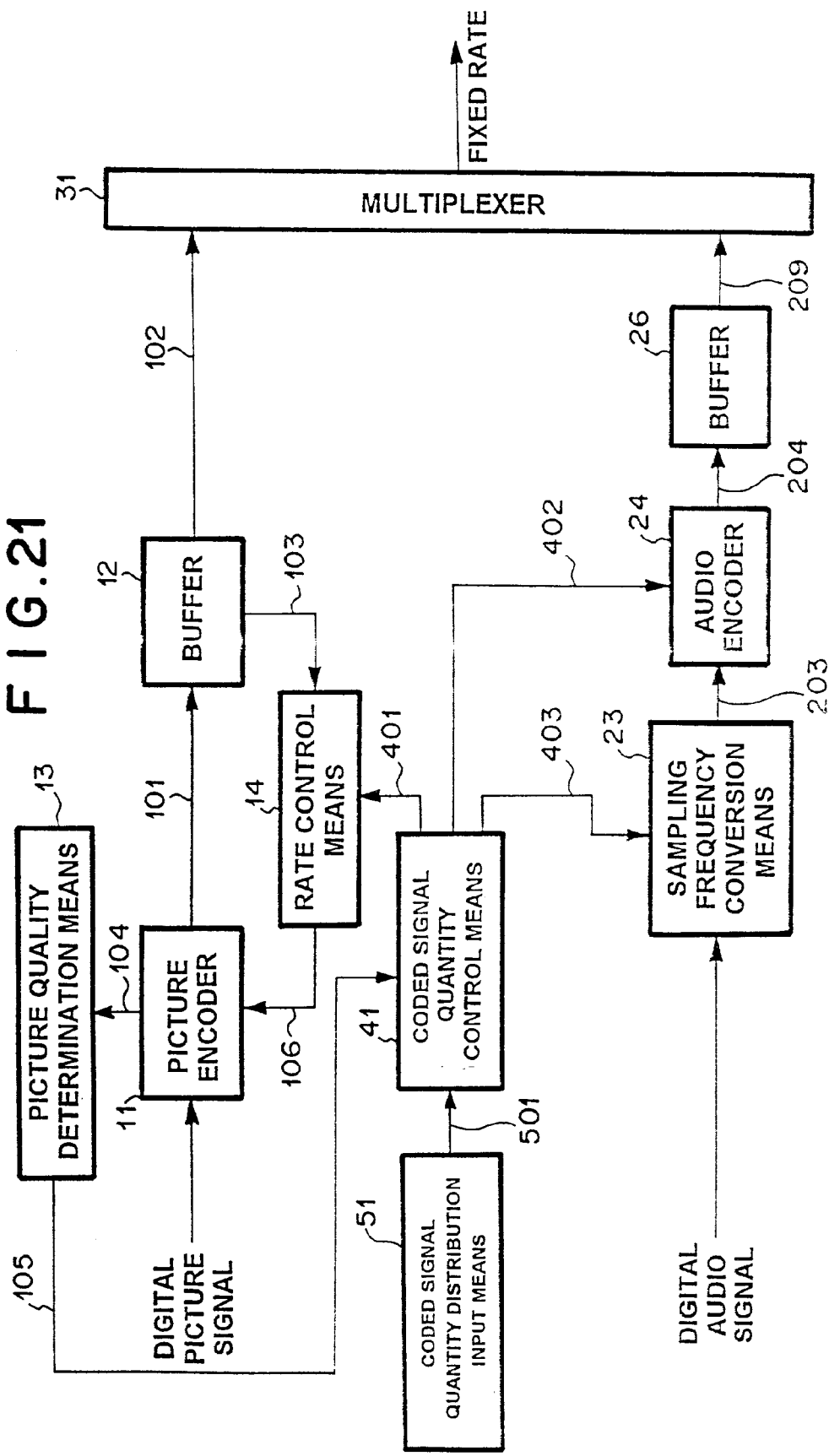
FIG. 21 is a block diagram of 21st mode of embodiment of the picture/audio coding apparatus of the present invention.

A 21st embodiment is shown in FIG. 21. The audio-picture coding apparatus as shown in FIG. 21 comprises picture encoder 11, buffer 12, picture quality determination means 13, rate control means 14, sampling frequency conversion means 23, audio encoder 24, buffer 26, multiplexer 31, coded signal quantity control means 41 and coded signal quantity distribution input means 51.

Coded signal quantity control means 41 decides the distribution of the audio and picture signal on the basis of picture quality information 105 outputted from picture quality determination means 13 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

When picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 22:
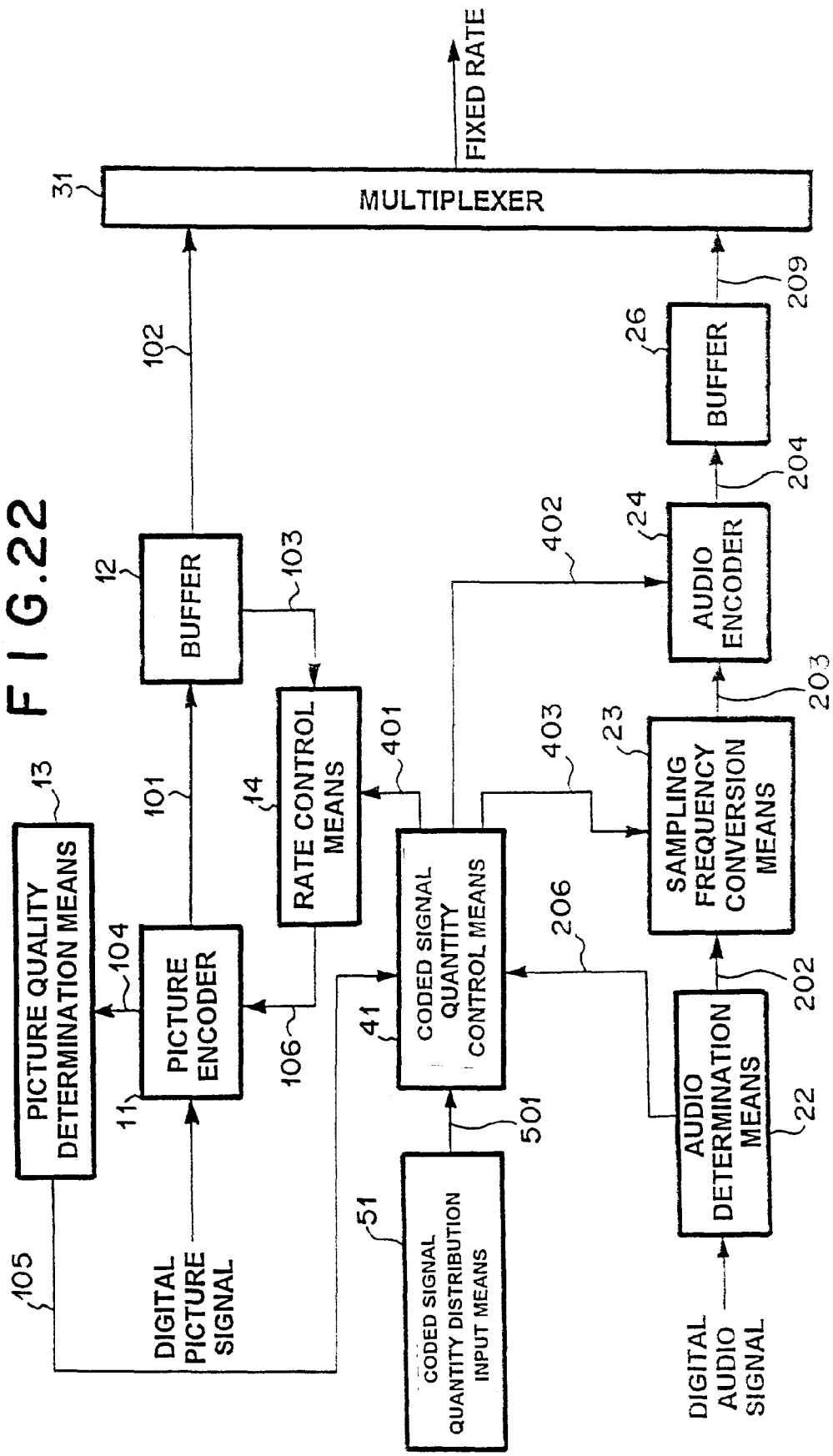
FIG. 22 is a block diagram of 22nd mode of embodiment of the picture/audio coding apparatus of the present invention.

A 22nd embodiment is shown in FIG. 22. The audio-picture coding apparatus as shown in FIG. 22 comprises picture encoder 11, buffer 12, picture quality determination means 13, rate control means 14, audio determination means 22, sampling frequency conversion means 23, audio encoder 24, buffer 26, multiplexer 31, coded signal quantity control means 41and coded signal quantity distribution input means 51.

Coded signal quantity control means 41 decides the distribution of the audio and picture signal on the basis of picture quality information 105 outputted from picture quality determination means 13, audio characteristics information 206 outputted from audio determination means 22 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When picture quality information 105 indicates that the picture quality is degraded, the audio code quantity is decreased, and picture code quantity is increased. On the contrary, when picture quality information 105 indicates that the picture quality is good, the audio code quantity is increased, while picture code quantity is decreased without causing extreme degradation of picture quality.

Thus, the picture quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio determination means 22 determines the characteristics of inputted audio signal 201, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 23:
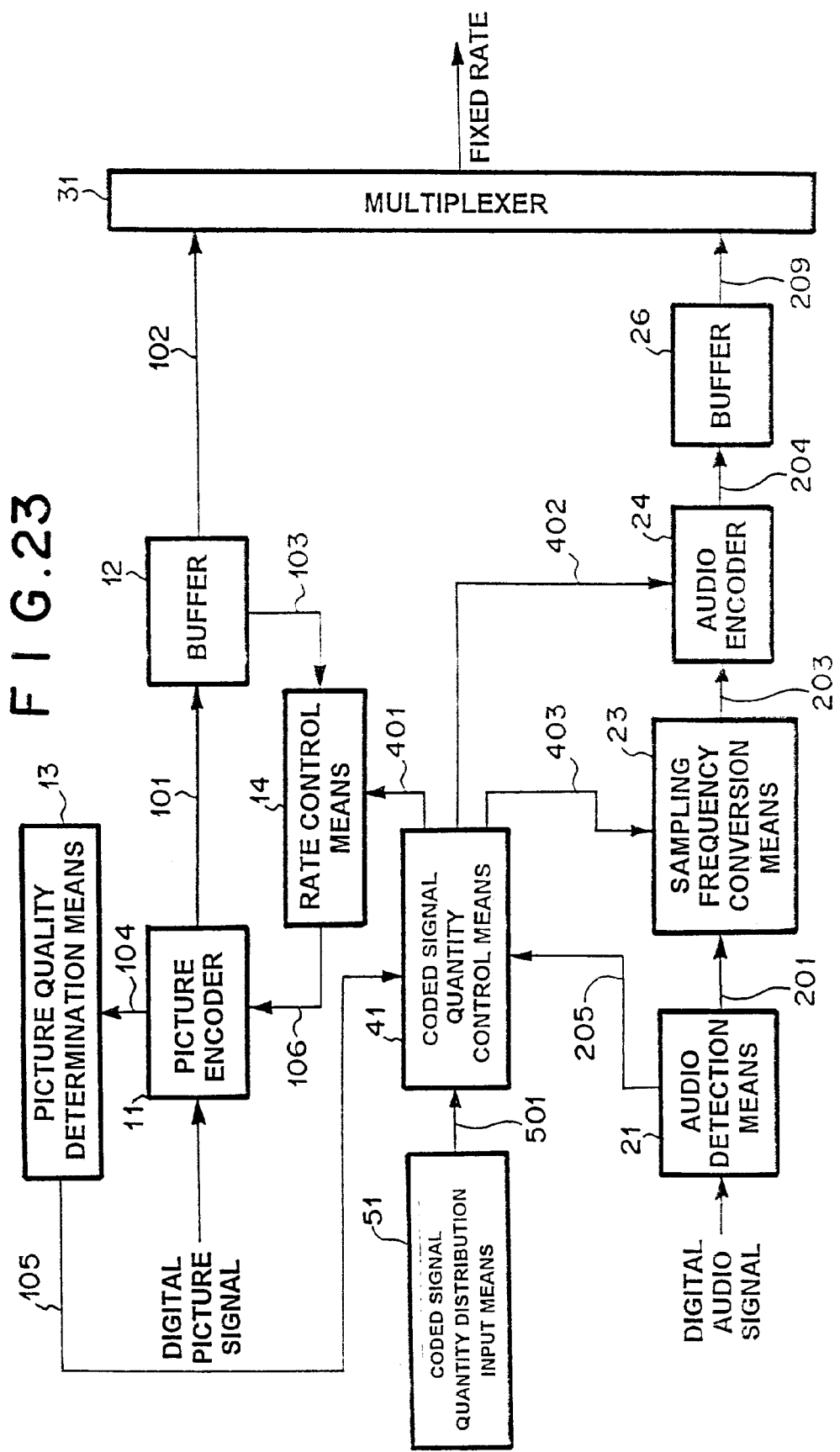
FIG. 23 is a block diagram of 23rd mode of embodiment of the picture/audio coding apparatus of the present invention.

A 23rd embodiment is shown in FIG. 23. The audio-picture coding apparatus as shown in FIG. 23 comprises picture encoder 11, buffer 12, picture quality determination means 13, rate control means 14, audio detection means 21, sampling frequency conversion means 23, audio encoder 24, buffer 26, multiplexer 31, coded signal quantity control means 41, and coded signal quantity distribution input means 51.

Coded signal quantity control means 41 decides the distribution of the audio and picture signal on the basis of audio presence information 205 outputted from audio detection means 21 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

When picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated picture code quantity information 103 outputted from buffer 12.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward sampling frequency conversion means 23.

Sampling frequency conversion means 23 converts the sampling frequency of the inputted audio signal 201 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 24:
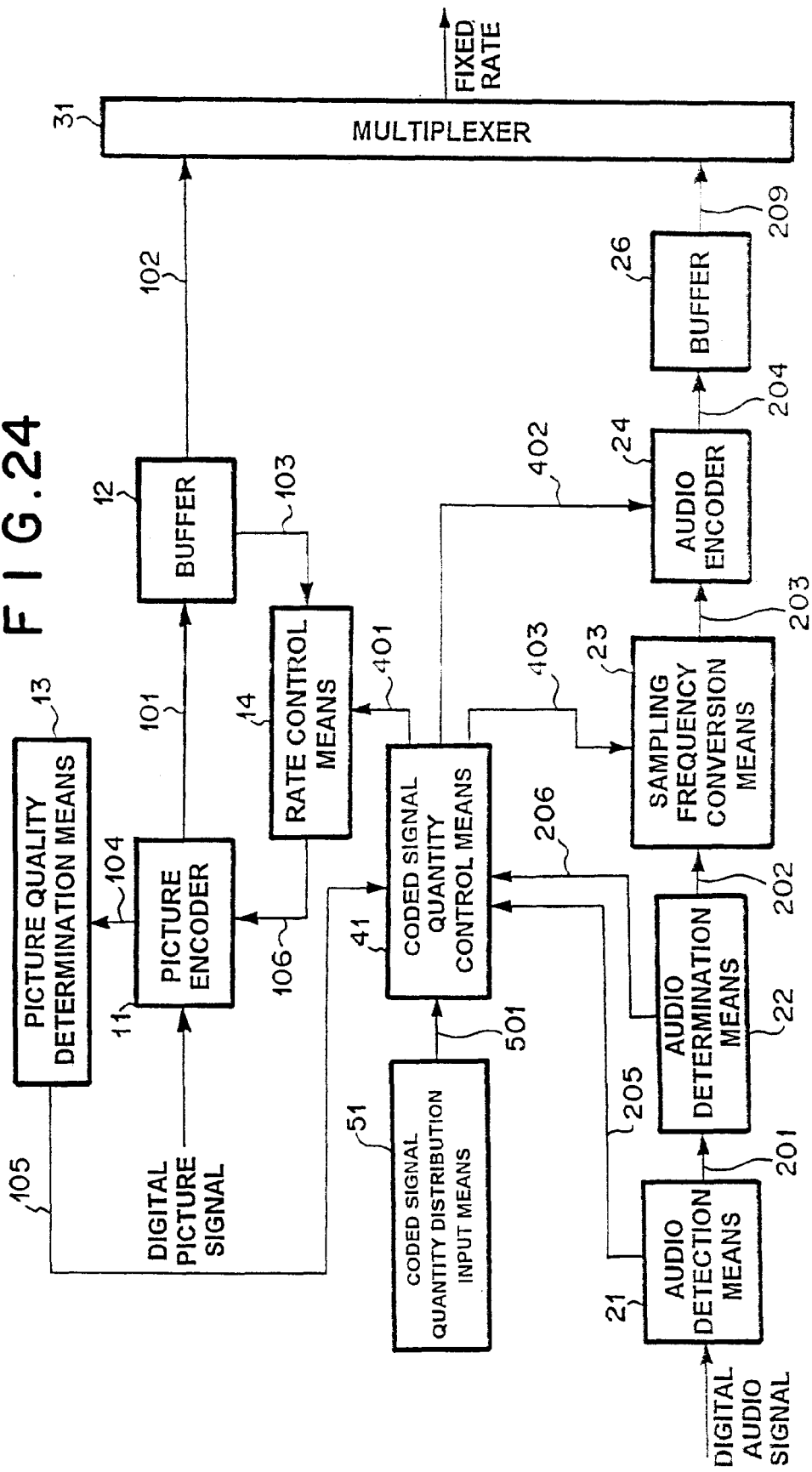
FIG. 24 is a block diagram of 24th mode of embodiment of the picture/audio coding apparatus of the present invention.

A 24th embodiment is shown in FIG. 24. The audio-picture coding apparatus as shown in FIG. 24 comprises picture encoder 11, buffer 12, picture quality determination means 13, rate control means 14, audio detection means 21, audio determination means 22, sampling frequency conversion means 23, audio encoder 24, buffer 26, multiplexer 31, coded signal quantity control means 41, and coded signal quantity distribution input means 51.

Coded signal quantity control means 41 decides the distribution of the audio and picture signal on the basis of audio presence information 205 outputted from audio detection means 21, audio characteristics information 206 outputted from audio determination means 22 and coded signal quantity distribution information 501 outputted from code distribution information input means 51, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

Further, when picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the picture quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward audio determination means 22.

Audio determination means 22 determines the characteristics of inputted audio signal 201, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 25:
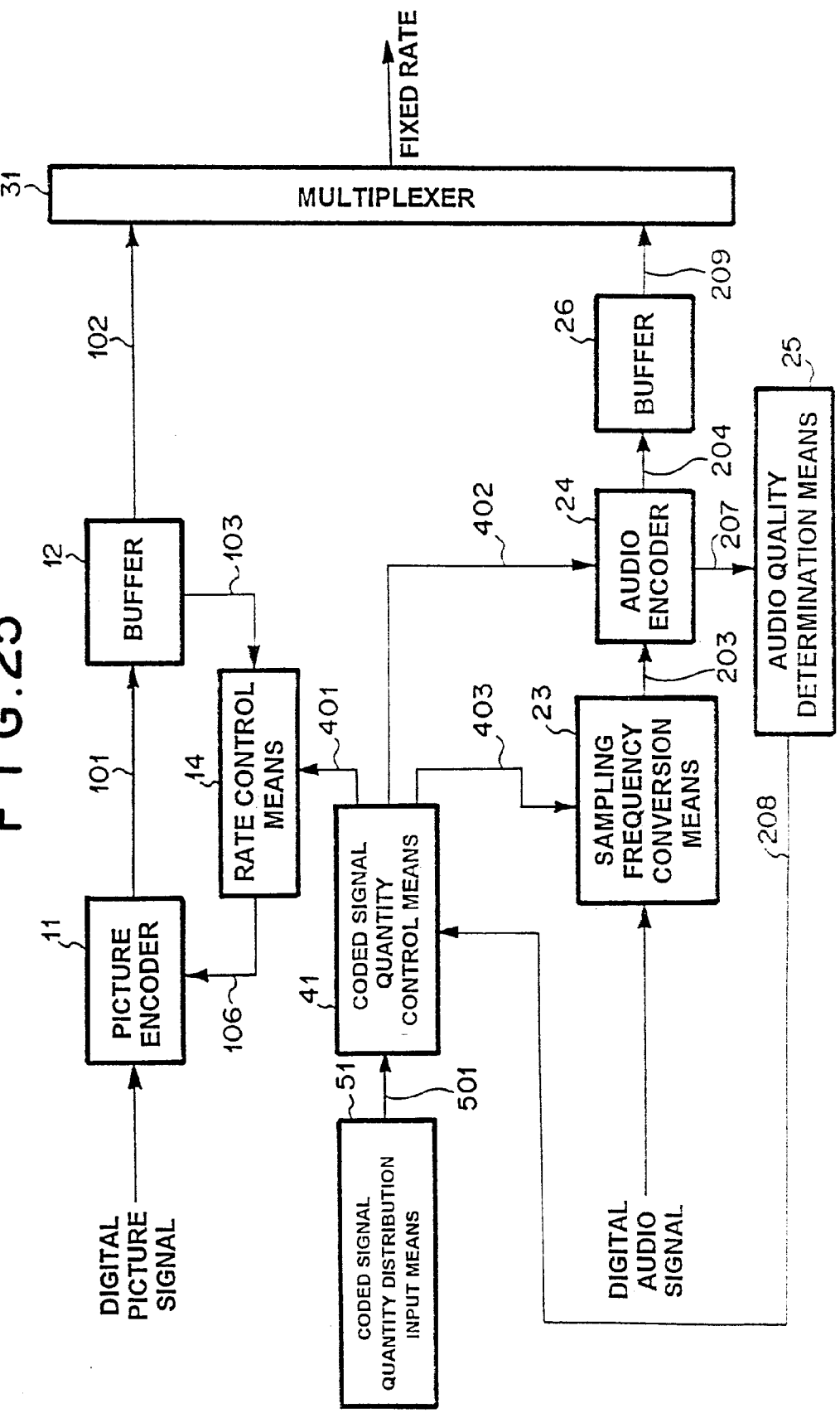
FIG. 25 is a block diagram of 25th mode of embodiment of the picture/audio coding apparatus of the present invention.

A 25th embodiment is shown in FIG. 25. The audio-picture coding apparatus as shown in FIG. 25 comprises picture encoder 11, buffer 12, rate control means 14, sampling frequency conversion means 23, audio encoder 24, audio quality determination means 25, buffer 26, multiplexer 31, coded signal quantity control means 41, and coded signal quantity distribution input means 51.

Coded signal quantity control means 41 decides the distribution of the audio and picture signal on the basis of audio quality information 208 outputted from audio quality determination means 25, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased, and picture code quantity is decreased.

On the contrary, when audio quality is good, the audio code quantity is decreased, while picture code quantity is increased without causing extreme degradation of audio quality.

Thus, the audio quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 outputs coded audio signal 209 toward multiplexer 31.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Therefore, a priority of distribution for audio signal or picture signal is selected by the users.

Figure 26:
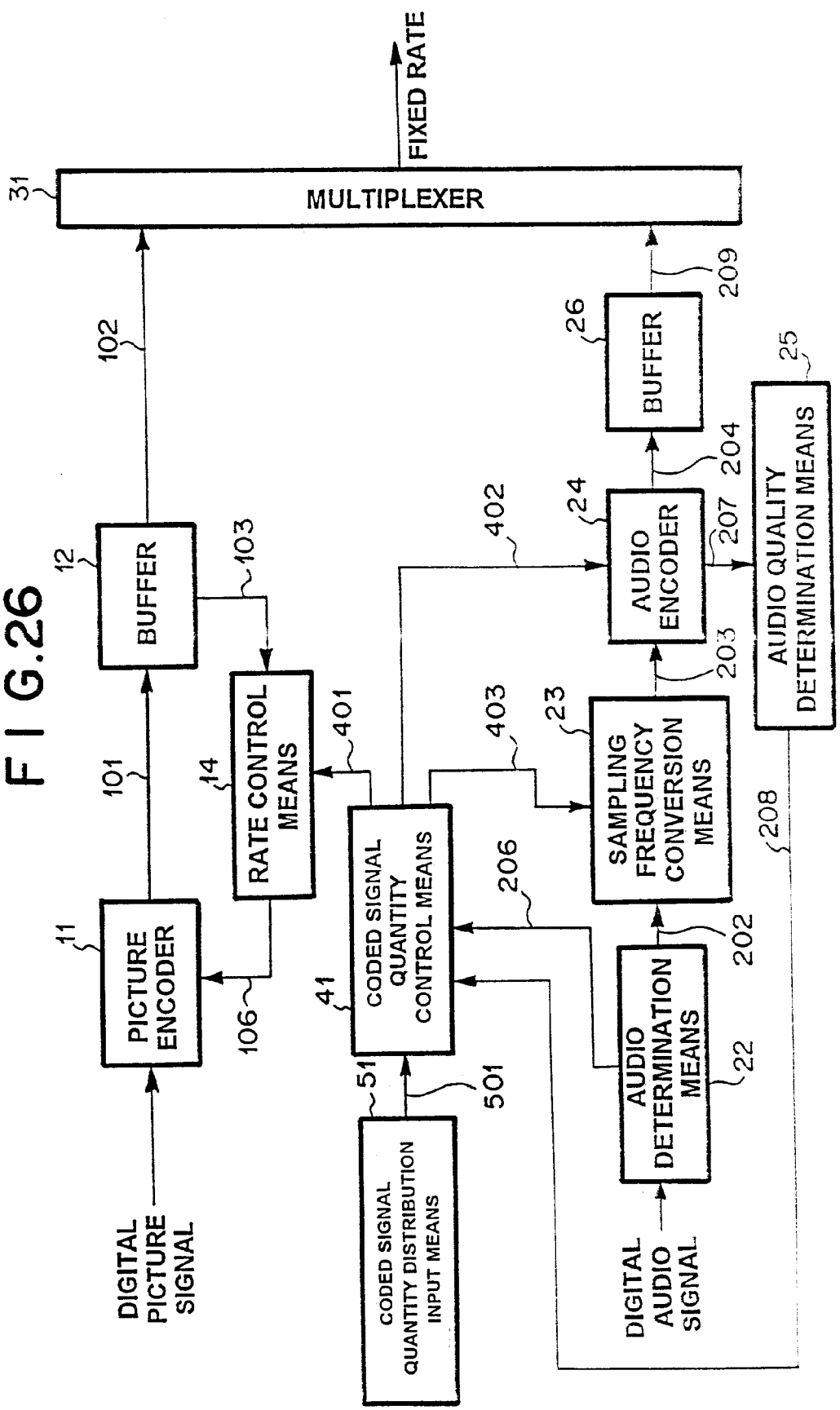
FIG. 26 is a block diagram of 26th mode of embodiment of the picture/audio coding apparatus of the present invention.

A 26th embodiment is shown in FIG. 26. The audio-picture coding apparatus as shown in FIG. 26 comprises picture encoder 11, buffer 12, rate control means 14, audio determination means 22, sampling frequency conversion means 23, audio encoder 24, audio quality determination means 25, buffer 26, multiplexer 31, coded signal quantity control means 41, and coded signal quantity distribution input means 51.

Coded signal quantity control means 41 decides the distribution of the audio and picture signal on the basis of audio characteristics information 206 outputted from audio determination means 22, audio quality information 208 outputted from audio quality determination means 25 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When audio quality information 208 indicates that the audio quality is degraded, the audio code quantity is increased, and picture code quantity is decreased.

On the contrary, when the audio quality is good, the audio code quantity is decreased, while picture code quantity is increased without causing extreme degradation of audio quality.

Thus, the audio quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio determination means 22 determines the characteristics of inputted audio signal 201, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 27:
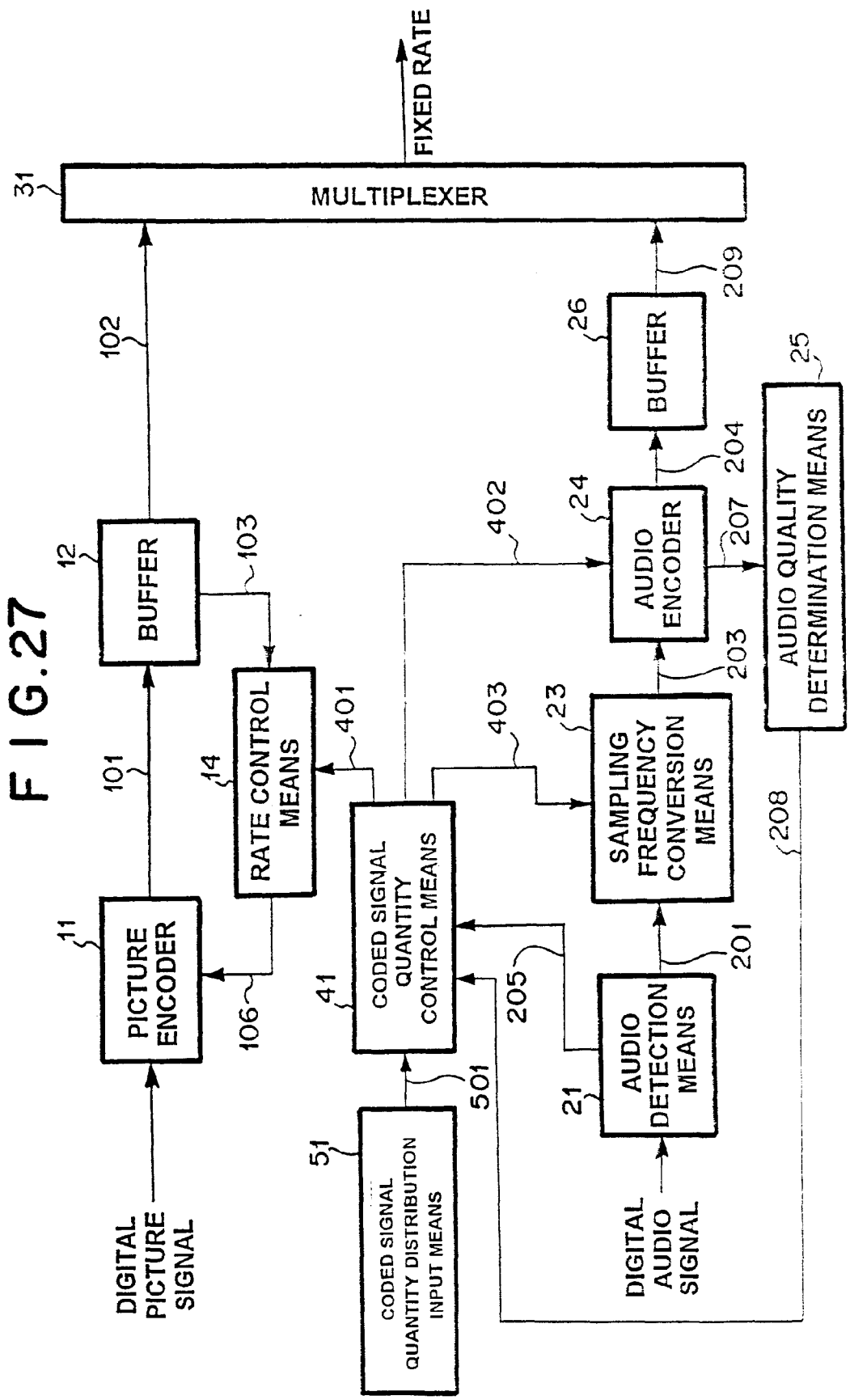
FIG. 27 is a block diagram of 27th mode of embodiment of the picture/audio coding apparatus of the present invention.

A 27th embodiment is shown in FIG. 27. The audio-picture coding apparatus as shown in FIG. 8 comprises picture encoder 11, buffer 12, rate control means 14, audio detection means 21, sampling frequency conversion means 23, audio encoder 24, audio quality determination means 25, buffer 26, multiplexer 31, coded signal quantity control means 41, and coded signal quantity distribution input means 51.

Coded signal quantity control means 41 decides the distribution of the audio and picture signal on the basis of audio presence information 205 outputted from audio detection means 21, audio quality information 208 outputted from audio quality determination means 25 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased, and picture code quantity is decreased.

On the contrary, when audio quality information 208 indicates that the audio quality is good, the audio code quantity is decreased, while picture code quantity is increased so as not to cause extreme degradation of audio quality.

Thus, the audio quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward sampling frequency conversion means 23.

Sampling frequency conversion means 23 converts the sampling frequency of the inputted audio signal 201 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 28:
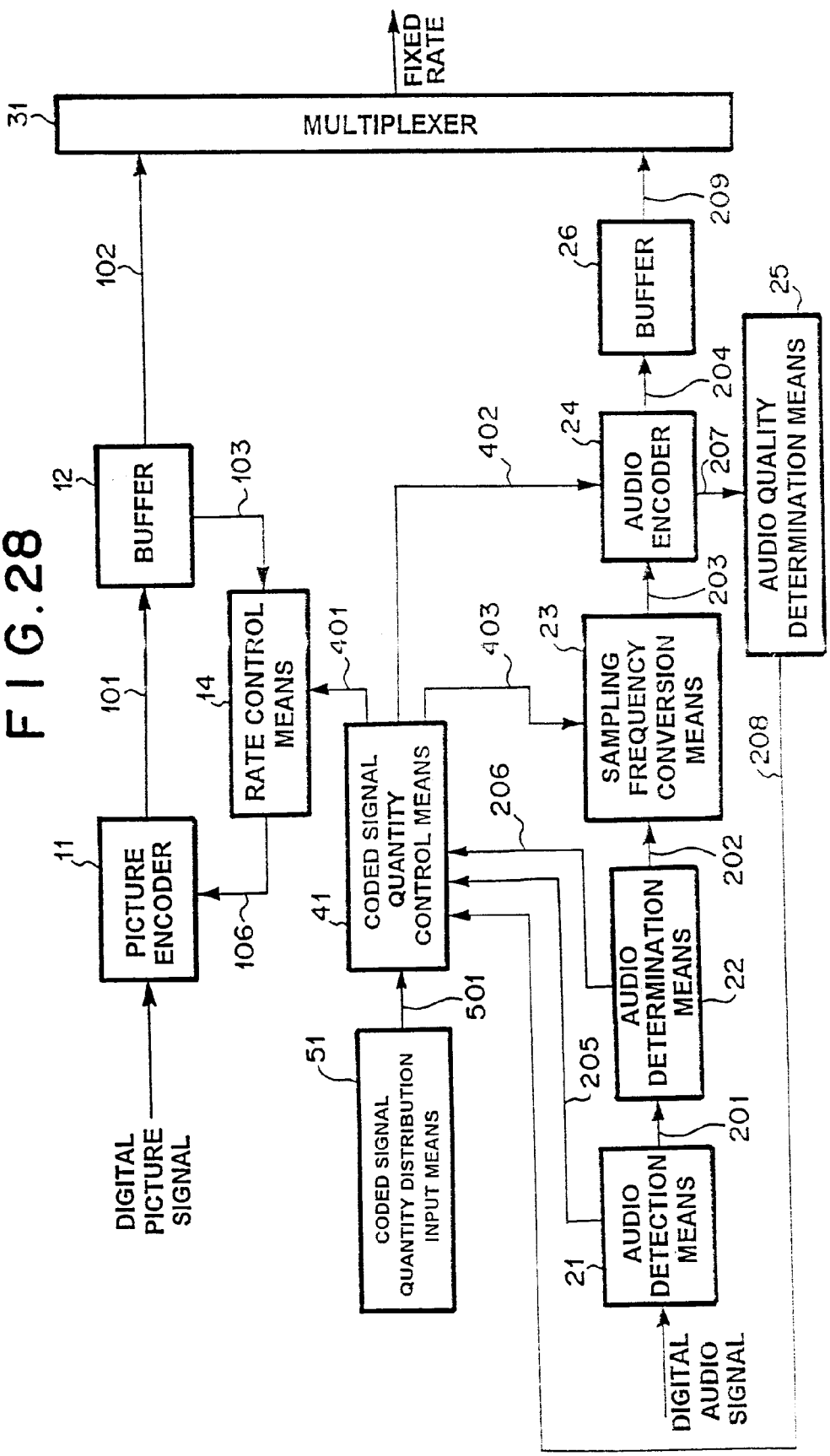
FIG. 28 is a block diagram of 28th mode of embodiment of the picture/audio coding apparatus of the present invention.

A 28th embodiment is shown in FIG. 28. The audio-picture coding apparatus as shown in FIG. 28 comprises picture encoder 11, buffer 12, rate control means 14, audio detection means 21, audio determination means 22, sampling frequency conversion means 23, audio encoder 24, audio quality determination means 25, buffer 26, multiplexer 31, coded signal quantity control means 41, and code quantity distribution information input means 51.

Coded signal quantity control means 41 decides the distribution of the audio and picture signal on the basis of audio presence information 205 outputted from audio detection means 21, audio characteristics information 206 outputted from audio determination means 22, audio quality information 208 outputted from audio quality determination means 25 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When picture audio quality information 208 indicates that the audio quality is degraded, the audio code quantity is increased, and picture code quantity is decreased.

On the contrary, when picture quality information 105 indicates that the audio quality is good, the audio code quantity is decreased, while picture code quantity is increased without causing extreme degradation of audio quality.

Thus, the audio quality is maintained.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward audio determination means 22.

Audio determination means 22 determines the characteristics of inputted audio signal 201, and outputs audio characteristics information 206 toward coded signal quantity control means 41.

Audio determination means 22 also outputs the inputted audio signal as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 29:
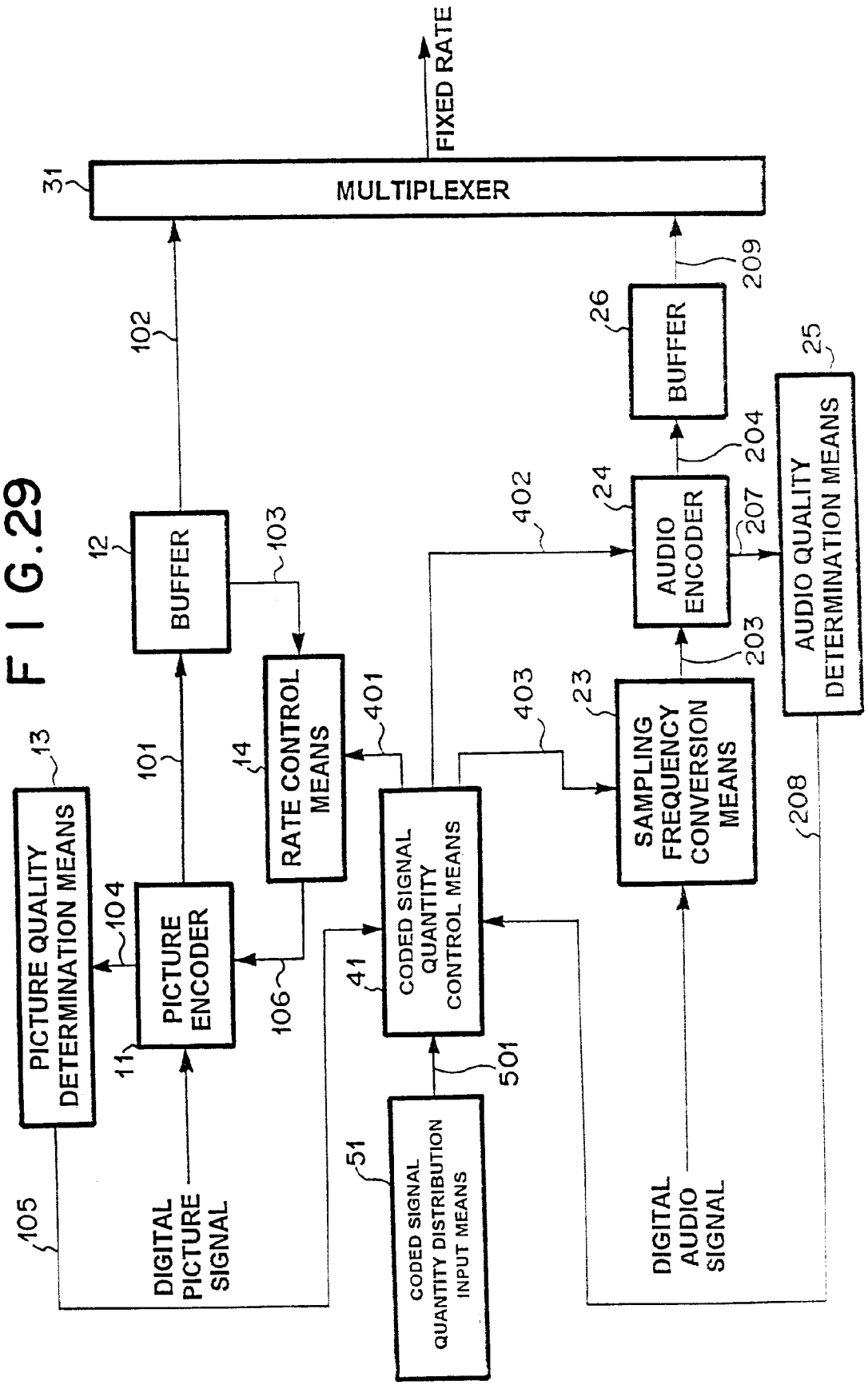
FIG. 29 is a block diagram of 29th mode of embodiment of the picture/audio coding apparatus of the present invention.

A 29th embodiment is shown in FIG. 29. The audio-picture coding apparatus as shown in FIG. 29 comprises picture encoder 11, buffer 12, picture quality determination means 13, rate control means 14, sampling frequency conversion means 23, audio encoder 24, audio quality determination means 25, buffer 26, multiplexer 31, coded signal quantity control means 41, and coded signal quantity distribution input means 51.

Coded signal quantity control means 41 decides the distribution of the audio and picture signal on the basis of audio quality information 208 outputted from audio quality determination means 25, picture quality information 105 outputted from picture quality determination means 13 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased, and picture code quantity is decreased.

On the contrary, when audio quality information 208 indicates that the audio quality is good, the audio code quantity is decreased, while picture code quantity is increased in order to improve the picture quality without causing extreme degradation of audio quality.

When picture quality information 105 indicates that the picture quality is degraded, the audio code quantity is decreased, and picture code quantity is increased.

On the contrary, when picture quality information 105 indicates that the picture quality is good, the audio code quantity is increased, while picture code quantity is decreased without causing extreme degradation of picture quality.

Thus, the qualities of audio and picture signals are controlled as a whole, by utilizing both picture quality information 105 and audio quality information 208.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 30:
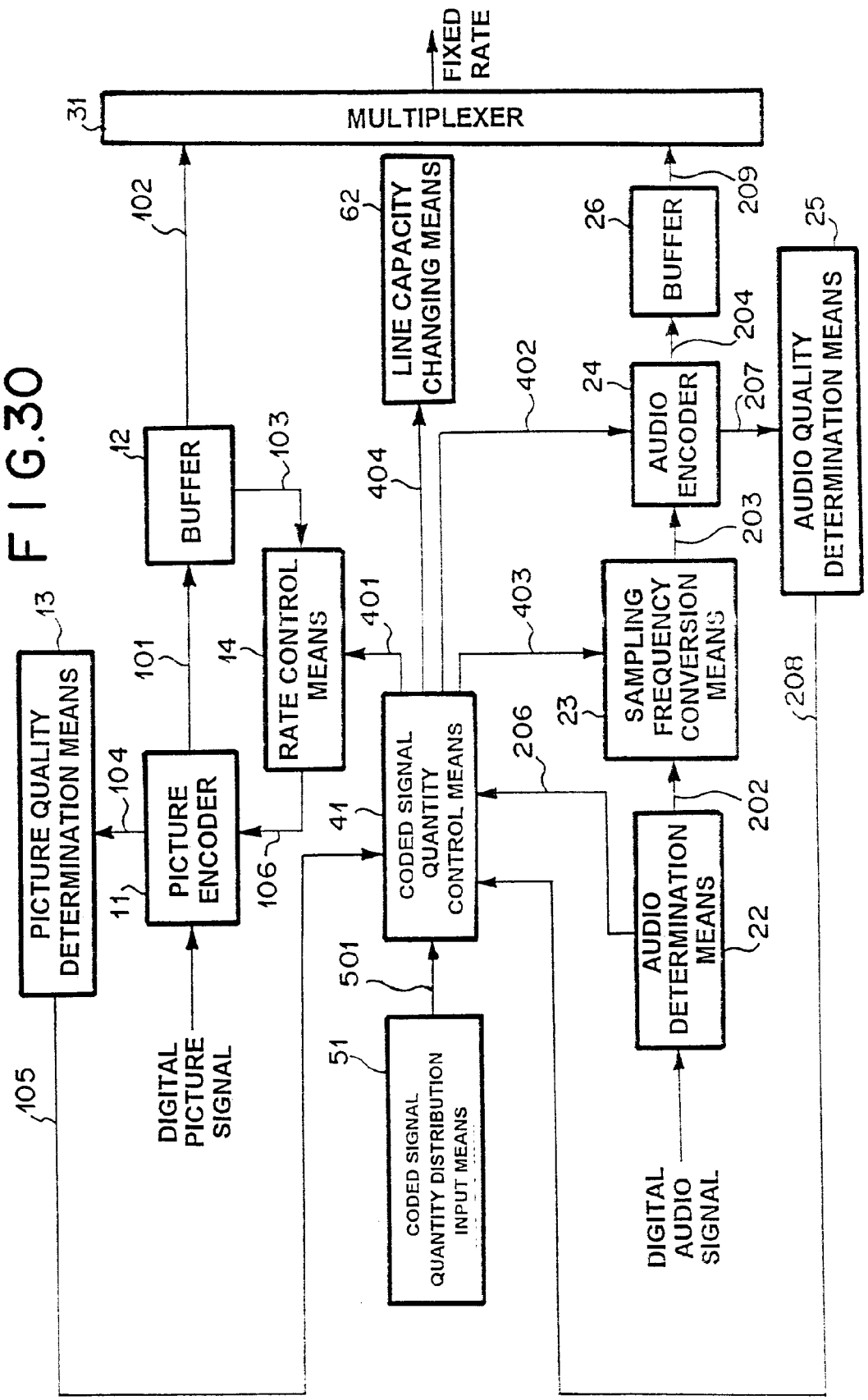
FIG. 30 is a block diagram of 30th mode of embodiment of the picture/audio coding apparatus of the present invention.

A 30th embodiment is shown in FIG. 30. The audio-picture coding apparatus as shown in FIG. 30 comprises picture encoder 11, buffer 12, picture quality determination means 13, rate control means 14, audio determination means 22, sampling frequency conversion means 23, audio encoder 24, audio qulity determination means 25, buffer 26, multiplexer 31, and coded signal quantity control means 41, coded signal quantity distribution input means 51.

Coded signal quantity control means 41 decides the distribution of the audio and picture signal on the basis of audio characteristics information 206 outputted from audio determination means 22, audio quality information 208 outputted from audio quantity determination means 25, picture quality information 105 outputted from picture quality determination means 13 and coded signal quantity distribution information 501 outputted from coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When audio quality information 208 indicates that the audio quality is degraded, the audio code quantity is increased, and picture code quantity is decreased without causing a severe degradation of picture quality so as to improve the audio quality.

On the contrary, when audio quality information 208 indicates that the audio quality is good, the audio code quantity is decreased, while picture code quantity is increased without causing extreme degradation of audio quality so as to improve the picture quality.

Thus, the qualities of audio and picture signals are controlled as a whole, by utilizing both picture quality information 105 and audio quality information 208.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio determination means 22 determines the characteristics of inputted audio signal 201, and outputs audio characteristics information 206 toward coded signal quantity control means 41.

Audio determination means 22 also outputs the inputted audio signal 201 as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 31:
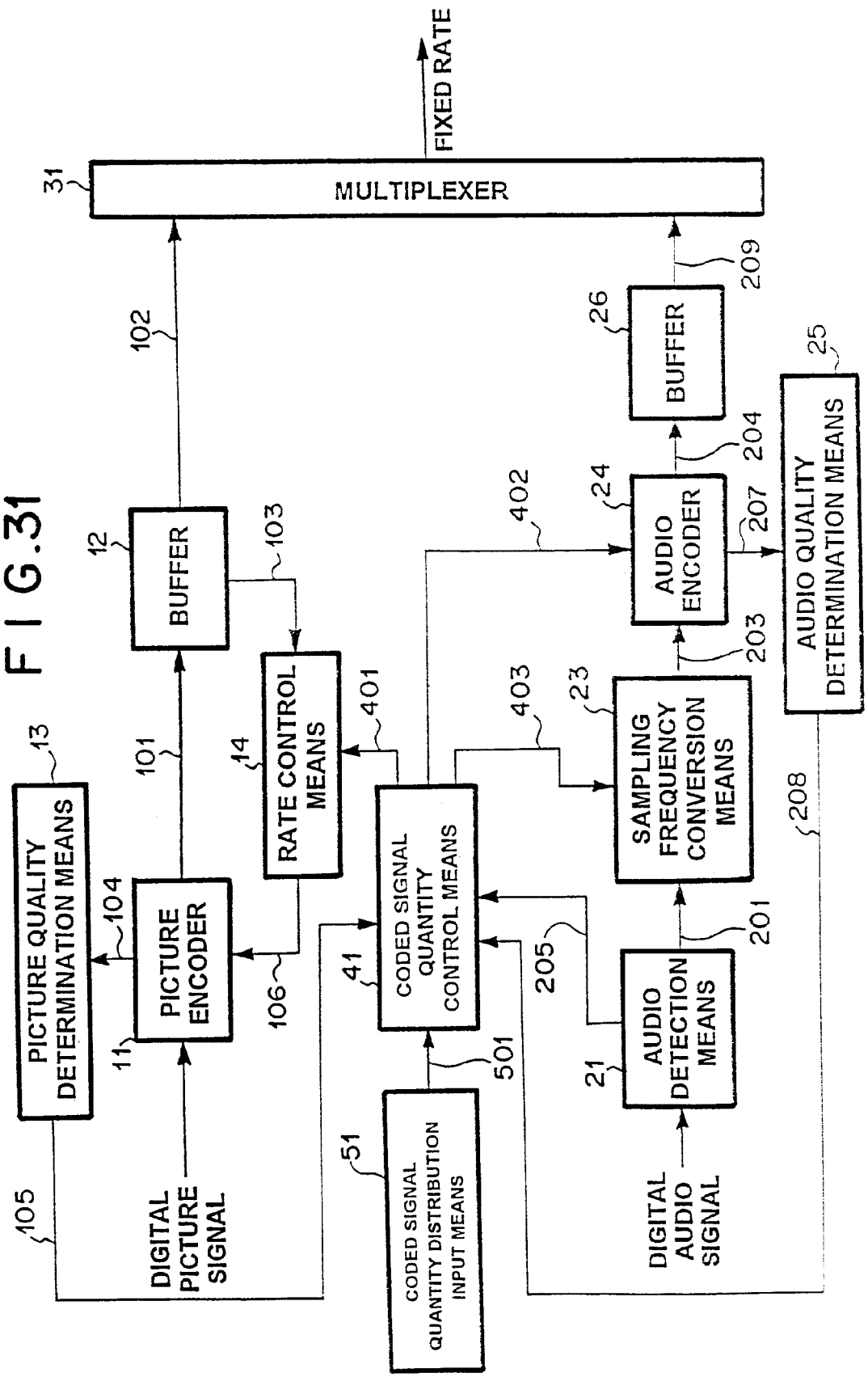
FIG. 31 is a block diagram of 31st mode of embodiment of the picture/audio coding apparatus of the present invention.

A 31st embodiment is shown in FIG. 31. The audio-picture coding apparatus as shown in FIG. 31 comprises picture encoder 11, buffer 12, picture quality determination means 13, rate control means 14, audio detection means 21, sampling frequency conversion means 23, audio encoder 24, audio quality determination means 25, buffer 26, multiplexer 31, coded signal quantity control means 41, and coded signal quantity distribution input means 51.

Coded signal quantity control means 41 decides the distribution of the audio and picture signal on the basis of audio presence information 205 outputted from audio detection means 21 audio quality infromation 208 outputted from audio quality determination means 25 and coded signal quantity distribution information 501 outputted fromn coded signal quantity distribution input means 51, then outputs sampling frequency information 403 toward sampling frequency conversion means 23, outputs coded audio signal quantity information 402 toward audio encoder 24, and outputs coded picture signal quantity information 401 toward rate control means 14.

When audio quality information 208 indicates that the audio quality is degraded, the audio code quantity is increased, and picture code quantity is decreased.

On the contrary, when audio quality information 208 indicates that the audio quality is good, the audio code quantity is decreased, while picture code quantity is increased without causing extreme degradation of audio quality.

Thus, the audio quality is maintained.

When picture quality information 105 indicates that the picture quality is degraded, the audio code quantity is decreased, and picture code quantity is increased without causing a severe degradation of audio quality so as to improve the picutre quality.

On the contrary, when picture quality information 105 indicates that the picture quality is good, the audio code quantity is increased, while picture code quantity is decreased without causing extreme degradation of picture quality so as to improve the audio quality.

Thus, the qualities of audio and picture signals are controlled as a whole, by utilizing both picture quality information 105 and audio quality information 208.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal and outputs audio signal presence information 205 toward code quantity control means.

Audio detection means 21 also outputs audio signal 201 as is inputted toward audio determination means 22.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 32:
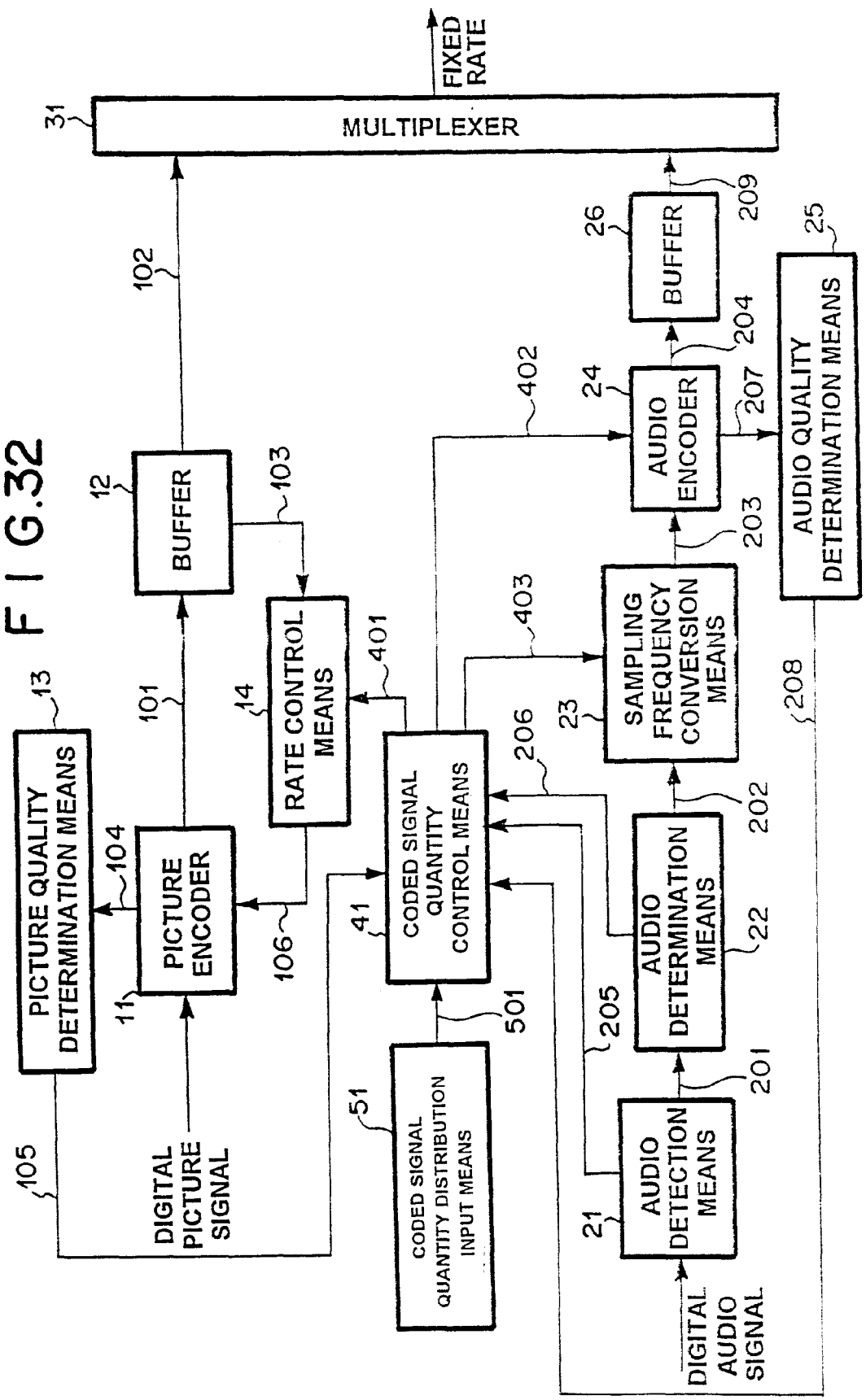
FIG. 32 is a block diagram of 32nd mode of embodiment of the picture/audio coding apparatus of the present invention.

A 32nd embodiment is shown in FIG. 32. The audio-picture coding apparatus as shown in FIG. 32 comprises picture encoder 11, buffer 12, picture quality determination means 13, rate control means 14, audio detection means 21, audio determination means 22, sampling frequency conversion means 23, audio encoder 24, audio quality determination means 25, buffer 26, multiplexer 31, coded signal quantity control means 41, and coded signal quantity distribution input means 51.

Coded signal quantity control means 41 decides the distribution of the audio and picture signal on the basis of audio presence information 205 outputted from audio detection means 21, audio characteristics information 206 outputted from audio determination means 22, audio quality information 208 outputted from audio quality determination means 25, picture quality information 105 outputted from picture quality determination means 13 and coded signal quantity distribution information 501 outputted from code quantity distribution input means 52, then outputs sampling frequency information 403 toward sampling frequency conversion means 23, outputs coded audio signal quantity information 402 toward audio encoder 24, and outputs coded picture signal quantity information 401 toward rate control means 14.

For example, when the audio characteristics information 206 is of human voice, a format and rate for coding suitable for the human voice are determined.

Further, for example, when audio characteristics information 206 is of music, a format and rate for coding suitable for the music are determined.

After determining the format and rate of coding, sampling frequency information 403 is fed into sampling frequency conversion means 23, and coded audio signal quantity information 402 is fed into audio encoder 24.

When the audio code quantity increases, the picture code quantity is decreased by feeding coded picture signal quantity information 401 toward rate control means 14. On the other hand, when the audio code quantity decreases, the picture code quantity is increased. Thus, the whole code quantity is limited adaptively within a prescribed bandwidth of the available transmission channel.

When audio quality information 208 indicates that the picture quality is degraded, the audio code quantity is increased, and picture code quantity is decreased.

On the contrary, when audio quality information 208 indicates that the audio quality is good, the audio code quantity is decreased, while picture code quantity is increased without causing extreme degradation of picture quality.

Thus, the audio quality is maintained.

When picture quality information 105 indicates that the picture quality is degraded, the audio code quantity is decreased, and picture code quantity is increased without causing a severe degradation of audio quality so as to improve the picutre quality.

On the contrary, when picture quality information 105 indicates that the picture quality is good, the audio code quantity is increased, while picture code quantity is decreased without causing extreme degradation of picture quality so as to improve the audio quality.

Thus, the qualities of audio and picture signals are controlled as a whole, by utilizing both picture quality information 105 and audio quality information 208.

Coded signal quantity distribution information 501 is information concerning a distribution of available codes for audio and picture signals.

In order to output audio and picture codes according to the distribution, coded signal quantity control means 41 outputs coded audio signal quantity information 402 toward audio encoder 24, and outputs coded picture signal quantity information 401 toward rate control means 14.

When audio signal presence information 205 indicates that audio signal is absent, sampling frequency information 403 and coded audio signal quantity information 402 are fed into sampling frequency conversion means 23 and audio code encoder 24, respectively, for stopping calculations.

Further, coded picture signal quantity information 401 for re-allocating the code quantity once allocated for audio signal is fed into rate control means 14.

Picture encoder 11 encodes the inputted picture signal on the basis of the variable length coding format, and then outputs coded picture signal 101 toward buffer 12, and controls the code quantity to be generated on the basis of generated coded picture signal quantity information 106 outputted from rate control means 14.

Picture encoder 11 also outputs picture quality information 104 of the coded frame toward picture quality determination means 13.

Buffer 12 outputs the stored picture code as coded picture signal 102 toward multiplexer 31.

Picture quality determination means 13 calculates a fluctuation of picture quality on the basis of picture quality information 104, and outputs picture quality information 105 toward coded signal quantity control means 41.

Rate control means 14 decides the code quantity to be generated by picture code encoder 11 on the basis of data remainder information 103 outputted from buffer 12 and coded picture signal quantity information 401 outputted from coded signal quantity control means 41, and outputs generated code quantity information 106 toward picture encoder 11.

Audio detection means 21 detects the presence or absence of audio signal, and outputs audio signal presence information 205 toward code quantity control means.

Audio detection means 21 also outputs audio signal 201 as is inputted toward audio determination means 22.

Audio determination means 22 determines the characteristics of inputted audio signal 201, and outputs audio characteristics information 206 toward coded signal quantity control means 41.

Audio determination means 22 also outputs the inputted audio signal 201 as it is as audio signal 202 toward sampling frequency conversion means 23.

Sampling frequency conversion means 23 converts the sampling frequency of the inputted audio signal 202 on the basis of sampling frequency information 403 outputted from coded signal quantity control means 41, and outputs converted audio signal 203 toward audio encode 24.

Audio encoder 24 encodes audio signal 203, according to a selected format and rate of coding, on the basis of coded audio signal quantity information 402 outputted from coded signal quantity control means 41, and outputs coded audio signal 204 toward buffer 26.

Audio quality determination means 25 calculates a fluctuation of audio quality on the basis of audio quality information 207 outputted from audio encoder 24, and outputs audio quality information 208 toward coded signal quantity control means 41.

Buffer 26 outputs the stored audio code as coded audio signal 209 toward multiplexer 31.

Multiplexer 31 multiplexes coded picture signal 102 from buffer 12 and coded audio signal 209 from buffer 26 in order to transmit a series of combined bit stream onto a non-shown communication channel.

Coded signal quantity distribution input means 51 distributes available quantity of codes for audio and picture signals, on the basis of inputs such as requests of user.

Therefore, a priority of distribution for audio signal or picture signal is selected by the users.

Figure 33:
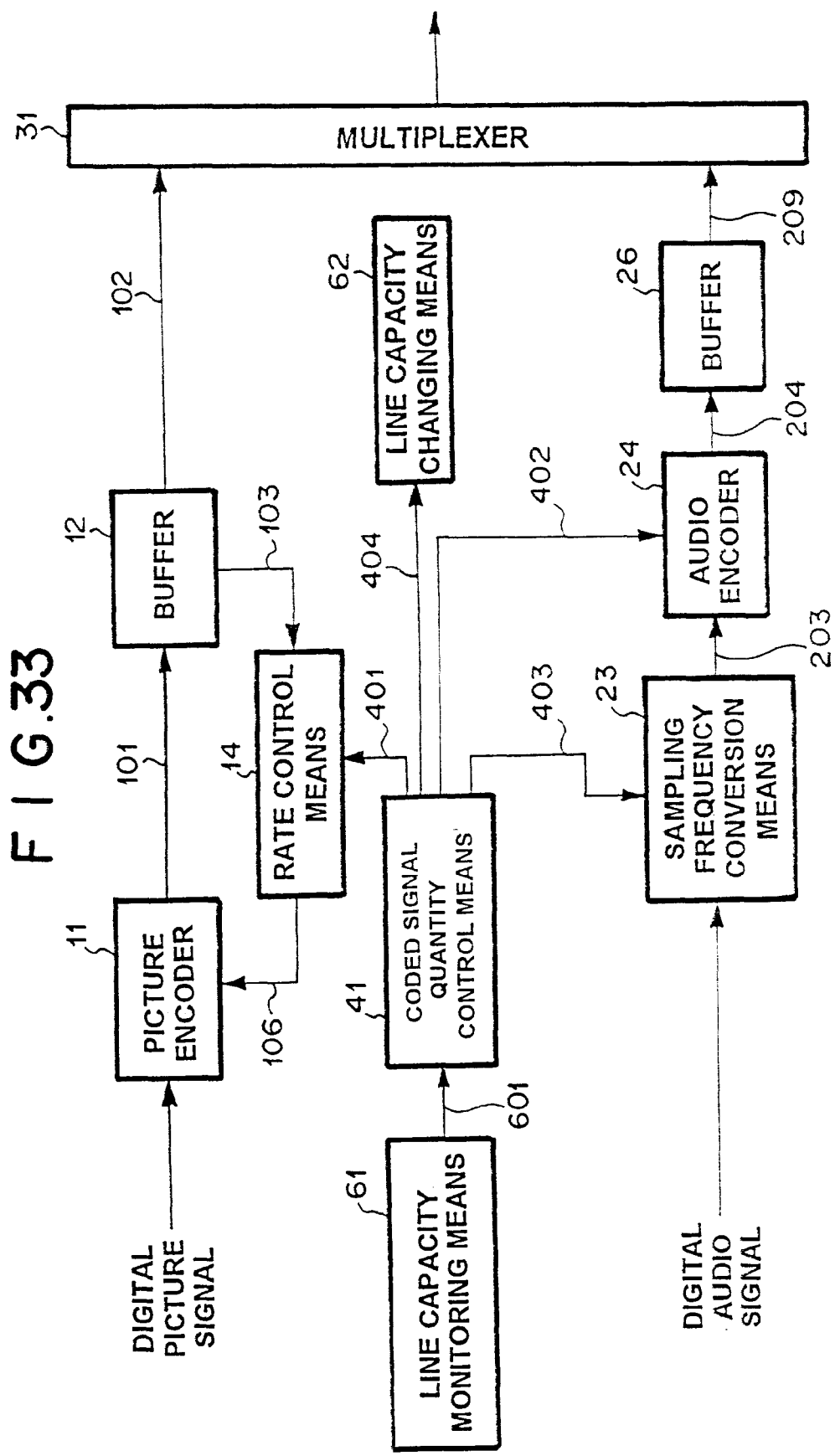
FIG. 33 is a block diagram of 33rd mode of embodiment of the picture/audio coding apparatus of the present invention.

A 33rd embodiment is shown in FIG. 33. The audio-picture coding apparatus as shown in FIG. 32 comprises picture encoder 11, buffer 12, rate control means 14, sampling frequency conversion means 23, audio encoder 24, buffer 26, multiplexer 31, coded signal quantity control means 41, line capacity monitoring means 61, and line capacity changing means 62.

The 33rd embodiment operates in the same way as the 1st embodiment, except coded signal quantity control means 41, line capacity monitoring means 61, and line capacity changing means 62.

In addition to the operation as the 1st embodiment, coded signal quantity control means 41 decides the whole quantity of code for picture and audio signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404.

Figure 34:
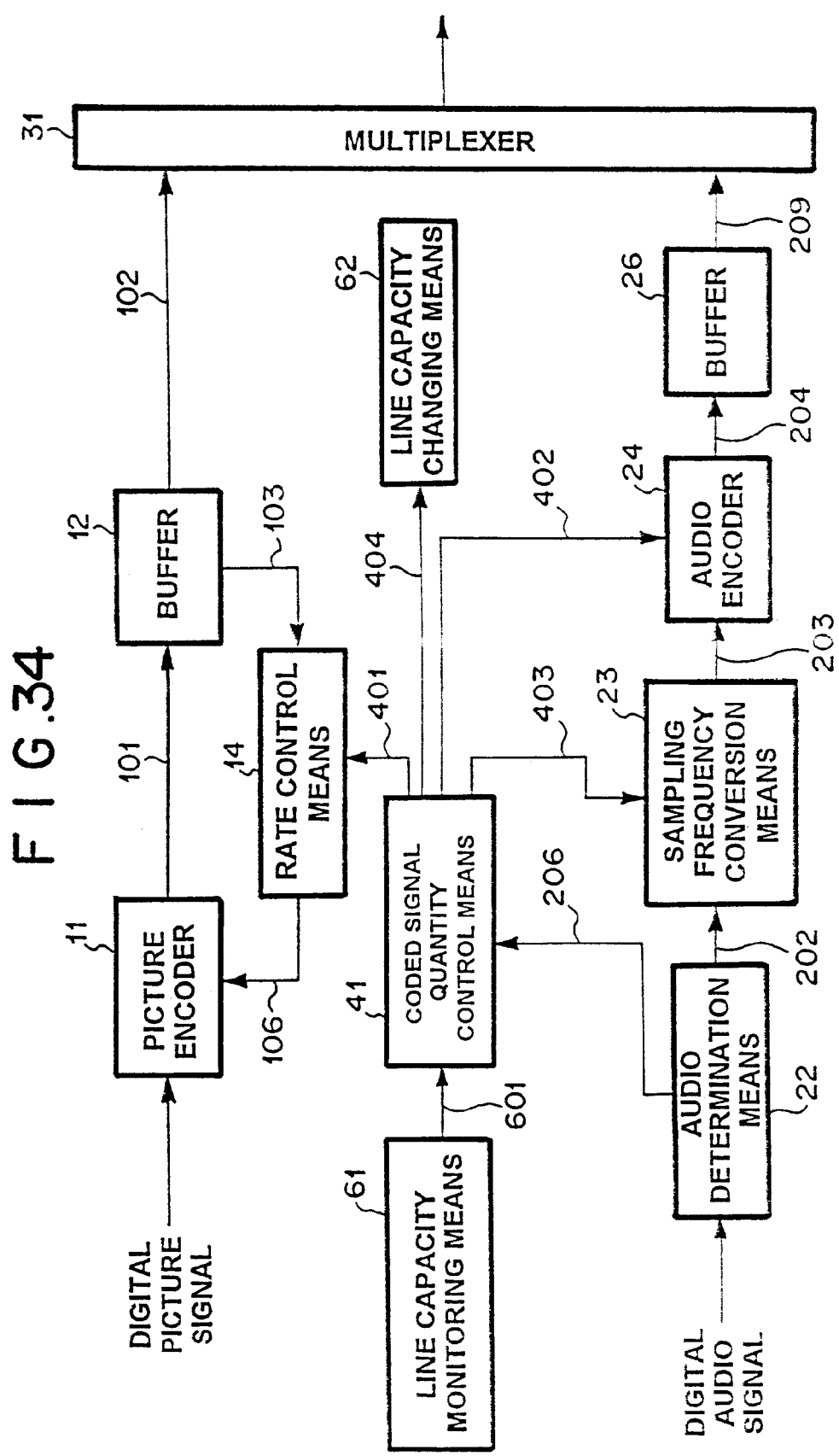
FIG. 34 is a block diagram of 34th mode of embodiment of the picture/audio coding apparatus of the present invention.

A 34th embodiment is shown in FIG. 34. The audio-picture coding apparatus as shown in FIG. 34 comprises picture encoder 11, buffer 12, rate control means 14, audio determination means 22, sampling frequency conversion means 23, audio encoder 24, buffer 26, multiplexer 31, coded signal quantity control means 41, line capacity monitoring means 61, and line capacity changing means 62.

The 34th embodiment operates in the same way as the 2nd embodiment, except coded signal quantity control means 41, line capacity monitoring means 61, and line capacity changing means 62.

In addition to the operation as the 2nd embodiment, coded signal quantity control means 41 decides the whole quantity of code for picture and audio signals on of on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404. monitors traffics on the transmission line.

Figure 35:
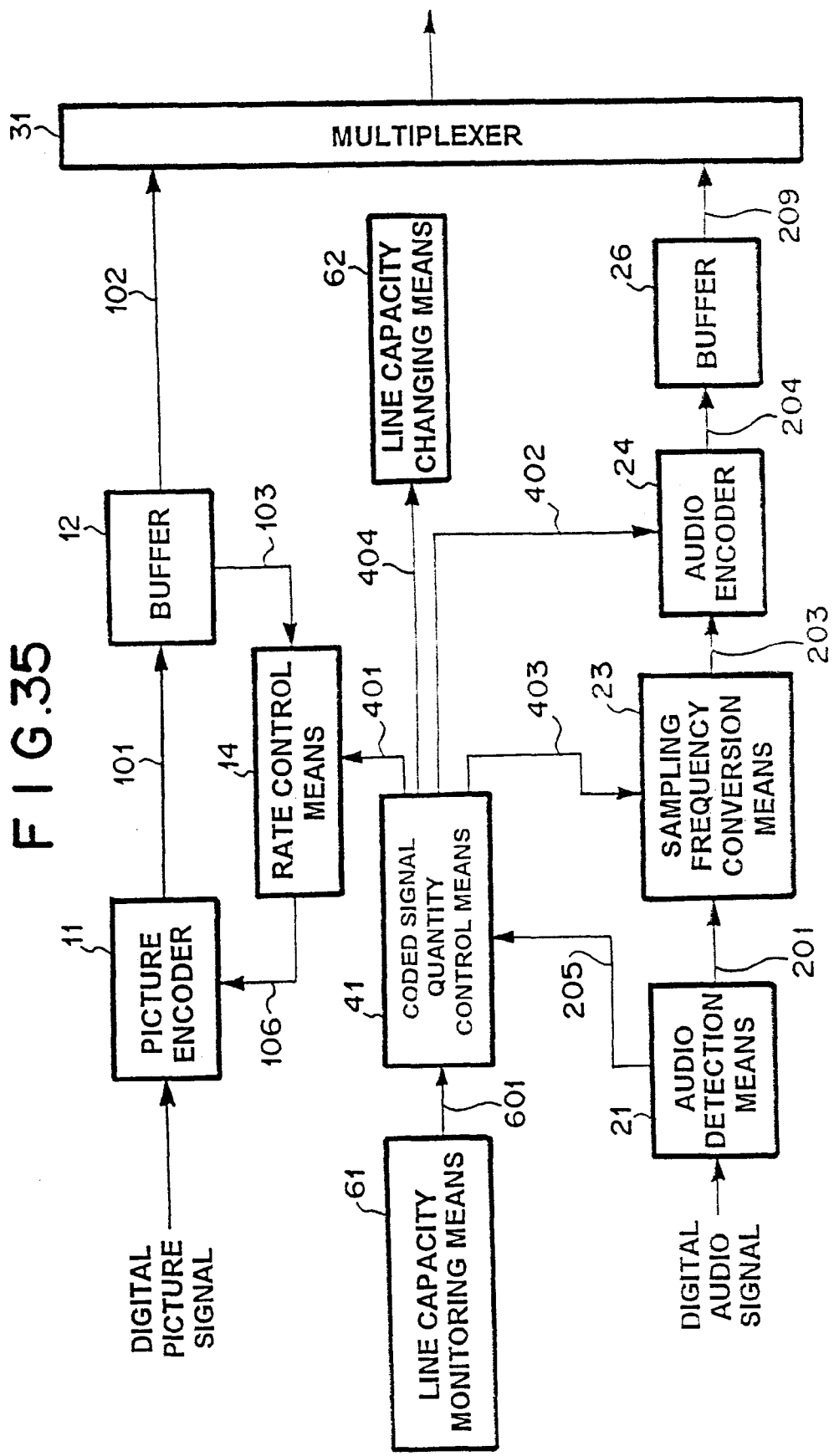
FIG. 35 is a block diagram of 35th mode of embodiment of the picture/audio coding apparatus of the present invention.

A 35th embodiment is shown in FIG. 35. The audio-picture coding apparatus as shown in FIG. 34 comprises picture encoder 11, buffer 12, rate control means 14, audio detection means 21, sampling frequency conversion means 23, audio encoder 24, buffer 26, multiplexer 31, coded signal quantity control means 41, line capacity monitoring means 61, and line capacity changing means 62.

The 35th embodiment operates in the same way as the 3rd embodiment, except coded signal quantity control means 41, line capacity monitoring means 61, and line capacity changing means 62.

In addition to the operation as the 3rd embodiment, coded signal quantity control means 41 decides the whole quantity of code for picture and audio signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404. monitors traffics on the transmission line.

Figure 36:
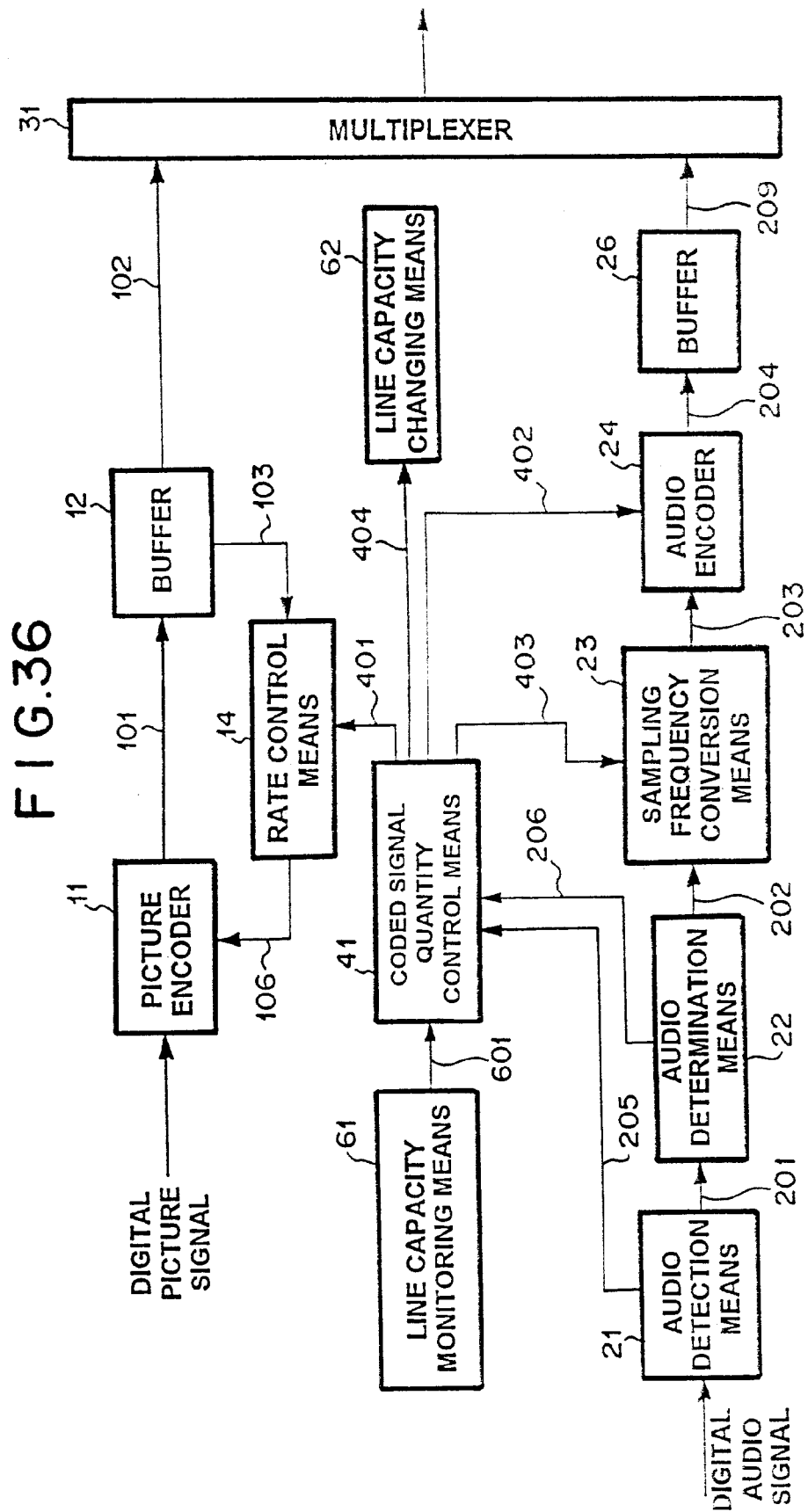
FIG. 36 is a block diagram of 36th mode of embodiment of the picture/audio coding apparatus of the present invention.

A 36th embodiment is shown in FIG. 36. The audio-picture coding apparatus as shown in FIG. 36 comprises picture encoder 11, buffer 12, rate control means 14, audio detection means 21, audio determination means 22, sampling frequency conversion means 23, audio encoder 24, buffer 26, multiplexer 31, coded signal quantity control means 41, line capacity monitoring means 61, and line capacity changing means 62.

The 36th embodiment operates in the same way as the 4th embodiment, except coded signal quantity control means 41, line capacity monitoring means 61, and line capacity changing means 62.

In addition to the operation as the 4th embodiment, coded signal quantity control means 41 decides the whole quantity of code for picture and audio signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404. monitors traffics on the transmission line.

Figure 37:
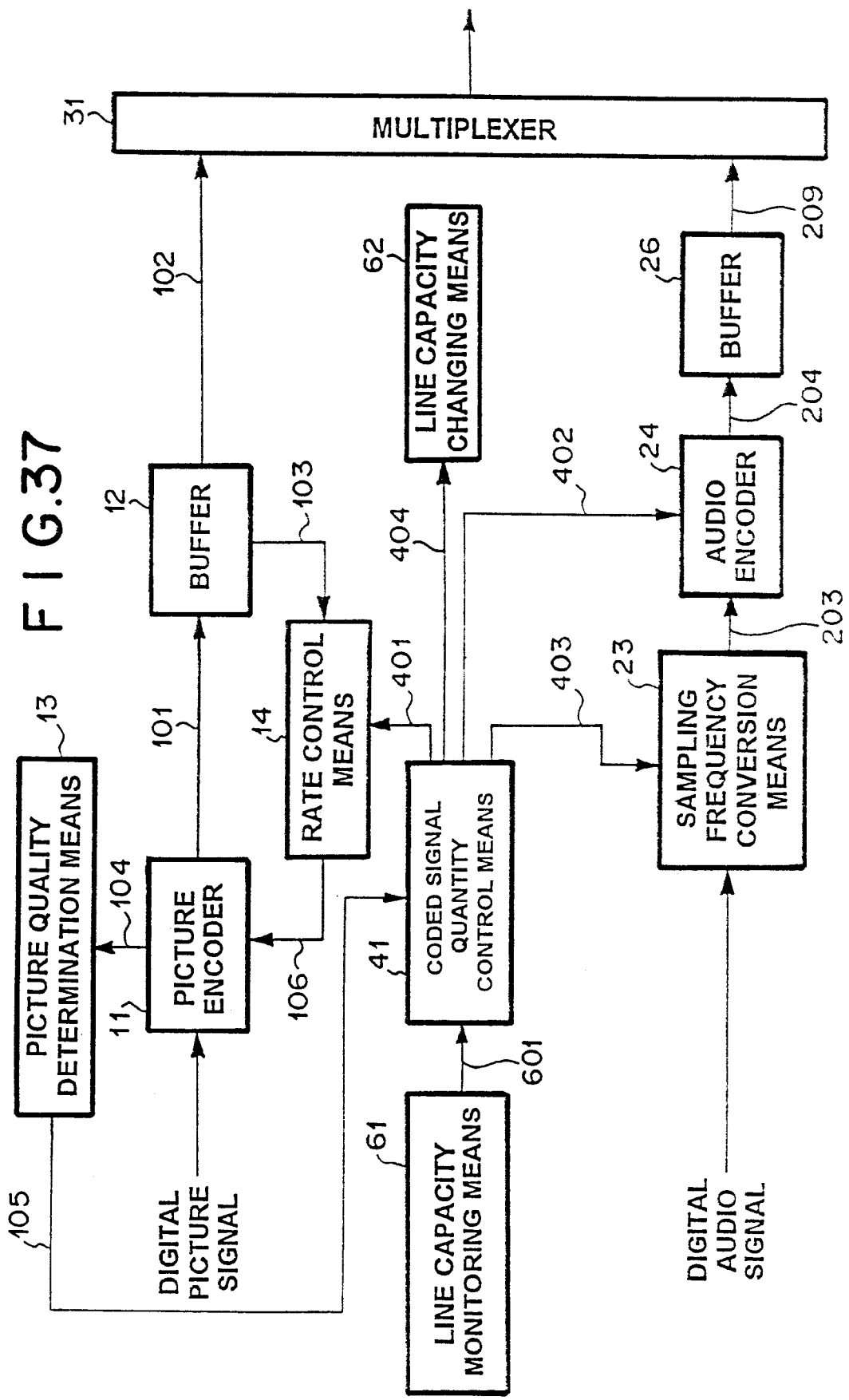
FIG. 37 is a block diagram of 37th mode of embodiment of the picture/audio coding apparatus of the present invention.

A 37th embodiment is shown in FIG. 37. The audio-picture coding apparatus as shown in FIG. 37 comprises picture encoder 11, buffer 12, rate control means 14, sampling frequency conversion means 23, audio encoder 24, buffer 26, multiplexer 31, coded signal quantity control means 41, line capacity monitoring means 61, and line capacity changing means 62.

The 37th embodiment operates in the same way as the 5th embodiment, except coded signal quantity control means 41, line capacity monitoring means 61, and line capacity changing means 62.

In addition to the operation as the 5th embodiment, coded signal quantity control means 41 decides the whole quantity of code for picture and audio signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 38:
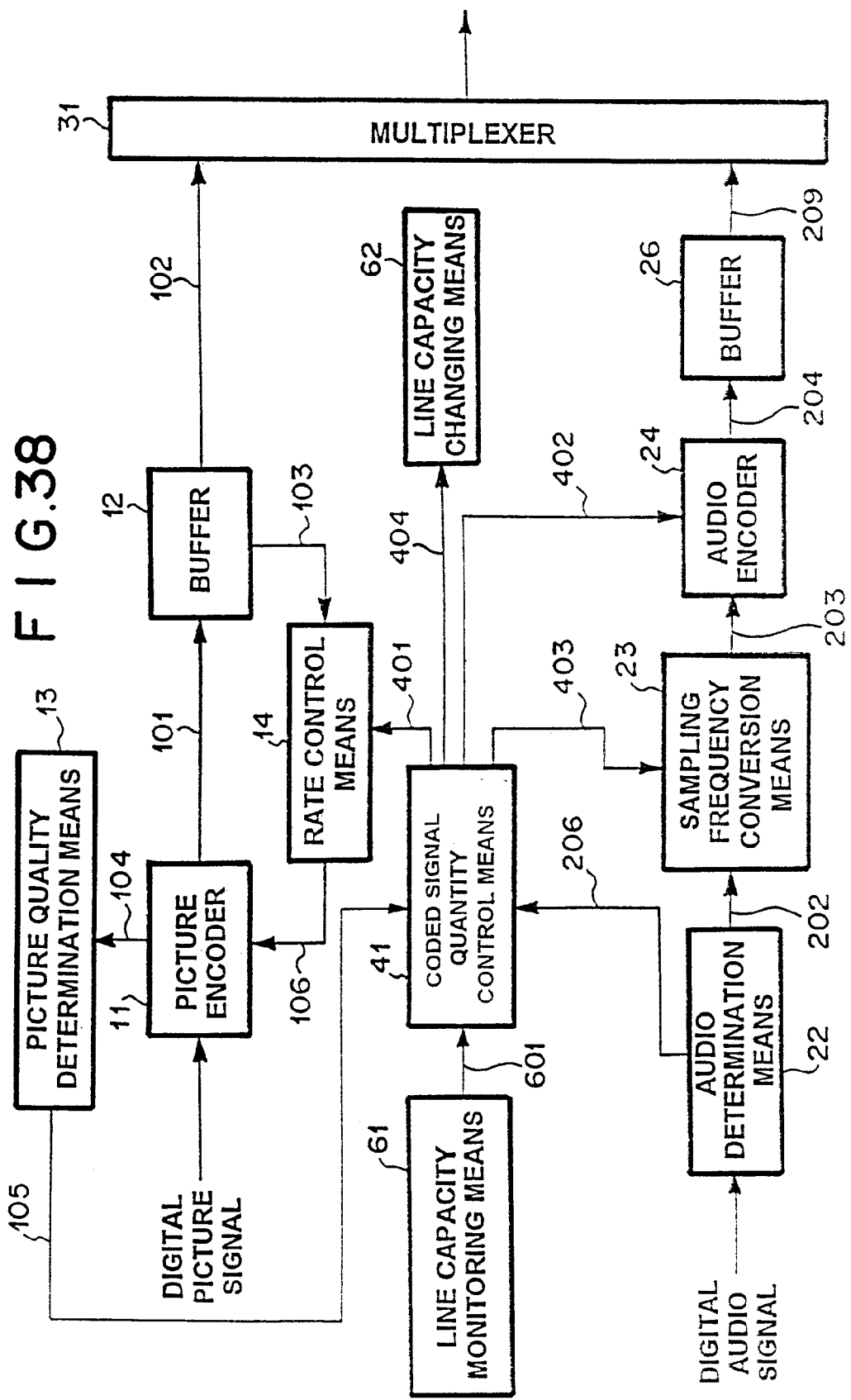
FIG. 38 is a block diagram of 38th mode of embodiment of the picture/audio coding apparatus of the present invention.

A 38th embodiment is shown in FIG. 38. The audio-picture coding apparatus as shown in FIG. 38 comprises picture encoder 11, buffer 12, picture quality determination means 13, rate control means 14, audio determination means 22, sampling frequency conversion means 23, audio encoder 24, buffer 26, multiplexer 31, coded signal quantity control means 41, line capacity monitoring means 61, and line capacity changing means 62.

The 38th embodiment operates in the same way as the 6th embodiment, except coded signal quantity control means 41, line capacity monitoring means 61, and line capacity changing means 62.

In addition to the operation as the 6th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404. monitors traffics on the transmission line.

Figure 39:
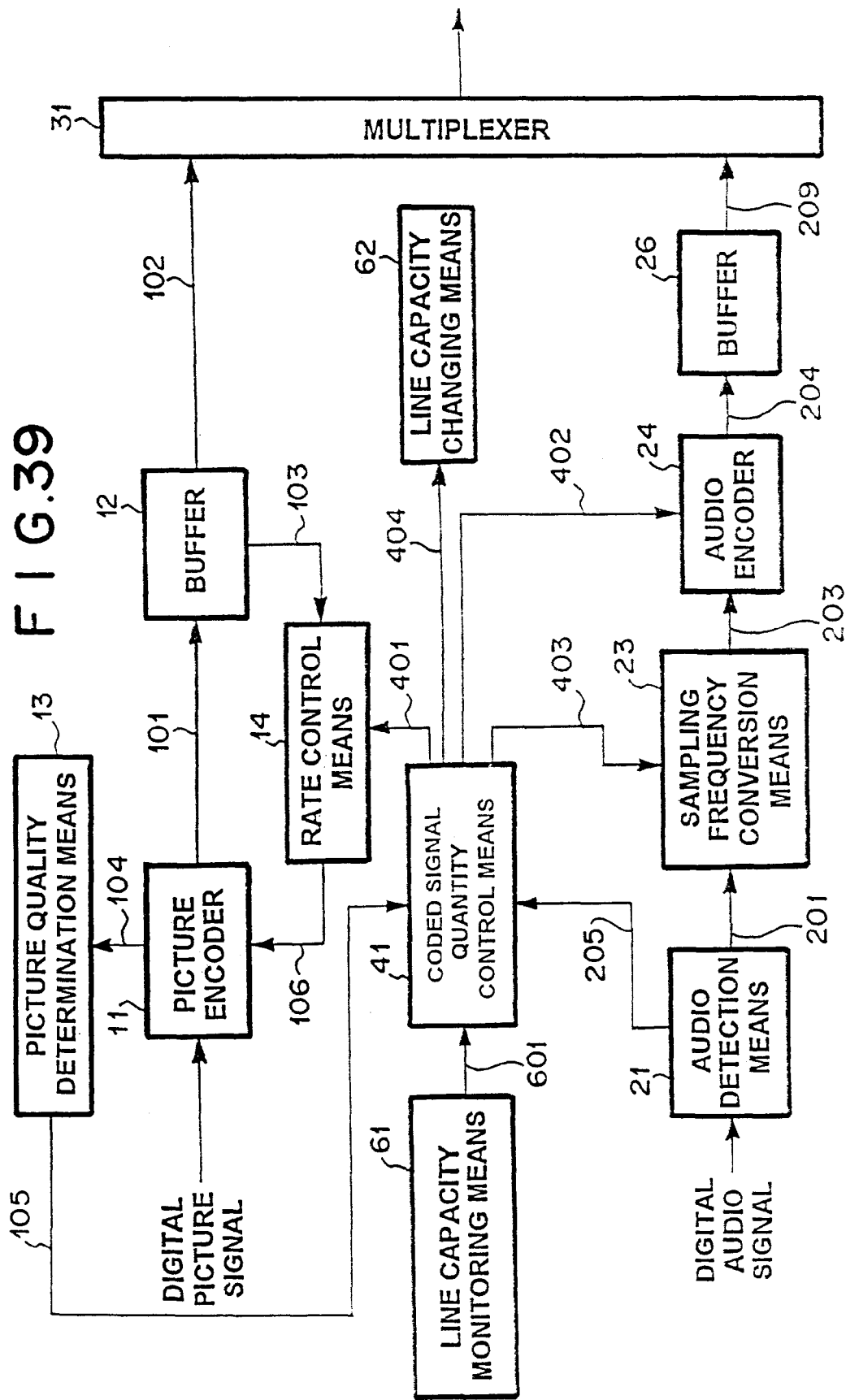
FIG. 39 is a block diagram of 39th mode of embodiment of the picture/audio coding apparatus of the present invention.

A 39th embodiment is shown in FIG. 39. The audio-picture coding apparatus as shown in FIG. 39 comprises picture encoder 11, buffer 12 picture quality determination means 13, rate control means 14, audio detection means 21, sampling frequency conversion means 23, audio encoder 24, buffer 26, multiplexer 31, coded signal quantity control means 41, line capacity monitoring means 61, and line capacity changing means 62.

The 39th embodiment operates in the same way as the 7th embodiment, except coded signal quantity control means 41, line capacity monitoring means 61, and line capacity changing means 62.

In addition to the operation as the 7th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 40:
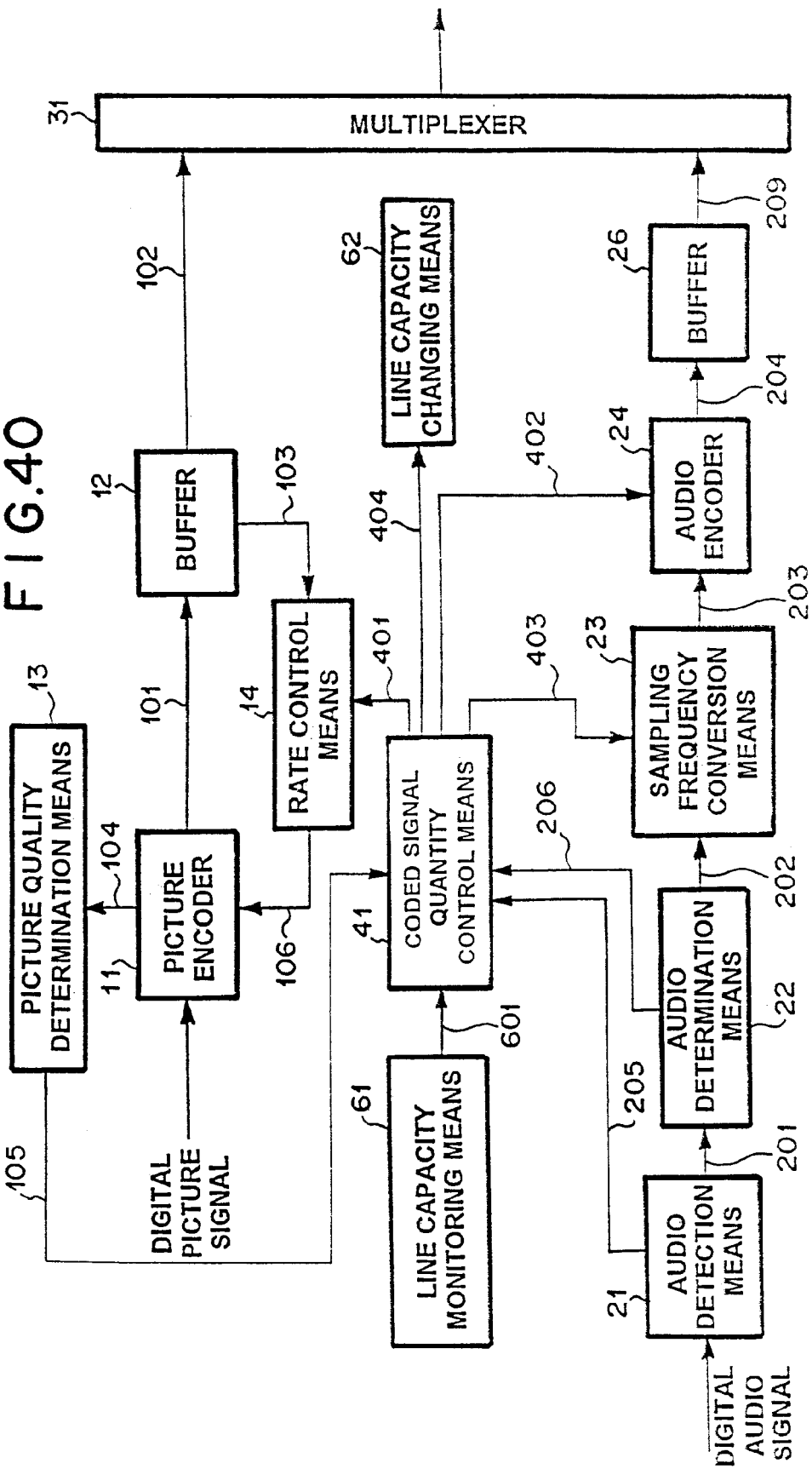
FIG. 40 is a block diagram of 40th mode of embodiment of the picture/audio coding apparatus of the present invention.

A 40th embodiment is shown in FIG. 40. The audio-picture coding apparatus as shown in FIG. 40 comprises picture encoder 11, buffer 12, picture quality determination means 13, rate control means 14, audio detection means 21, audio determination means 22, sampling frequency conversion means 23, audio encoder 24, buffer 26, multiplexer 31, coded signal quantity control means 41, line capacity monitoring means 61, and line capacity changing means 62.

The 40th embodiment operates in the same way as the 8th embodiment, except coded signal quantity control means 41, line capacity monitoring means 61, and line capacity changing means 62.

In addition to the operation as the 8th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 41:
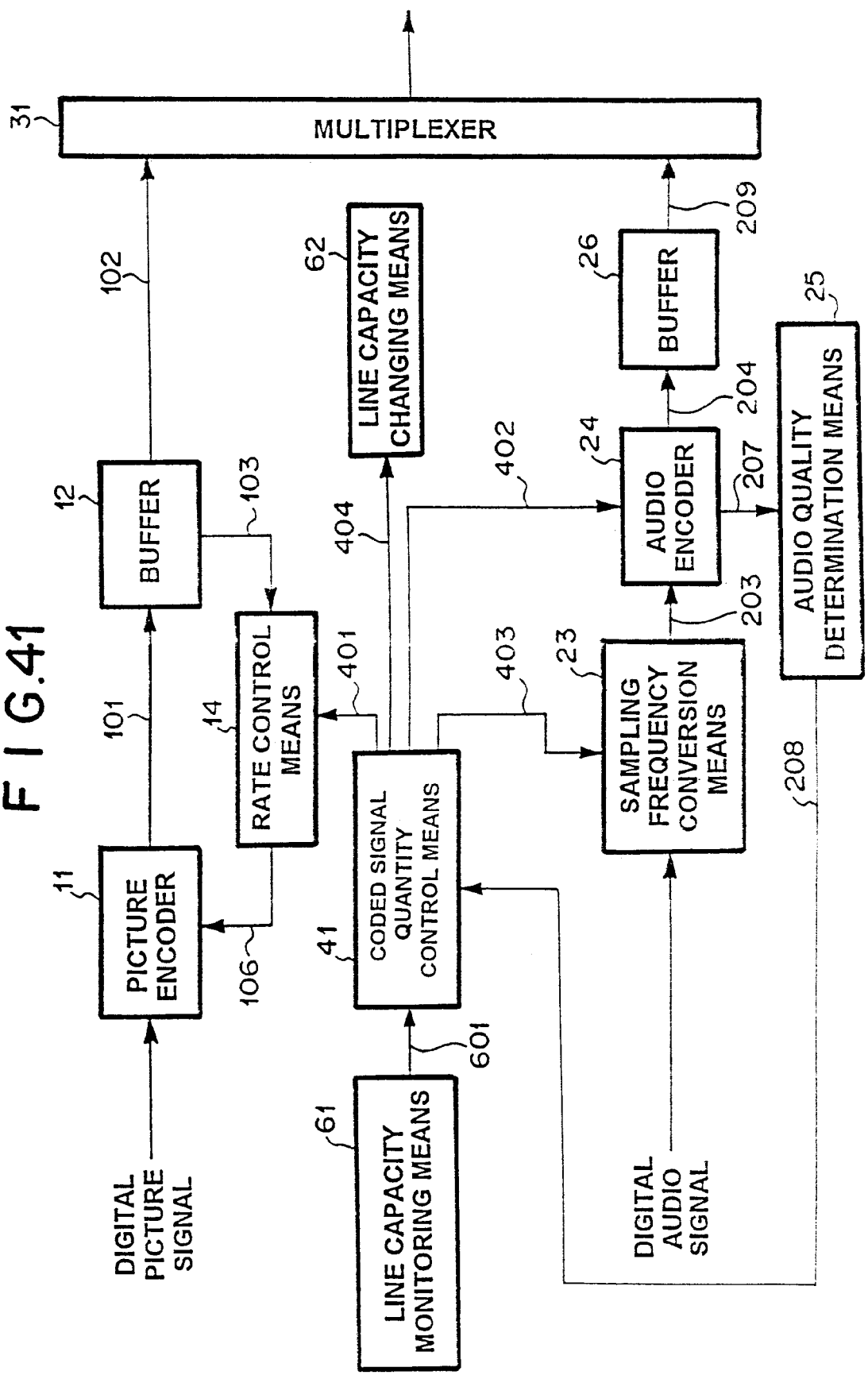
FIG. 41 is a block diagram of 41st mode of embodiment of the picture/audio coding apparatus of the present invention.

A 41st embodiment is shown in FIG. 41. The audio-picture coding apparatus as shown in FIG. 41 comprises picture encoder 11, buffer 12, rate control means 14, sampling frequency conversion means 23, audio encoder 24, audio quality determination means 25, buffer 26, multiplexer 31, coded signal quantity control means 41, line capacity monitoring means 61, and line capacity changing means 62.

The 41st embodiment operates in the same way as the 9th embodiment, except coded signal quantity control means 41, line capacity monitoring means 61, and line capacity changing means 62.

In addition to the operation as the 7th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 42:
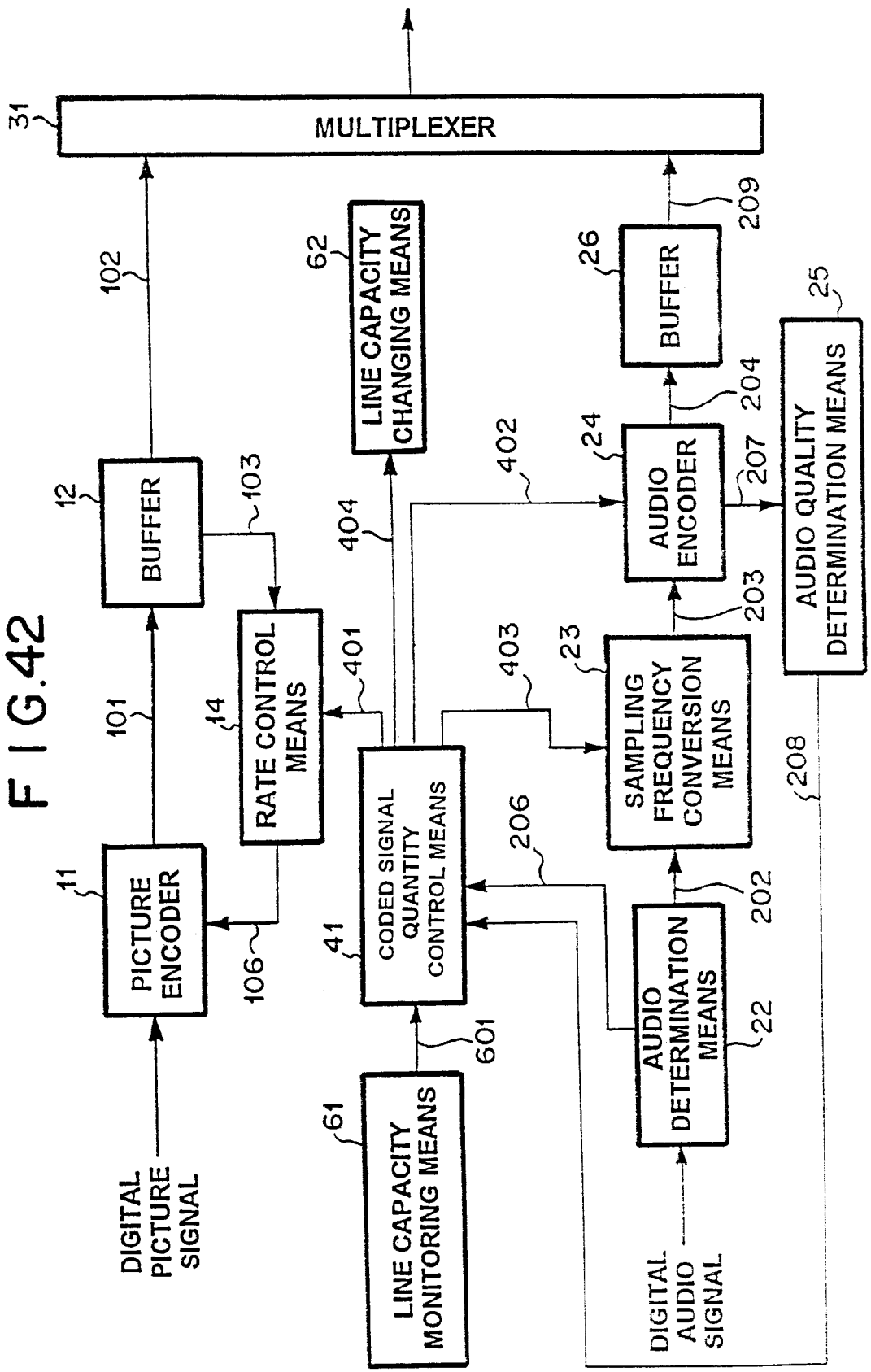
FIG. 42 is a block diagram of 42nd mode of embodiment of the picture/audio coding apparatus of the present invention.

A 42nd embodiment is shown in FIG. 42. The audio-picture coding apparatus as shown in FIG. 38 comprises picture encoder 11, buffer 12, rate control means 14, audio determination means 22, sampling frequency conversion means 23, audio encoder 24, audio quality determination means 25, buffer 26, multiplexer 31, coded signal quantity control means 41, line capacity monitoring means 61, and line capacity changing means 62.

The 42nd embodiment operates in the same way as the 10th embodiment, except coded signal quantity control means 41, line capacity monitoring means 61, and line capacity changing means 62.

In addition to the operation as the 10th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 43:
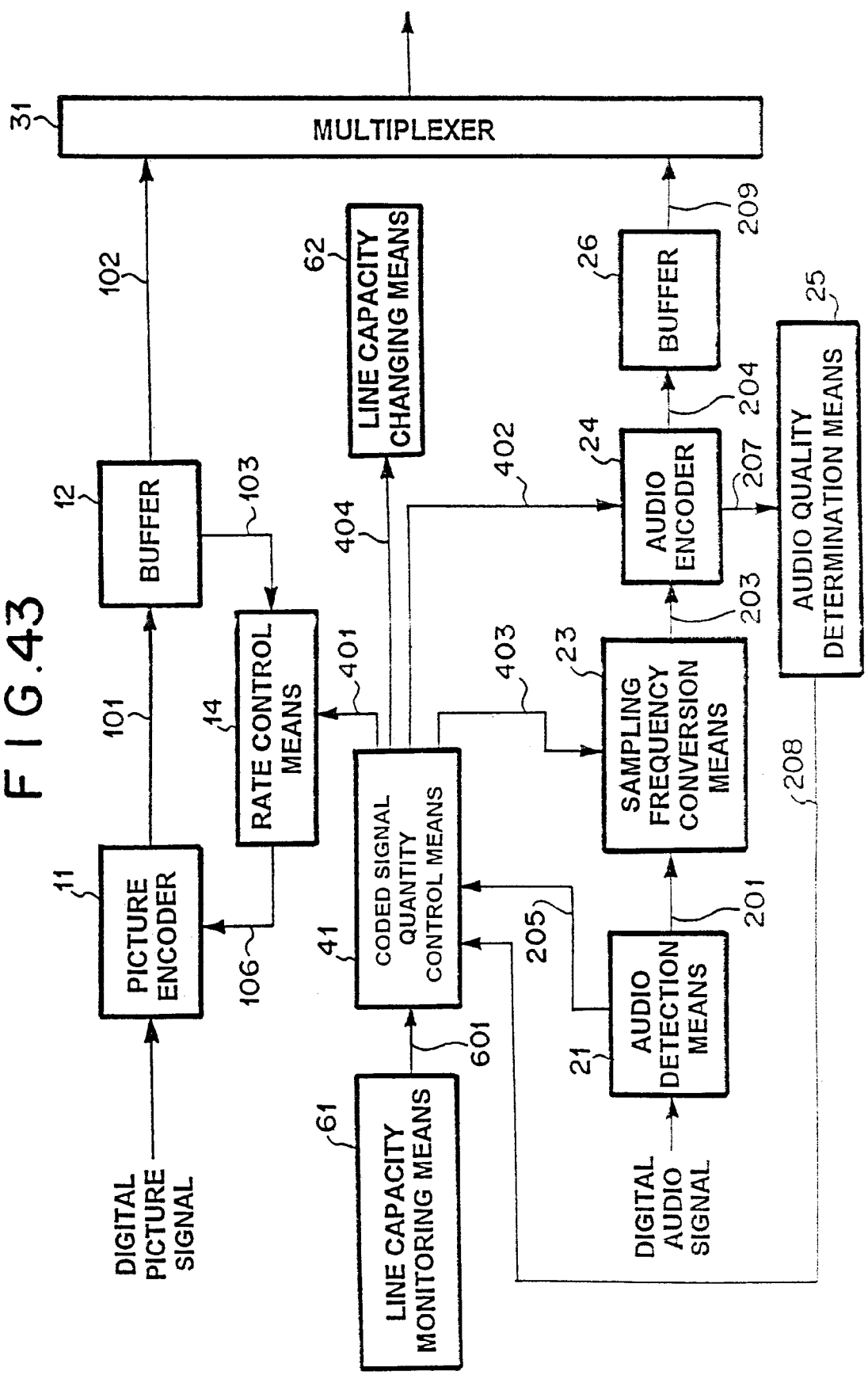
FIG. 43 is a block diagram of 43rd mode of embodiment of the picture/audio coding apparatus of the present invention.

A 43rd embodiment is shown in FIG. 43. The audio-picture coding apparatus as shown in FIG. 38 comprises picture encoder 11, buffer 12, rate control means 14, audio detection means 21, sampling frequency conversion means 23, audio encoder 24, audio quality determination means, buffer 26, multiplexer 31, coded signal quantity control means 41, line capacity monitoring means 61, and line capacity changing means 62.

The 43rd embodiment operates in the same way as the 11th embodiment, except coded signal quantity control means 41, line capacity monitoring means 61, and line capacity changing means 62.

In addition to the operation as the 6th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 44:
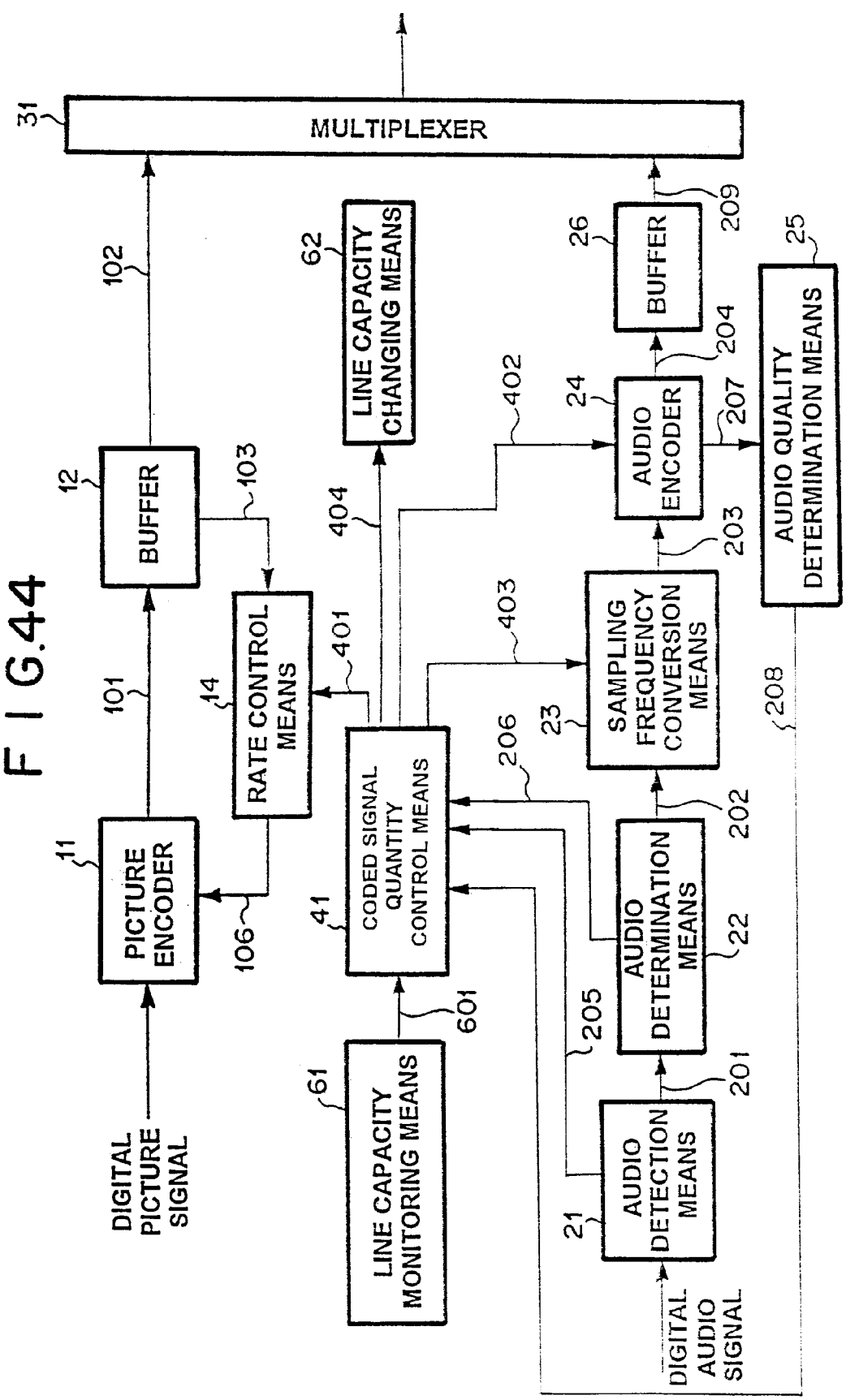
FIG. 44 is a block diagram of 44th mode of embodiment of the picture/audio coding apparatus of the present invention.

A 44th embodiment is shown in FIG. 44. The audio-picture coding apparatus as shown in FIG. 44 comprises picture encoder 11, buffer 12, picture quality determination means 13, rate control means 14, audio detection means 21, audio determination means 22, sampling frequency conversion means 23, audio encoder 24, audio quality determination means buffer 26, multiplexer 31, coded signal quantity control means 41, line capacity monitoring means 61, and line capacity changing means 62.

The 44th embodiment operates in the same way as the 12th embodiment, except coded signal quantity control means 41, line capacity monitoring means 61, and line capacity changing means 62.

In addition to the operation as the 12th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 45:
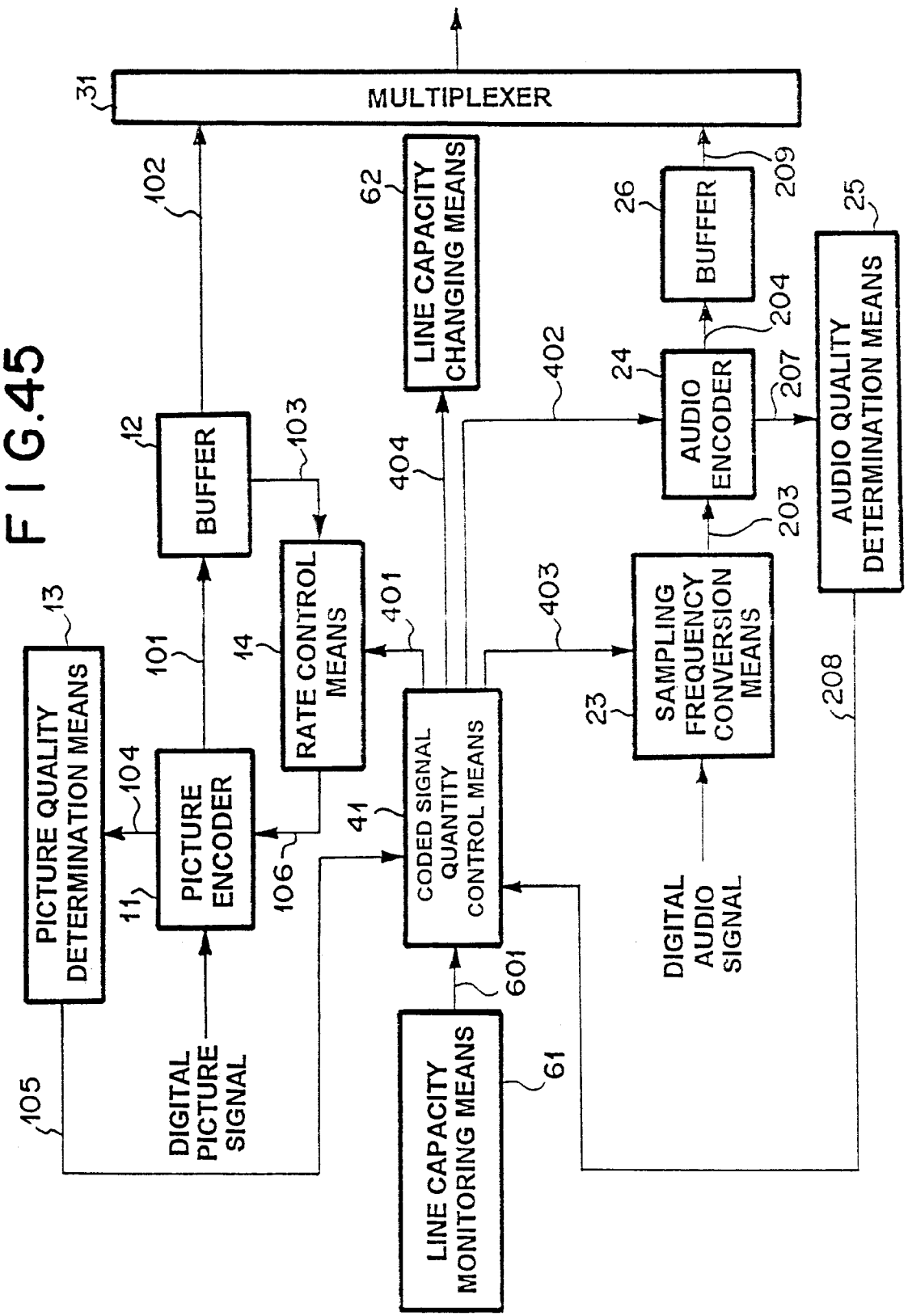
FIG. 45 is a block diagram of 45th mode of embodiment of the picture/audio coding apparatus of the present invention.

A 45th embodiment is shown in FIG. 45. The audio-picture coding apparatus as shown in FIG. 45 comprises picture encoder 11, buffer 12, picture quality determination means 13, rate control means 14, sampling frequency conversion means 23, audio encoder 24, audio quality determination means 25, buffer 26, multiplexer 31, coded signal quantity control means 41, line capacity monitoring means 61, and line capacity changing means 62.

The 45th embodiment operates in the same way as the 13th embodiment, except coded signal quantity control means 41, line capacity monitoring means 61, and line capacity changing means 62.

In addition to the operation as the 6th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404. monitors traffics on the transmission line.

Figure 46:
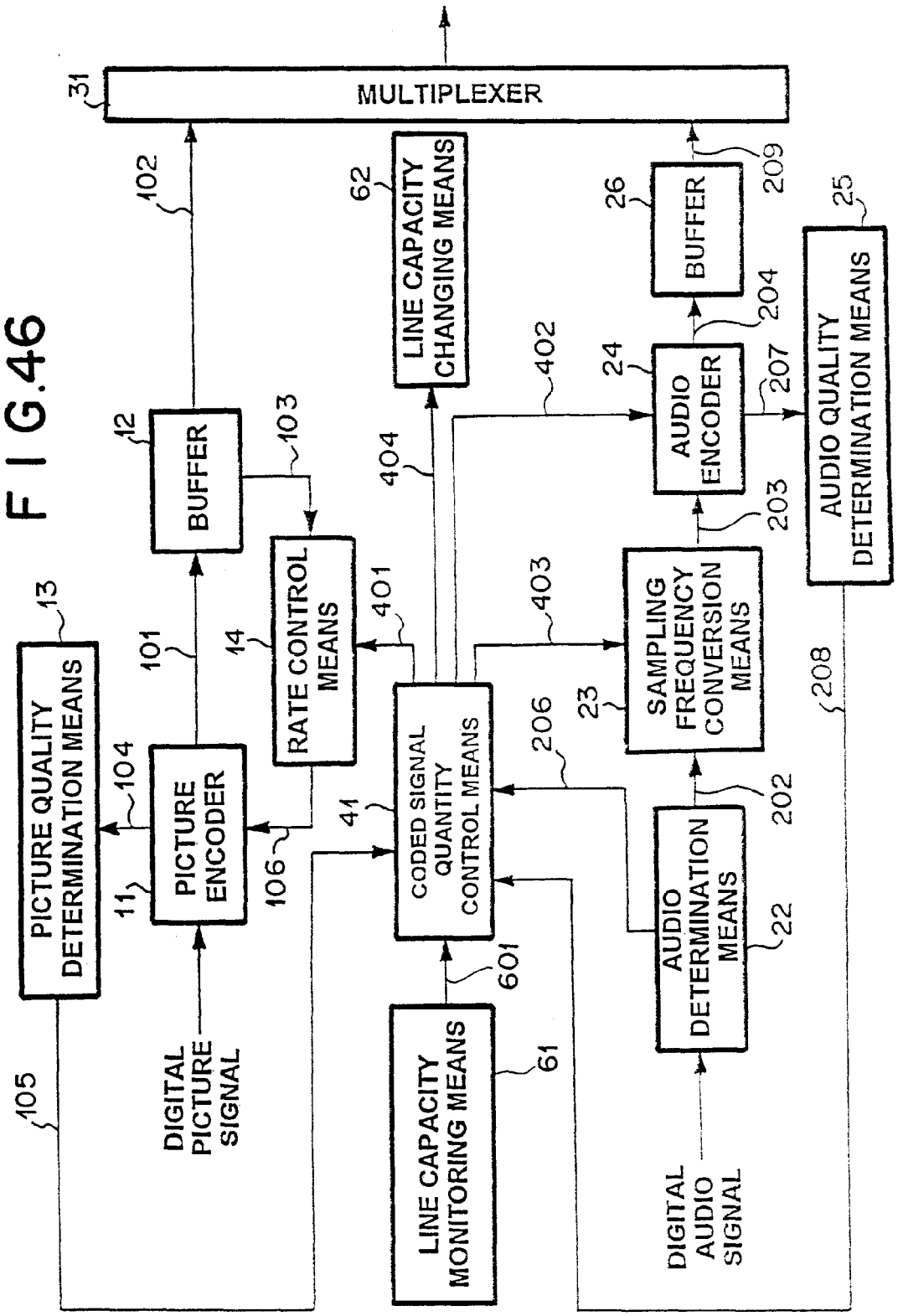
FIG. 46 is a block diagram of 46th mode of embodiment of the picture/audio coding apparatus of the present invention.

A 46th embodiment is shown in FIG. 46. The audio-picture coding apparatus as shown in FIG. 46 comprises picture encoder 11, buffer 12, picture quality determination means 13, rate control means 14, audio determination means 22, sampling frequency conversion means 23, audio encoder 24, audio quality determination means 25, buffer 26, multiplexer 31, coded signal quantity control means 41, line capacity monitoring means 61, and line capacity changing means 62.

The 46th embodiment operates in the same way as the 14th embodiment, except coded signal quantity control means 41, line capacity monitoring means 61, and line capacity changing means 62.

In addition to the operation as the 14th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 47:
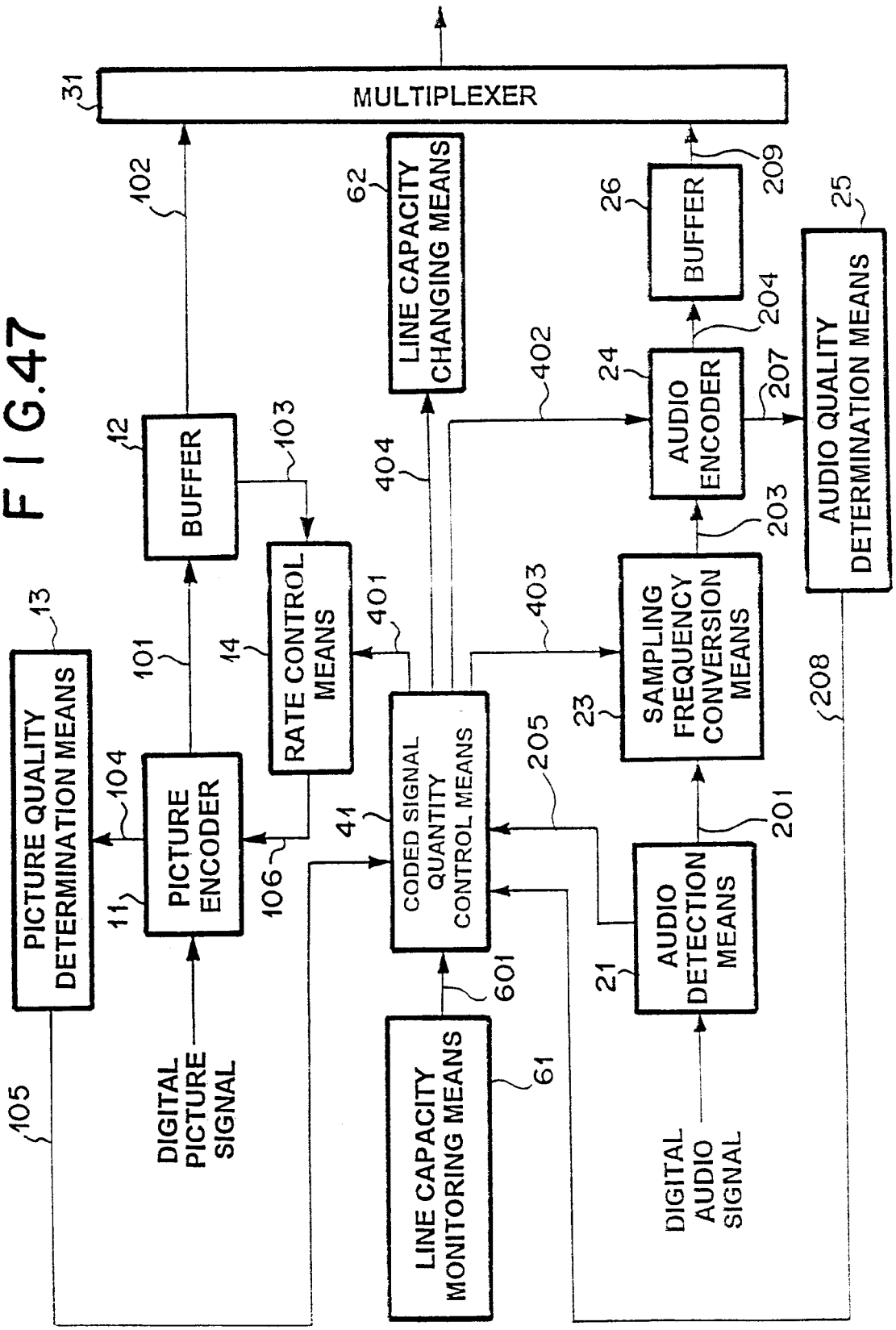
FIG. 47 is a block diagram of 47th mode of embodiment of the picture/audio coding apparatus of the present invention.

A 47th embodiment is shown in FIG. 47. The audio-picture coding apparatus as shown in FIG. 47 comprises picture encoder 11, buffer 12, picture quality determination means 13, rate control means 14, audio detection means 21, sampling frequency conversion means 23, audio encoder 24, audio quality determination means 25, buffer 26, multiplexer 31, coded signal quantity control means 41, line capacity monitoring means 61, and line capacity changing means 62.

The 47th embodiment operates in the same way as the 15th embodiment, except coded signal quantity control means 41. line capacity monitoring means 61, and line capacity changing means 62.

In addition to the operation as the 15th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 48:
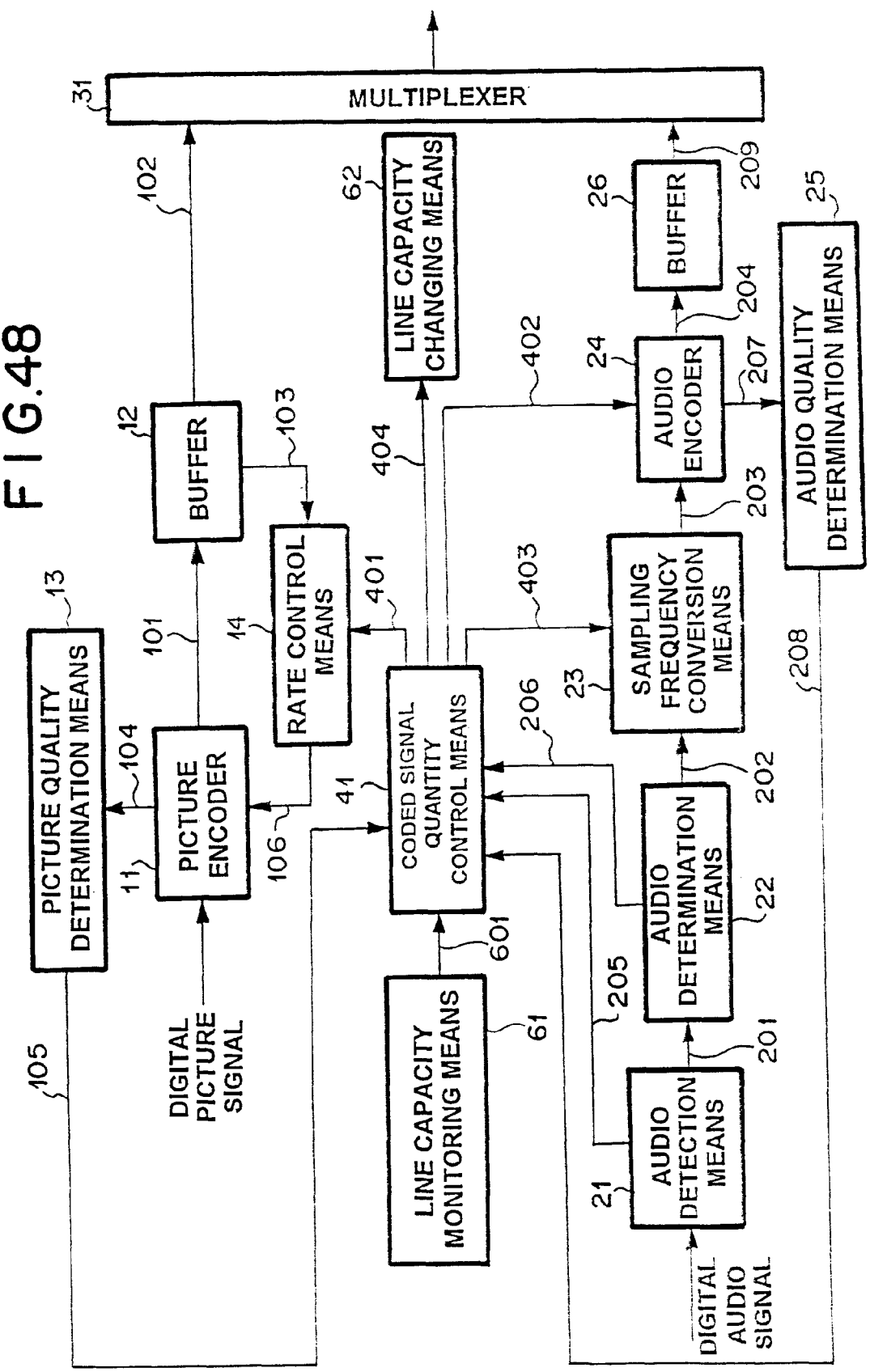
FIG. 48 is a block diagram of 48th mode of embodiment of the picture/audio coding apparatus of the present invention.

A 48th embodiment is shown in FIG. 48. The audio-picture coding apparatus as shown in FIG. 38 comprises picture encoder 11, buffer 12, picture quality determination means 13, rate control means 14, audio detection means 21, audio determination means 22, sampling frequency conversion means 23, audio encoder 24, audio quality determination means 25, buffer 26, multiplexer 31, coded signal quantity control means 41, line capacity monitoring means 61, and line capacity changing means 62.

The 48th embodiment operates in the same way as the 16th embodiment, except coded signal quantity control means 41, line capacity monitoring means 61, and line capacity changing means 62.

In addition to the operation as the 16th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 49:
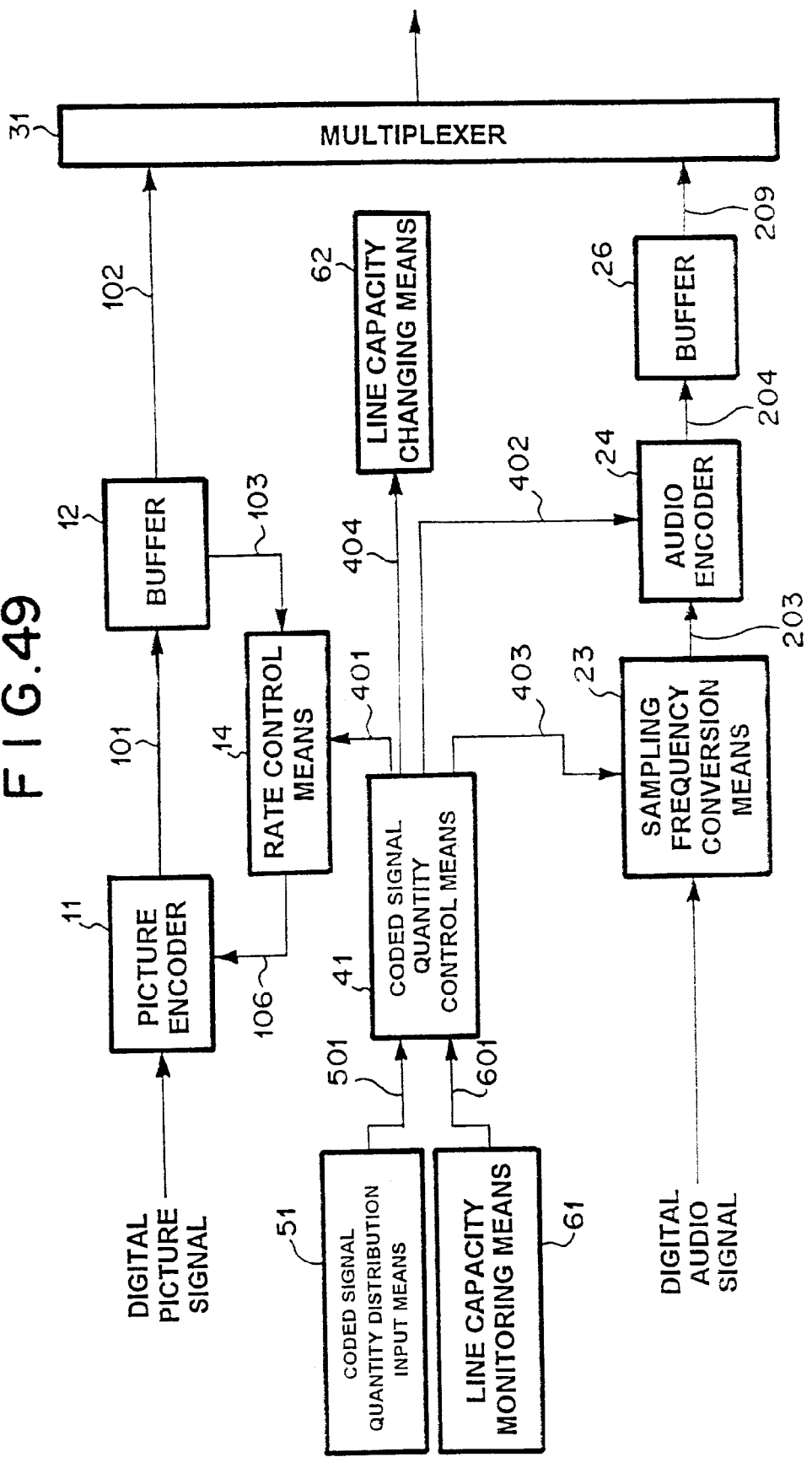
FIG. 49 is a block diagram of 49th mode of embodiment of the picture/audio coding apparatus of the present invention.

A 49th embodiment is shown in FIG. 49. The audio-picture coding apparatus as shown in FIG. 49 comprises picture encoder 11, buffer 12, rate control means 14, sampling frequency conversion means 23, audio encoder 24, buffer 26, multiplexer 31, coded signal quantity control means 41, coded signal quantity distribution input means 51, line capacity monitoring means 61, and line capacity changing means 62.

The 49th embodiment operates in the same way as the 17th embodiment, except coded signal quantity control means 41, line capacity monitoring means 61, and line capacity changing means 62.

In addition to the operation as the 17th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 50:
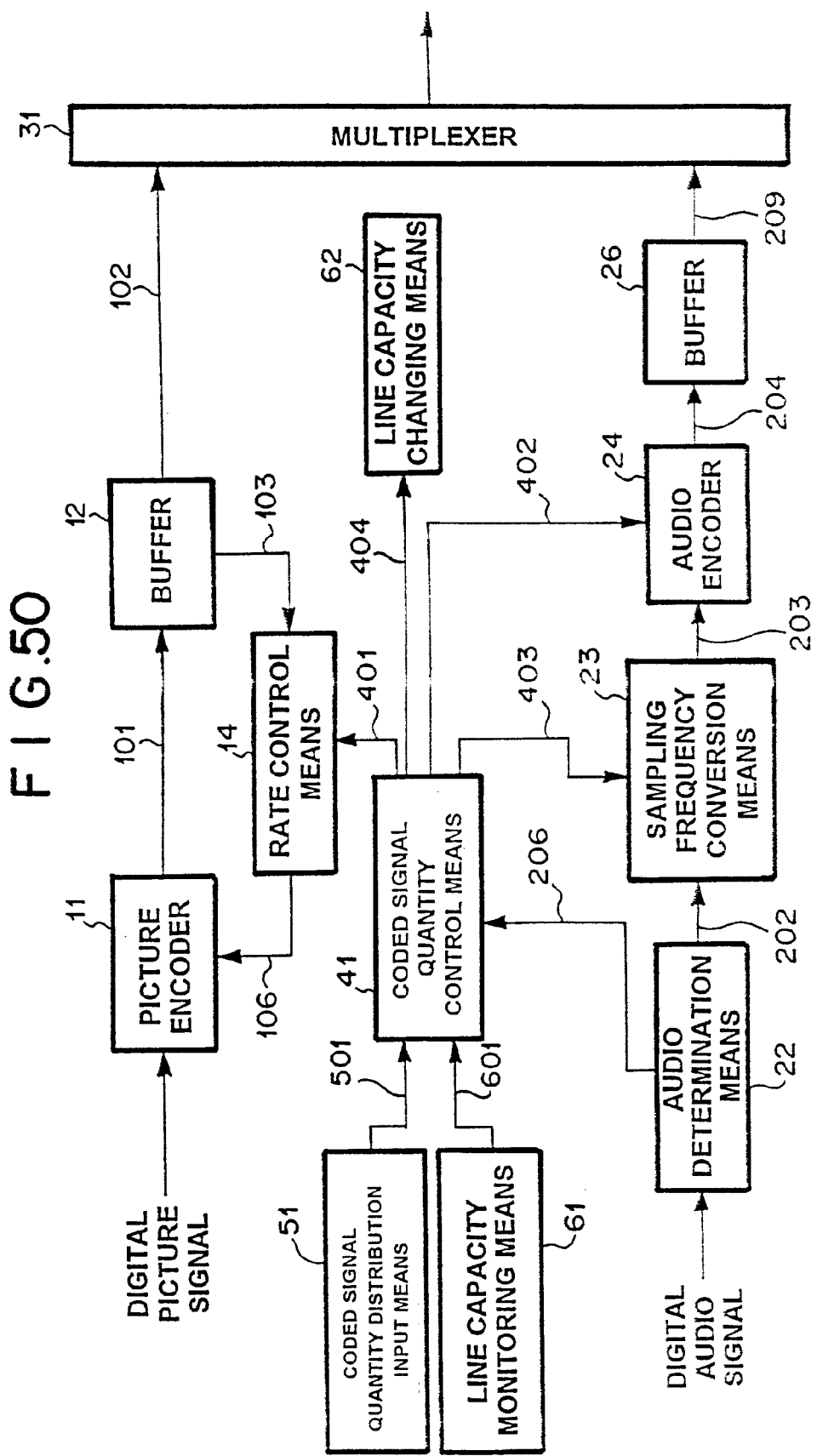
FIG. 50 is a block diagram of 50th mode of embodiment of the picture/audio coding apparatus of the present invention.

A 50th embodiment is shown in FIG. 50. The audio-picture coding apparatus as shown in FIG. 50 comprises picture encoder 11, buffer 12, rate control means 14, audio determination means 22, sampling frequency conversion means 23, audio encoder 24, buffer 26, multiplexer 31, coded signal quantity control means 41, code quantity distribution input means, line capacity monitoring means 61, and line capacity changing means 62.

The 50th embodiment operates in the same way as the 18th embodiment, except coded signal quantity control means 41, line capacity monitoring means 61, and line capacity changing means 62.

In addition to the operation as the 18th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 51:
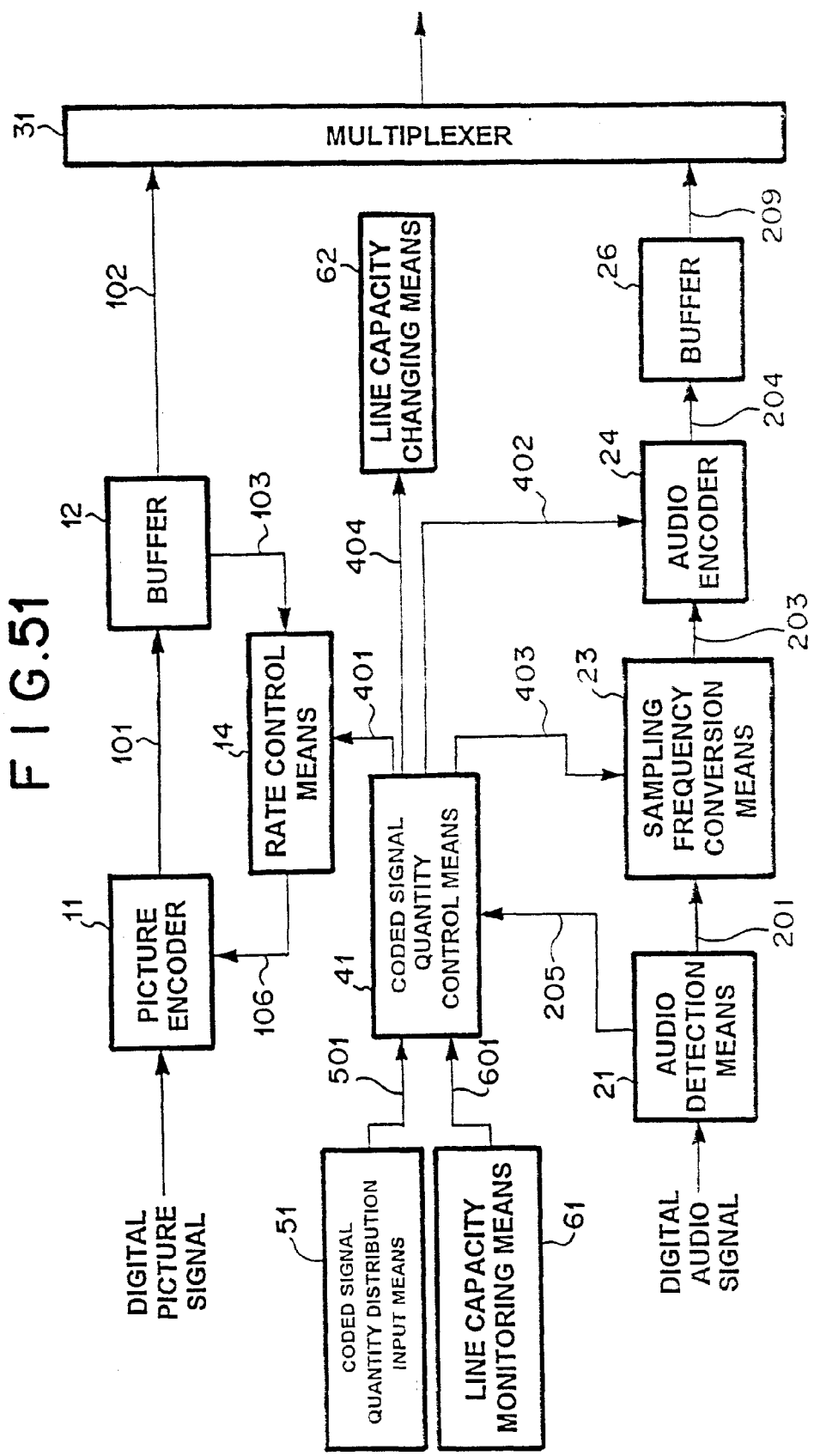
FIG. 51 is a block diagram of 51st mode of embodiment of the picture/audio coding apparatus of the present invention.

A 51st embodiment is shown in FIG. 51. The audio-picture coding apparatus as shown in FIG. 51 comprises picture encoder 11, buffer 12, rate control means 14, audio detection means 21, sampling frequency conversion means 23, audio encoder 24, buffer 26, multiplexer 31, coded signal quantity control means 41, coded signal quantity distribution input means 51, line capacity monitoring means 61, and line capacity changing means 62.

The 51st embodiment operates in the same way as the 19th embodiment, except coded signal quantity control means 41, line capacity monitoring means 61, and line capacity changing means 62.

In addition to the operation as the 6th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 52:
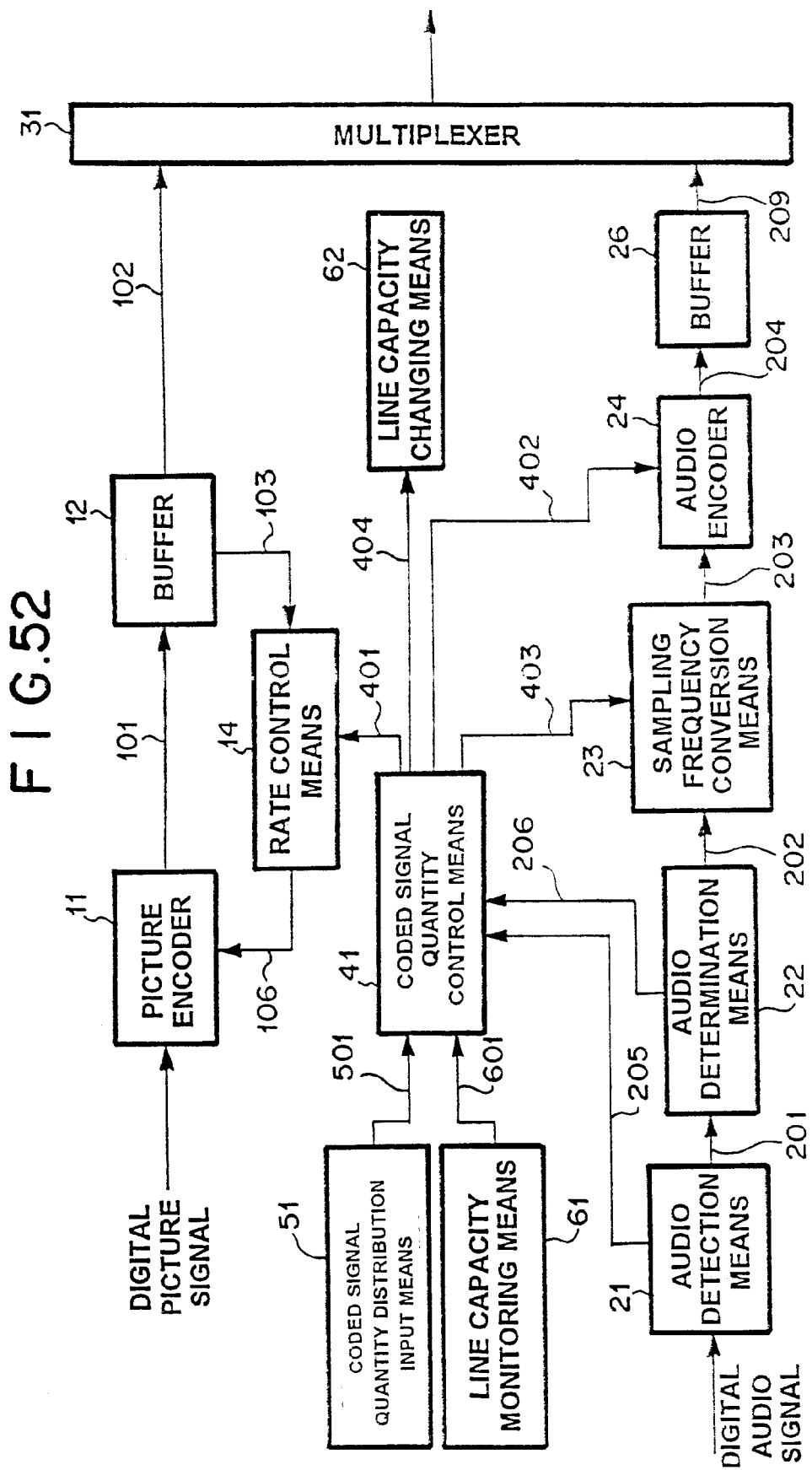
FIG. 52 is a block diagram of 52nd mode of embodiment of the picture/audio coding apparatus of the present invention.

A 52nd embodiment is shown in FIG. 52. The audio-picture coding apparatus as shown in FIG. 52 comprises picture encoder 11, buffer 12, rate control means 14, audio detection means 21, audio determination means 22, sampling frequency conversion means 23, audio encoder 24, buffer 26, multiplexer 31, coded signal quantity control means 41, coded signal quantity distribution input means 51, line capacity monitoring means 61, and line capacity changing means 62.

The 52nd embodiment operates in the same way as the 20th embodiment, except coded signal quantity control means 41, line capacity monitoring means 61, and line capacity changing means 62.

In addition to the operation as the 20th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 53:
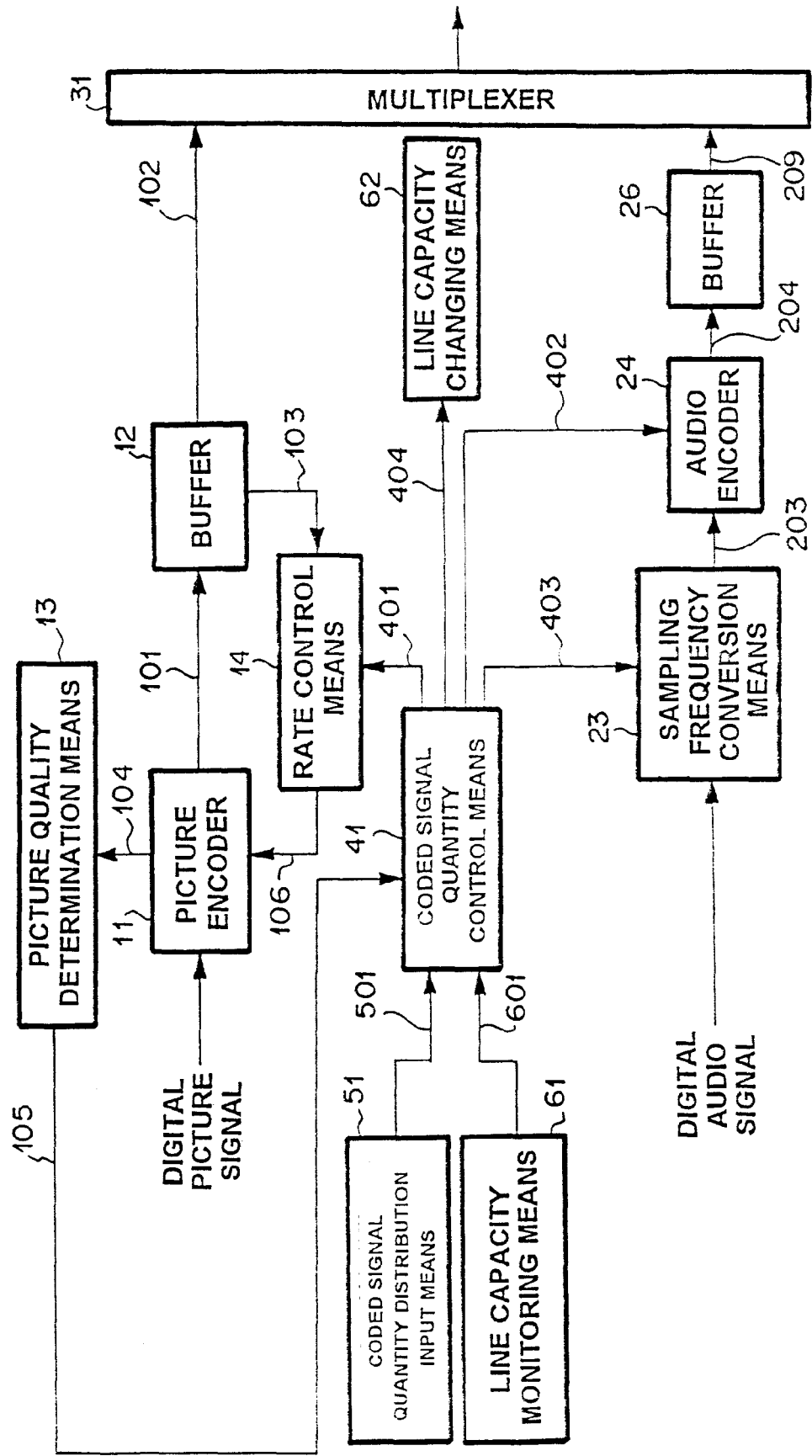
FIG. 53 is a block diagram of 53rd mode of embodiment of the picture/audio coding apparatus of the present invention.

A 53rd embodiment is shown in FIG. 53. The audio-picture coding apparatus as shown in FIG. 38 comprises picture encoder 11, buffer 12, picture quality determination means 13, rate control means 14, sampling frequency conversion means 23, audio encoder 24, buffer 26, multiplexer 31, coded signal quantity control means 41, coded signal quantity distribution input means 51, line capacity monitoring means 61, and line capacity changing means 62.

The 53rd embodiment operates in the same way as the 21st embodiment, except coded signal quantity control means 41, line capacity monitoring means 61, and line capacity changing means 62.

In addition to the operation as the 21st embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 54:
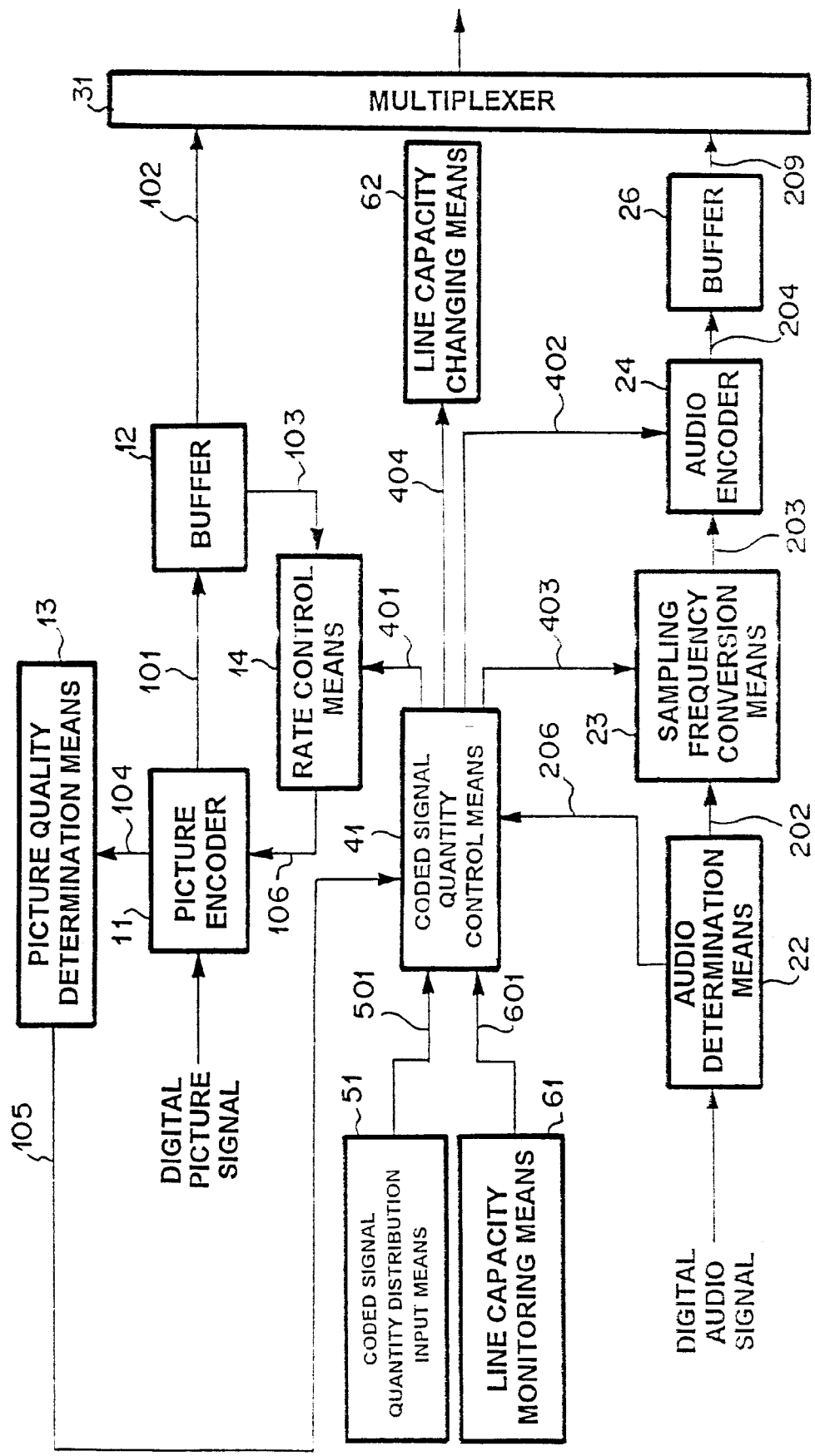
FIG. 54 is a block diagram of 54th mode of embodiment of the picture/audio coding apparatus of the present invention.

A 54th embodiment is shown in FIG. 54. The audio-picture coding apparatus as shown in FIG. 54 comprises picture encoder 11, buffer 12, picture quality determination means 13, rate control means 14, audio determination means 22, sampling frequency conversion means 23, audio encoder 24, buffer 26, multiplexer 31, coded signal quantity control means 41, coded signal quantity distribution input means 51, line capacity monitoring means 61, and line capacity changing means 62.

The 54th embodiment operates in the same way as the 22nd embodiment, except coded signal quantity control means 41, line capacity monitoring means 61, and line capacity changing means 62.

In addition to the operation as the 22nd embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 55:
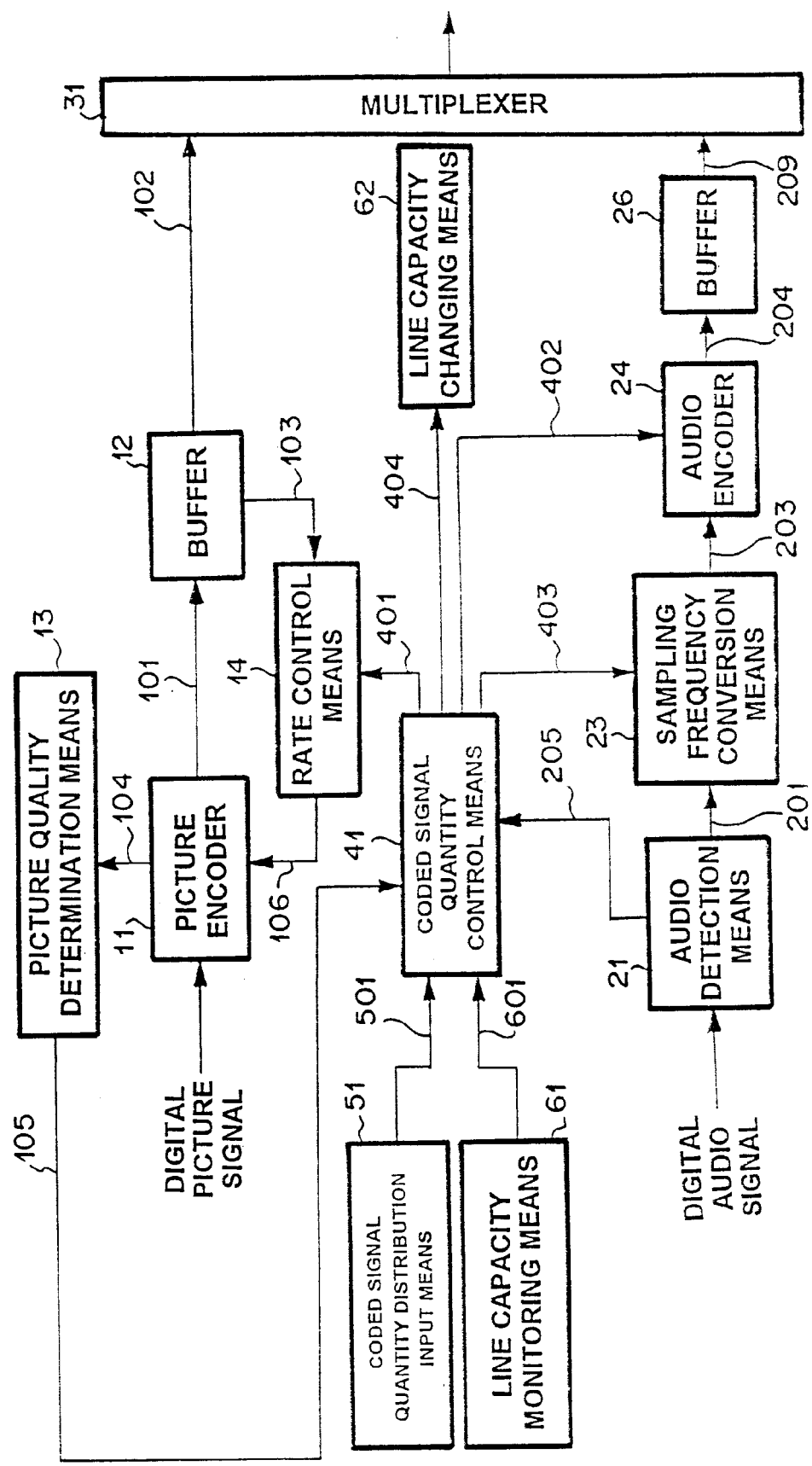
FIG. 55 is a block diagram of 55th mode of embodiment of the picture/audio coding apparatus of the present invention.

A 55th embodiment is shown in FIG. 55. The audio-picture coding apparatus as shown in FIG. 55 comprises picture encoder 11, buffer 12, picture quality determination means 13, rate control means 14, audio detection means 21, sampling frequency conversion means 23, audio encoder 24, buffer 26, multiplexer 31, coded signal quantity control means 41, coded signal quantity distribution input means 51, line capacity monitoring means 61, and line capacity changing means 62.

The 55th embodiment operates in the same way as the 23rd embodiment, except coded signal quantity control means 41, line capacity monitoring means 61, and line capacity changing means 62.

In addition to the operation as the 23rd embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 56:
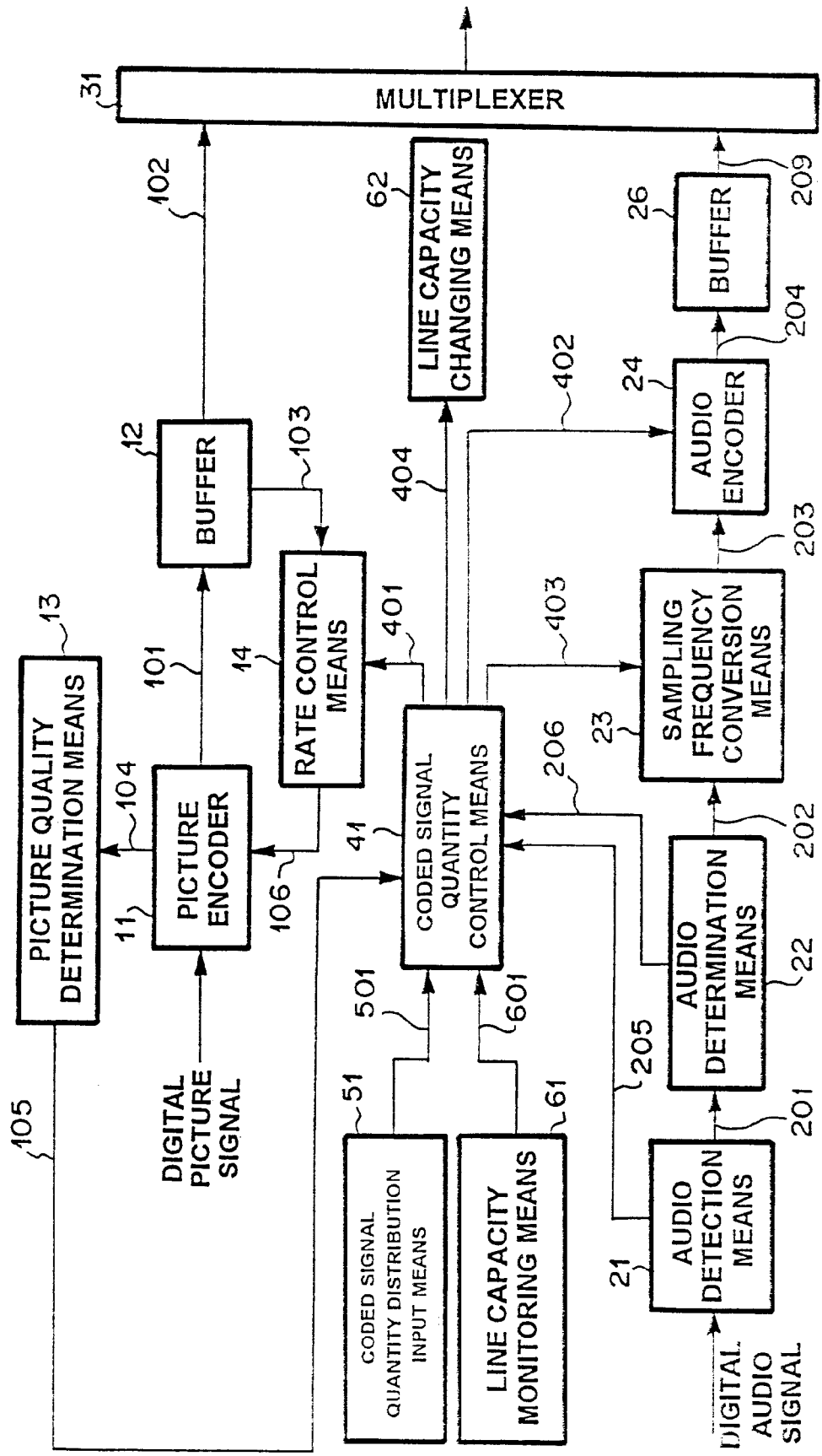
FIG. 56 is a block diagram of 56th mode of embodiment of the picture/audio coding apparatus of the present invention.

A 56th embodiment is shown in FIG. 56. The audio-picture coding apparatus as shown in FIG. 56 comprises picture encoder 11, buffer 12, picture quality determination means 13, rate control means 14, audio detection means 21, audio determination means 22, sampling frequency conversion means 23, audio encoder 24, buffer 26, multiplexer 31, coded signal quantity control means 41, coded signal quantity distribution input means 51, line capacity monitoring means 61, and line capacity changing means 62.

The 56th embodiment operates in the same way as the 24th embodiment, except coded signal quantity control means 41, line capacity monitoring means 61, and line capacity changing means 62.

In addition to the operation as the 24th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 57:
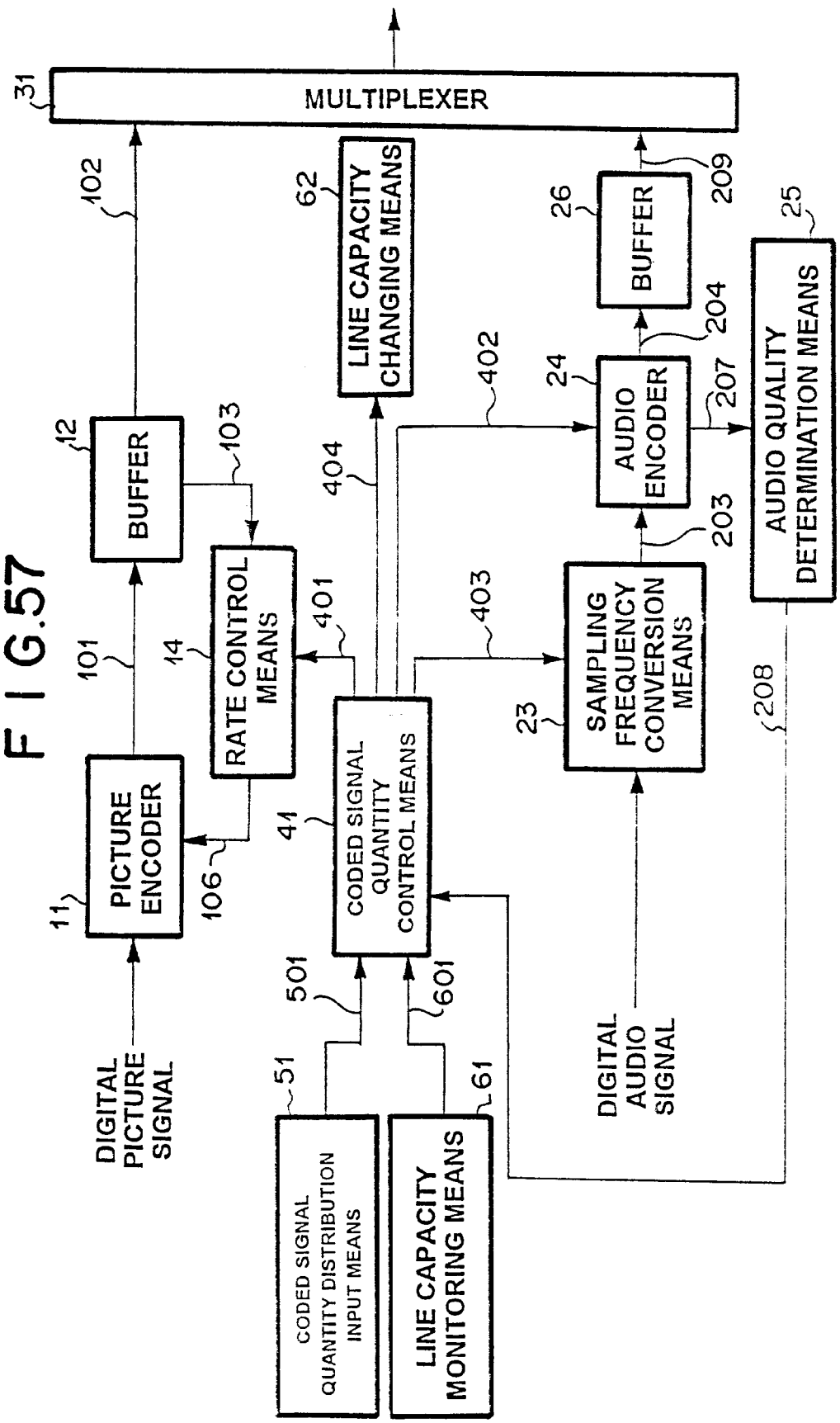
FIG. 57 is a block diagram of 57st mode of embodiment of the picture/audio coding apparatus of the present invention.

A 57th embodiment is shown in FIG. 57. The audio-picture coding apparatus as shown in FIG. 57 comprises picture encoder 11, buffer 12, rate control means 14, sampling frequency conversion means 23, audio encoder 24, audio quality determination means 25, buffer 26, multiplexer 31, coded signal quantity control means 41, coded signal quantity distribution input means 51, line capacity monitoring means 61, and line capacity changing means 62.

The 57th embodiment operates in the same way as the 25th embodiment, except coded signal quantity control means 41, line capacity monitoring means 61, and line capacity changing means 62.

In addition to the operation as the 25th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 58:
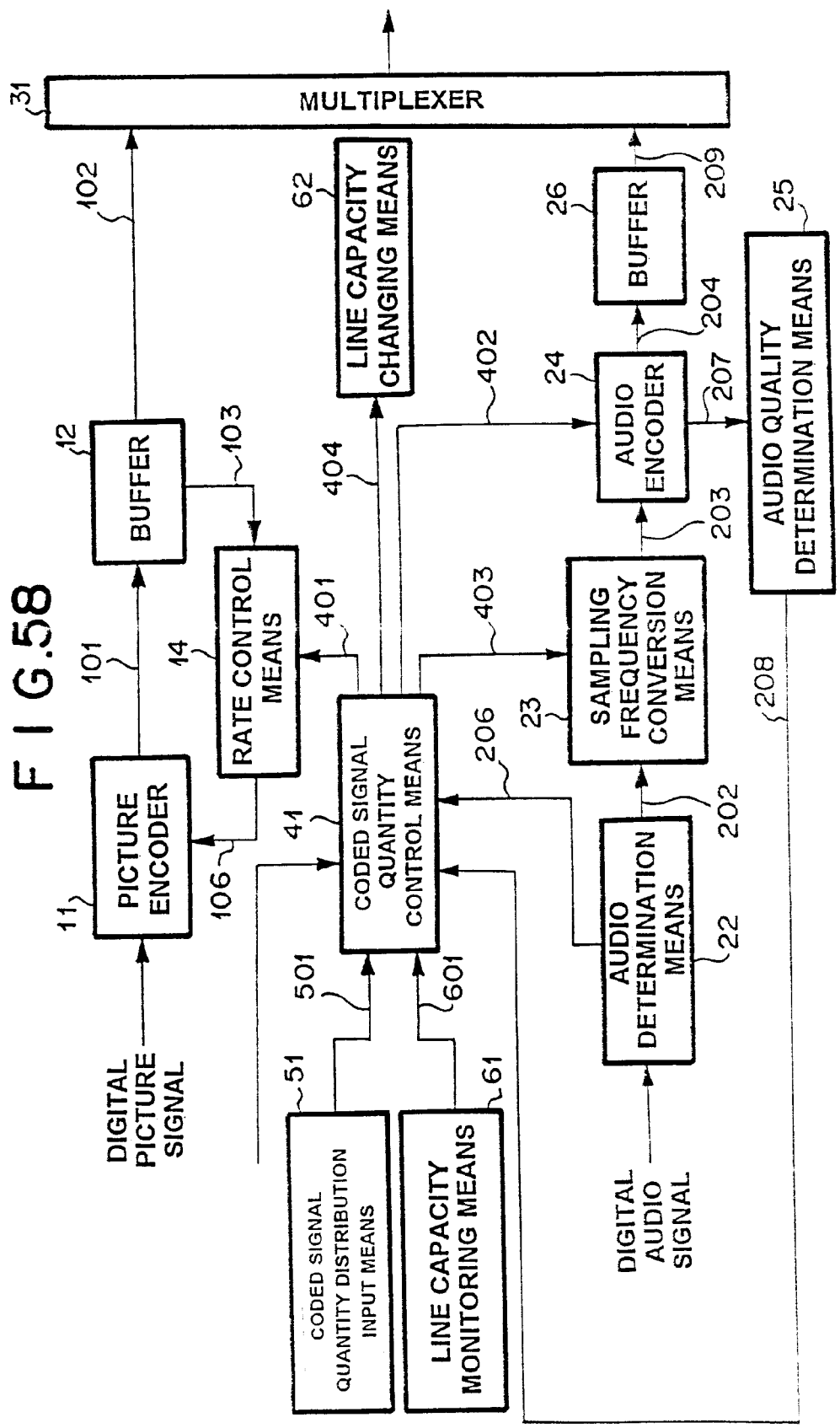
FIG. 58 is a block diagram of 58th mode of embodiment of the picture/audio coding apparatus of the present invention.

A 58th embodiment is shown in FIG. 58. The audio-picture coding apparatus as shown in FIG. 58 comprises picture encoder 11, buffer 12, rate control means 14, audio determination means 22, sampling frequency conversion means 23, audio encoder 24, audio quality determination means 25, buffer 26, multiplexer 31, coded signal quantity control means 41, coded signal quantity distribution input means 51, line capacity monitoring means 61, and line capacity changing means 62.

The 58th embodiment operates in the same way as the 26th embodiment, except coded signal quantity control means 41, line capacity monitoring means 61, and line capacity changing means 62.

In addition to the operation as the 26th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 59:
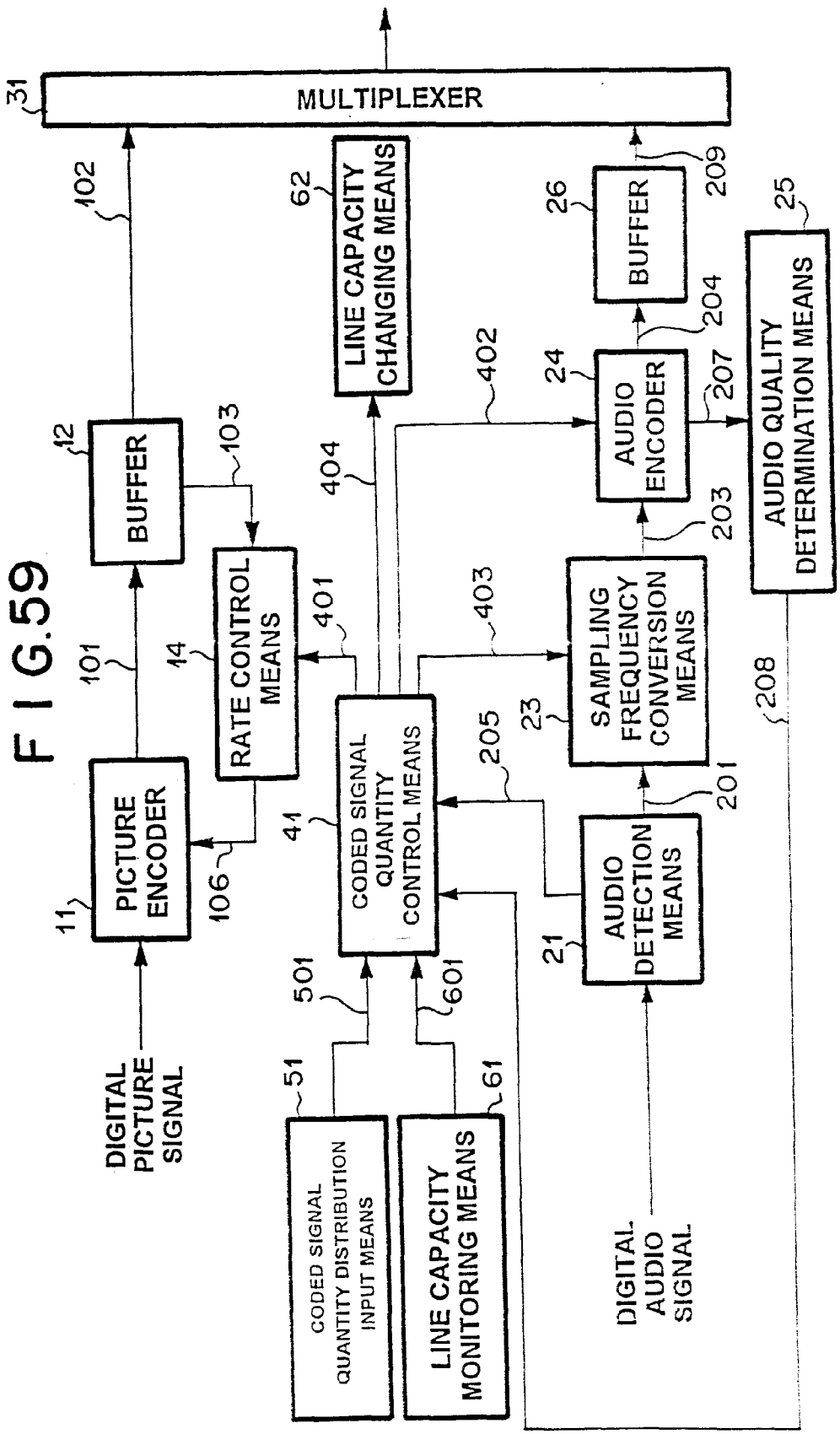
FIG. 59 is a block diagram of 59th mode of embodiment of the picture/audio coding apparatus of the present invention.

A 59th embodiment is shown in FIG. 59. The audio-picture coding apparatus as shown in FIG. 38 comprises picture encoder 11, buffer 12, rate control means 14, audio detection means 21, sampling frequency conversion means 23, audio encoder 24, audio quality determination means 25, buffer 26, multiplexer 31, coded signal quantity control means 41, coded signal quantity distribution input means 51, line capacity monitoring means 61, and line capacity changing means 62.

The 59th embodiment operates in the same way as the 27th embodiment, except coded signal quantity control means 41, line capacity monitoring means 61, and line capacity changing means 62.

In addition to the operation as the 27th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 60:
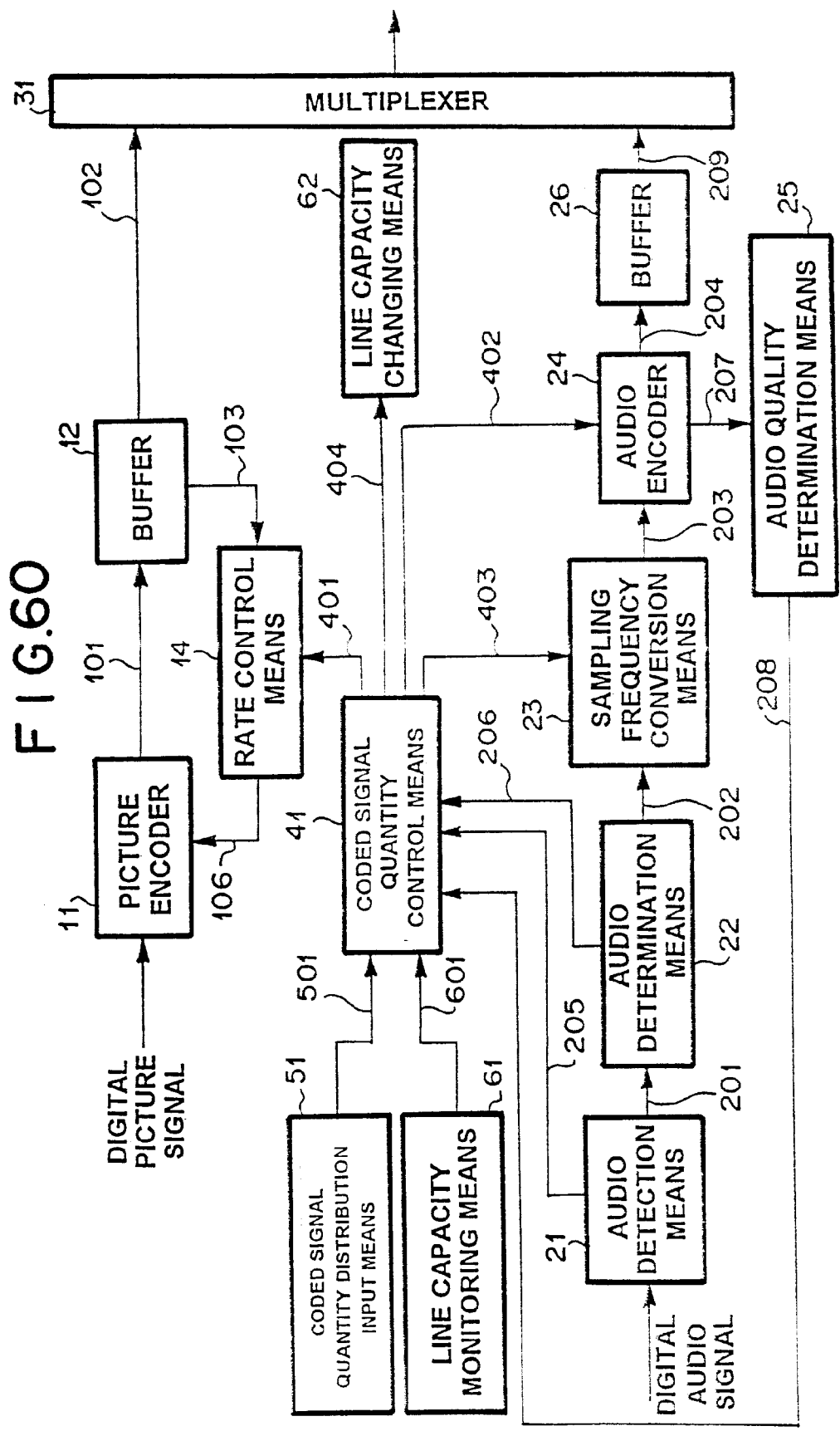
FIG. 60 is a block diagram of 60th mode of embodiment of the picture/audio coding apparatus of the present invention.

A 60th embodiment is shown in FIG. 60. The audio-picture coding apparatus as shown in FIG. 60 comprises picture encoder 11, buffer 12, rate control means 14, audio detection means 21, sampling frequency conversion means 23, audio encoder 24, audio quality determination means 25, buffer 26, multiplexer 31, coded signal quantity control means 41, coded signal quantity distribution input means 51, line capacity monitoring means 61, and line capacity changing means 62.

The 60th embodiment operates in the same way as the 28th embodiment, except coded signal quantity control means 41, line capacity monitoring means 61, and line capacity changing means 62.

In addition to the operation as the 6th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 61:
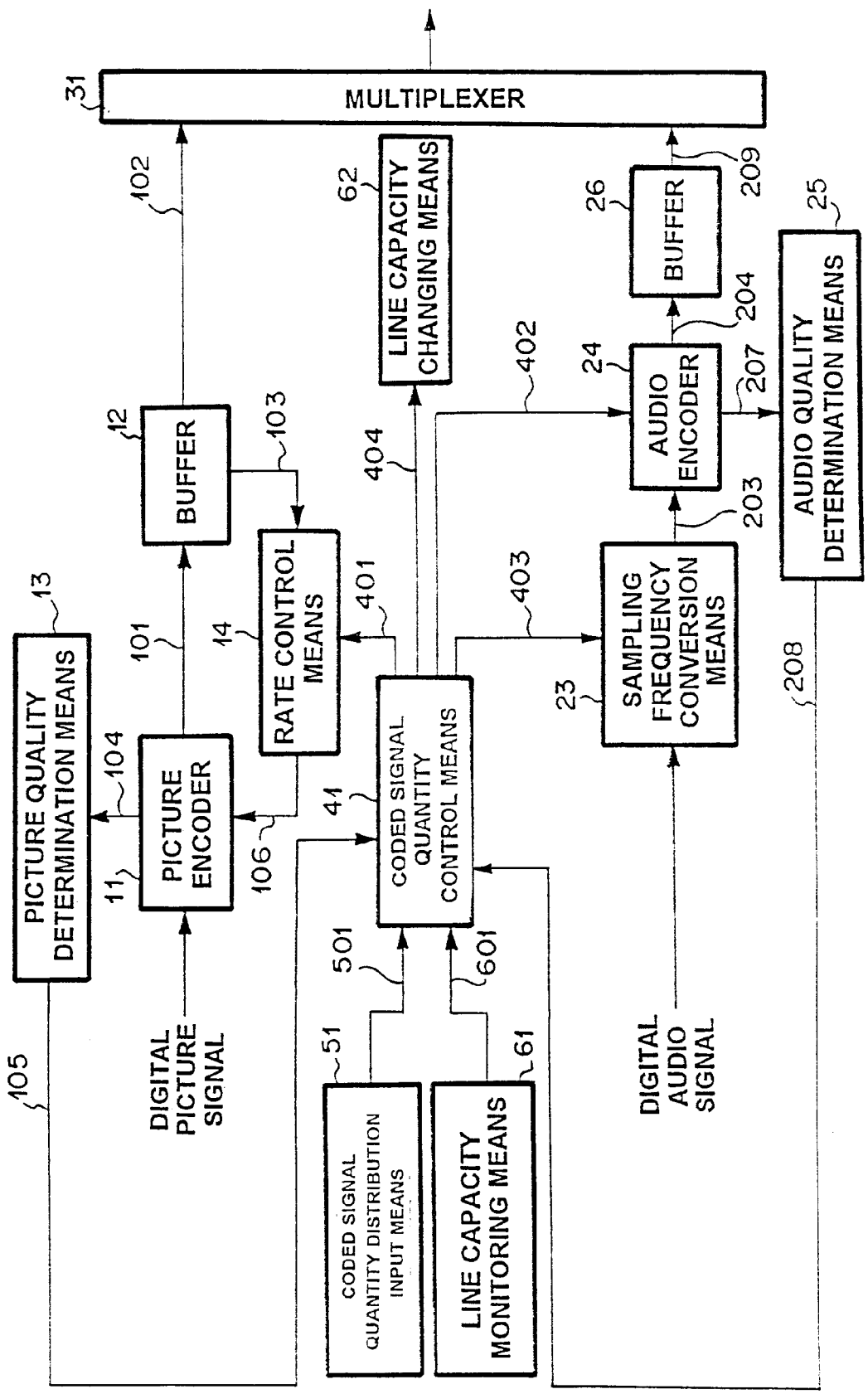
FIG. 61 is a block diagram of 61st mode of embodiment of the picture/audio coding apparatus of the present invention.

A 61st embodiment is shown in FIG. 61. The audio-picture coding apparatus as shown in FIG. 61 comprises picture encoder 11, buffer 12, picture quality determination means 13, rate control means 14, audio determination means 22, sampling frequency conversion means 23, audio encoder 24, audio quality determination means 25, buffer 26, multiplexer 31, coded signal quantity control means 41, coded signal quantity distribution input means 51, line capacity monitoring means 61, and line capacity changing means 62.

The 61st embodiment operates in the same way as the 29th embodiment, except coded signal quantity control means 41, line capacity monitoring means 61, and line capacity changing means 62.

In addition to the operation as the 29th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 62:
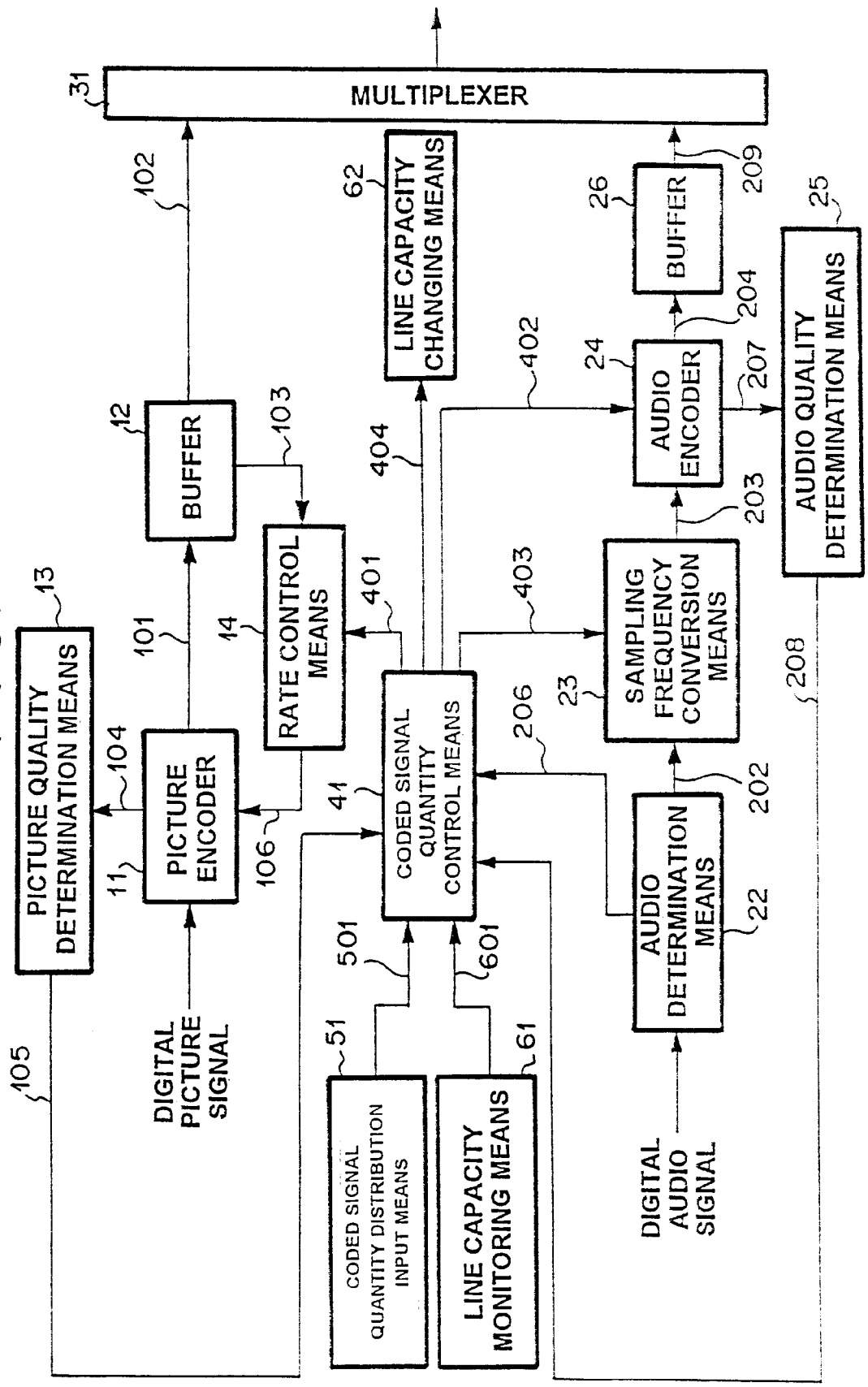
FIG. 62 is a block diagram of 62nd mode of embodiment of the picture/audio coding apparatus of the present invention.

A 62nd embodiment is shown in FIG. 62. The audio-picture coding apparatus as shown in FIG. 62 comprises picture encoder 11, buffer 12, picture quality determination means 13, rate control means 14, audio determination means 22, sampling frequency conversion means 23, audio encoder 24, audio quality determination means 25, buffer 26, multiplexer 31, coded signal quantity control means 41, line capacity monitoring means 61, and line capacity changing means 62.

The 62nd embodiment operates in the same way as the 30th embodiment, except coded signal quantity control means 41, line capacity monitoring means 61, and line capacity changing means 62.

In addition to the operation as the 6th embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 63:
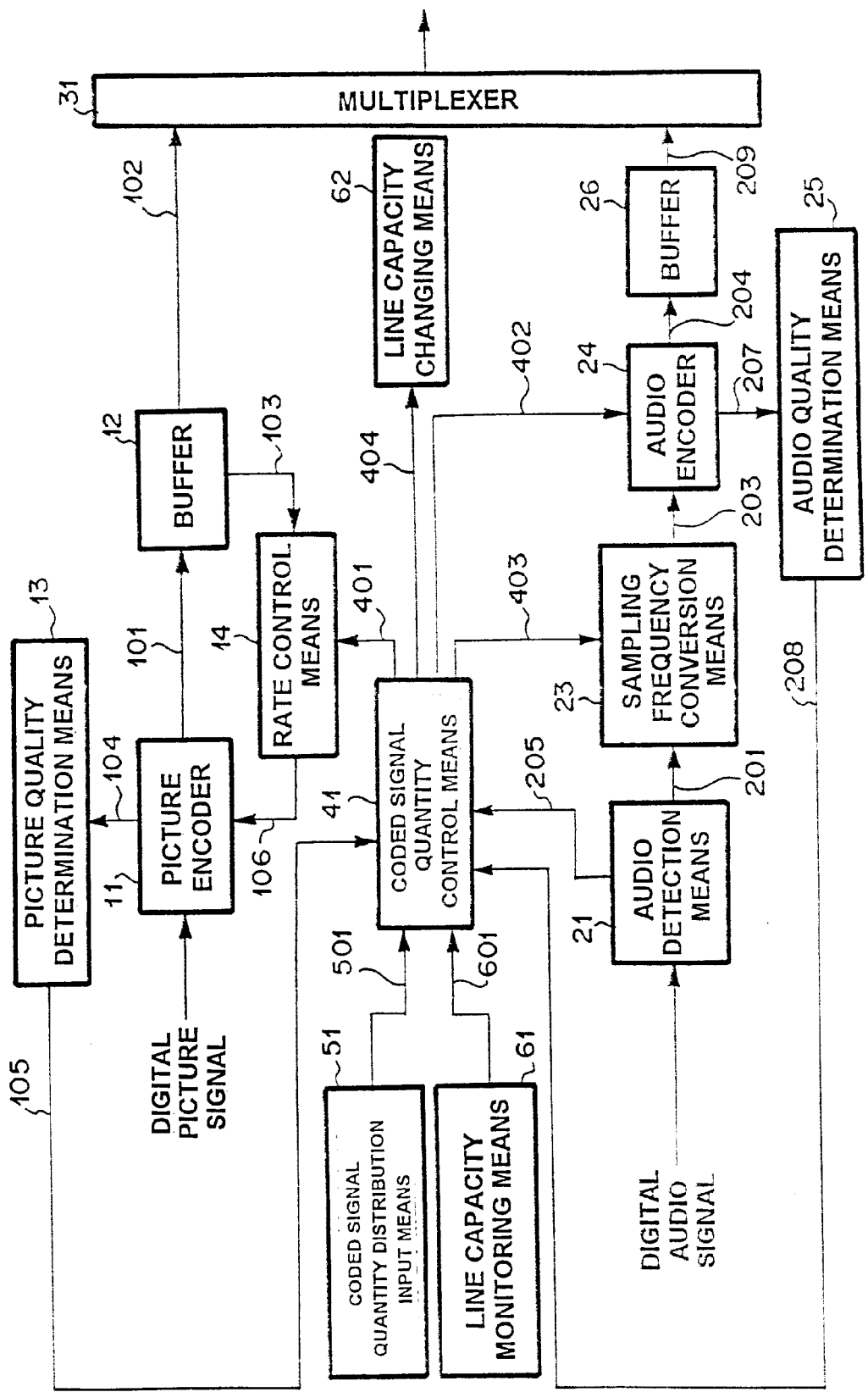
FIG. 63 is a block diagram of 63rd mode of embodiment of the picture/audio coding apparatus of the present invention.

A 63rd embodiment is shown in FIG. 63. The audio-picture coding apparatus as shown in FIG. 63 comprises picture encoder 11, buffer 12, picture quality determination means 13, rate control means 14, audio detection means 21, sampling frequency conversion means 23, audio encoder 24, audio quality determination means 25, buffer 26, multiplexer 31, coded signal quantity control means 41, coded signal quantity distribution input means 51, line capacity monitoring means 61, and line capacity changing means 62.

The 63rd embodiment operates in the same way as the 31st embodiment, except coded signal quantity control means 41, line capacity monitoring means 61, and line capacity changing means 62.

In addition to the operation as the 31st embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

Figure 64:
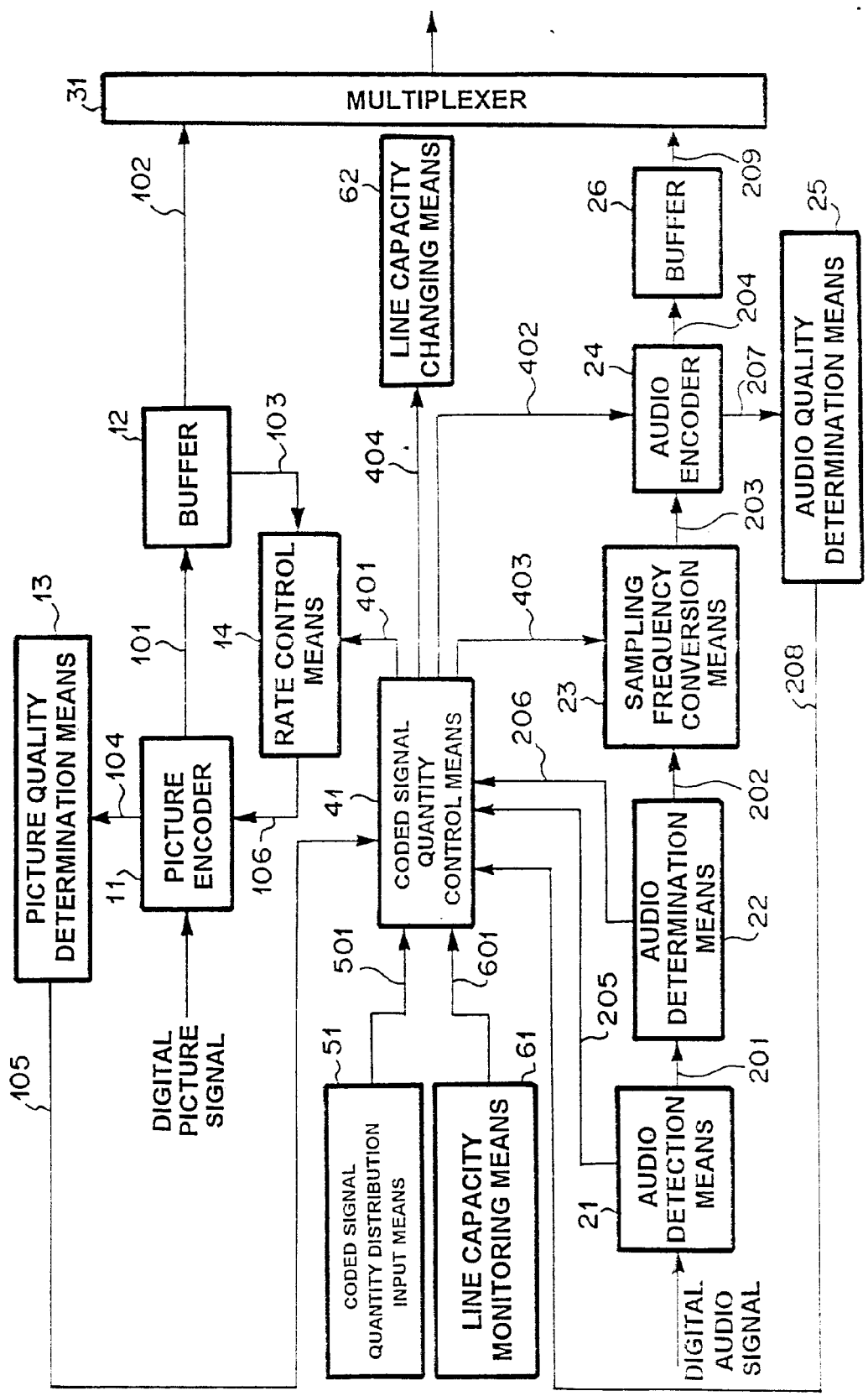
FIG. 64 is a block diagram of 64th mode of embodiment of the picture/audio coding apparatus of the present invention.

A 64th embodiment is shown in FIG. 64. The audio-picture coding apparatus as shown in FIG. 64 comprises picture encoder 11, buffer 12, picture quality determination means 13, rate control means 14, audio detection means 21, audio determination means 22, sampling frequency conversion means 23, audio encoder 24, audio quality determination means 25, buffer 26, multiplexer 31, coded signal quantity control means 41, coded signal quantity distribution input means 51, line capacity monitoring means 61, and line capacity changing means 62.

The 64th embodiment operates in the same way as the 32nd embodiment, except coded signal quantity control means 41, line capacity monitoring means 61, and line capacity changing means 62.

In addition to the operation as the 32nd embodiment, coded signal quantity control means 41 decides the whole quantity of code for audio and picture signals on the basis of line capacity information 601 outputted from line capacity monitoring means 61.

Coded signal quantity control means 41 also outputs line capacity changing information 404 toward line capacity changing means 62, when line capacity, or in other words, available channel capacity in the transmission line can be increased.

Line capacity monitoring means 61 monitors traffics on the transmission line.

Line capacity changing means 62 changes the line capacity on the basis of line capacity changing information 404, monitors traffics on the transmission line.

A working example of the present invention is a TV phone which is implemented by the 64th embodiment as shown in FIG. 64.

Picture encoder 11 may encode picture signals, according to H.261, H.263 by ITU-T for moving pictures, or MPEG 4 Visual for moving pictures by ISO/IEC.

Audio encoder 24 may encode audio signals, according to G.723.1 by ITU-T, or MPEG 4 Audio, AAC (advanced audio coding), Twin VQ by ISO/IEC.

Multiplexer 31 may multiplexes picture and audio signals, according to H.221,H223 by ITU-T recommendation for multimedia multiplexing.

Coding formats employed by a picture/audio coding apparatus can be notified to transmitter and receiver by using H.245 recommended by ITU-T for multimedia system control.

Picture encoder 11 encodes the inputted picture signal on the basis of generated code quantity information 106.

Coded picture signal 101 outputted from picture encoder 11 is stored in buffer 12.

Buffer 12 outputs the stored picture code as coded picture signal 102 toward multiplexer 31.

Picture quality determination means 13 receives picture quality information104 from picture encoder 11 in order to calculates a fluctuation of picture quality and to determine degradation or improvement of picture quality.

Here, picture quality information may be, for example, signal to noise ration of picture signal.

After determining the picture quality in picture quality determination means, picture quality information 104 as a result of determination is outputted toward code quantity control means 105.

Rate control means 14 decides, on the basis of data remainder information 103 outputted from buffer 12 and coded picture signal quantity information 401 outputted from coded signal quantity control means 41, the quantity of code to be generated by picture encoder 11 and outputs generated code quantity information 106 toward picture encoder 11.

Audio detection means 21 outputs, on the basis of inputted audio signal, audio presence information 205 toward coded signal quantity control means 41.

For example, audio detection means 21 determines presence or absence of audio signal on the basis of signal power and or frequency spectrum.

Audio detection means also outputs audio signal 201 toward audio determination means 22.

Audio determination means 22 determines the kind of audio signal on the basis of inputted audio signal 201, and then outputs audio characteristics information 206 toward coded signal quantity control means 41.

For example, The inputted audio signal is determined to be human voice or music by utilizing general characters such as a fact that the sounds of strings and percussions containing characteristic fundamental and overtone components continue for more than a certain period of time.

Audio determination means 22 also outputs the inputted audio signal toward sampling frequency conversion means.

Sampling frequency conversion means 23 converts the sampling frequency of inputted audio signal 202 on the basis of sampling frequency information 403 outputted from coded signal quantity control means 41.

For example, when the sampling frequency of the inputted audio signal is 20 kHz, the 20 kHz sampling frequency is converted to the new frequency used in the audio encoding system such as 18 kHz in G.723.1, or 8 to 20 kHz in MPEG 4 Audio.

Audio encoder 24 encodes audio signal 203, according to the format and rate on the basis of coded audio signal quantity information 402 outputted from coded signal quantity control means 41. The outputted coded audio signal 204 is fed to buffer 26.

Audio quality determination means 25 receives audio quality information 207 from audio encoder 24 in order to calculate a fluctuation of audio quality and to determine degradation or improvement of audio quality.

For example, audio quality information may be signal to noise ratio, wave form distortion, or spectrum distortion.

Audio quality information 208 as the determination result is outputted toward coded signal quantity control means 41.

Buffer 26 outputs the stored audio code as coded audio signal 209 toward multiplexer 31.

Code quantity distribution information input means 51 outputs the inputted information as coded signal quantity distribution information 501 toward coded signal quantity control means 41.

Coded signal quantity distribution input means 51st inputted information as code distribution information 501 toward coded signal quantity control means 41.

The distribution is fixed concretely, according to audio primacy or picture primacy.

Line capacity monitoring means 61 monitors the traffic on the transmission line, and outputs line capacity information 601 toward coded signal quantity control means 41.

For example, line capacity information 601 may be the kind of communication channel, or channel capacity in the transmission line.

Line capacity changing means 62 changes the line capacity on the basis of line capacity changing information 404.

For example, when 64 kbit/sec transmission line is used in ISDN, the line capacity is changed on the basis of such information as 64 kbit/sec, or ISDN as line capacity changing information 404.

The inputs of code quantity control means are picture quality information 105, coded signal quantity distribution information 501, audio presence information 205, audio characteristics information 206, audio quality information 208, and line capacity information 601. On the basis of these inputs, coded signal quantity control means 41 outputs coded picture signal quantity information 401, coded audio signal quantity information 402, sampling frequency information 403, and line capacity changing information 404, in order to decide the format and rate for coding and to distribute the available quantity of codes to picture and audio signals.

As picture quality information 105 notifies of fluctuation or degradation of picture quality, the quantity for the picture signal is increased, when the picture quality is degraded in order to improve the picture quality. In this case, the code quantity for audio signal is decreased by changing the format and rate of audio coding.

On the other hand, when picture quality is good, the picture code quantity is decreased in order to allocate the code quantity for the audio signal. For example, 12 kbit/sec in MPEG 4 Audio may be changed to 4 kbit/sec in MPEG 4 Audio, when the picture quality becomes degraded.

Likewise, 12 kbit/sec in MPEG 4 Audio may be changed to 4 kbit/sec in MPEG 4 Audio in order to stabilize the picture quality, when the picture quality becomes fluctuated.

As audio quality information 208 notifies of fluctuation or degradation of audio quality, the quantity for the audio signal is increased, when the audio quality is degraded in order to improve the audio quality.

On the other hand, when audio quality is good, the audio code quantity is decreased to reallocate the code quantity for the picture signal.

For example, 4 kbit/sec in MPEG 4 Audio may be changed to 12 kbit/sec in MPEG 4 Audio, when the audio quality becomes degraded.

Thus, picture and audio qualities are controlled as a whole by utilizing both picture quality information 105 and audio quality information 208.

Audio characteristics information 206 notifies of the kind of the audio signal in order to decide a format and rate of coding suitable for the kind of audio signal.

For example, human voices may be coded by 8 kbit/sec in MPEG Audio, 6.3 kbit/sec in G. 723.1, or 32 kbit/sec in MPEG Audio, while music signals may be coded by coding system such as AAC using 32 kbit/sec.

Line capacity information notifies of situations in the transmission line in order to decide the whole quantity of code for picture and audio signals.

For example, when ISDN, or PSTN is used, the whole quantity of code is decided on the basis of line capacity information 601 as such.

Further, when the transmission line has a plurality of lines with various fixed rate capacities, the whole quantity of code is decided on the basis of line capacity information 601 as such.

For example, when both the picture quality and the audio quality are unsatisfactory under a single B channel of 64 kbit/secin ISDN, one more B channel may be added to transmit under 128 kbit/sec information channel.

Coded signal quantity control means 41 receives coded signal quantity distribution information 501 which notifies of such information as a format and rate for audio signal coding, a distribution of code for audio and picture signals.

Audio presence information 205 which notifies of presence or absence of audio signal. Therefore, when there is no audio signal, the calculation procedures in sampling frequency conversion means 23 and audio encoder 24 are stopped according to the notification, and the code quantity which is once allocated to the audio signal is re-allocated to the picture code.

Figure 65:
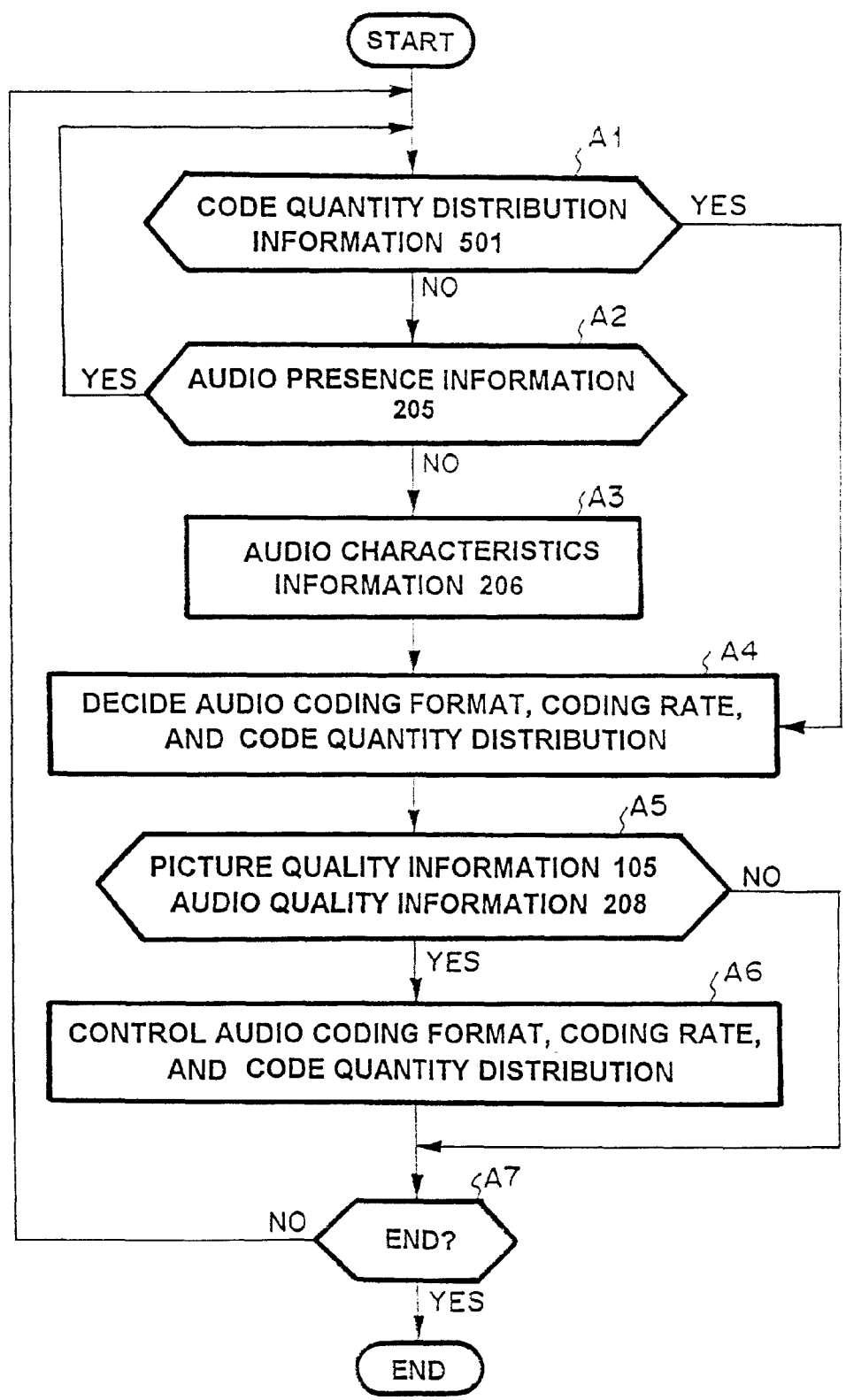
FIG. 65 is a flow chart for explaining the operation of code quantity control means included in the picture/audio coding apparatus of the present invention.
Figure 66:
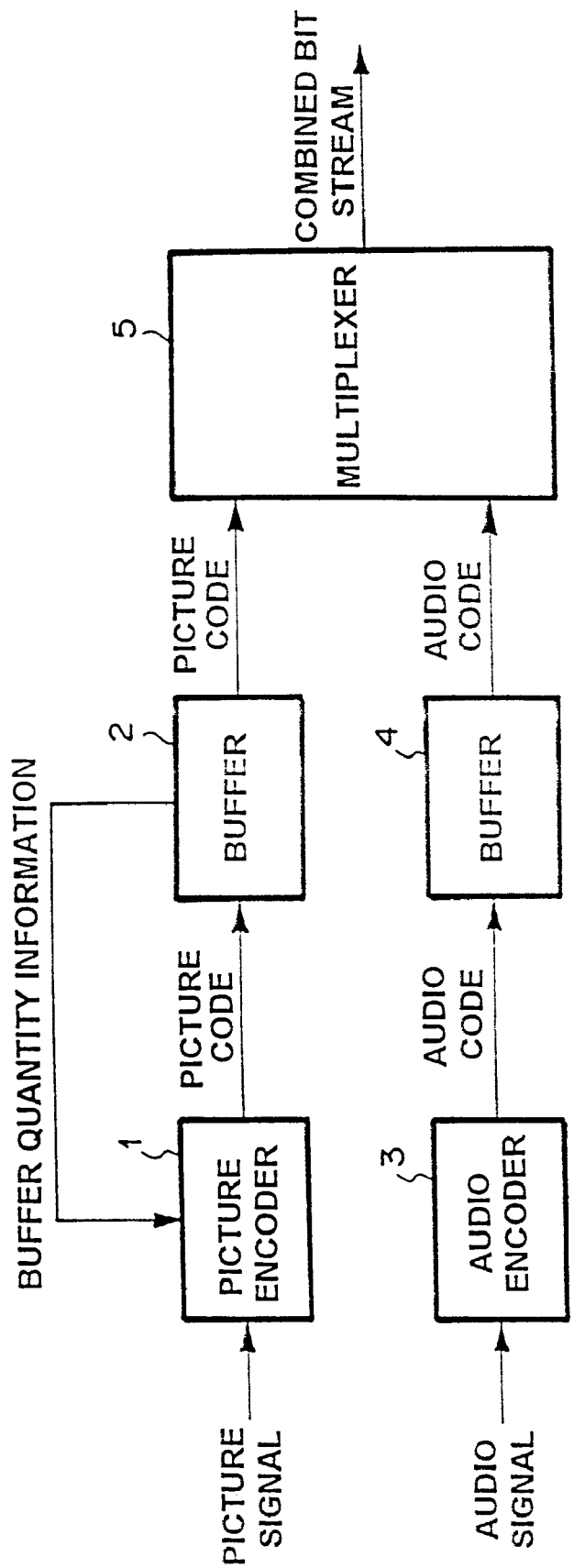
FIG. 66 is a block diagram of an example of an encoder of a conventional picture/audio processing apparatus.
Figure 67:
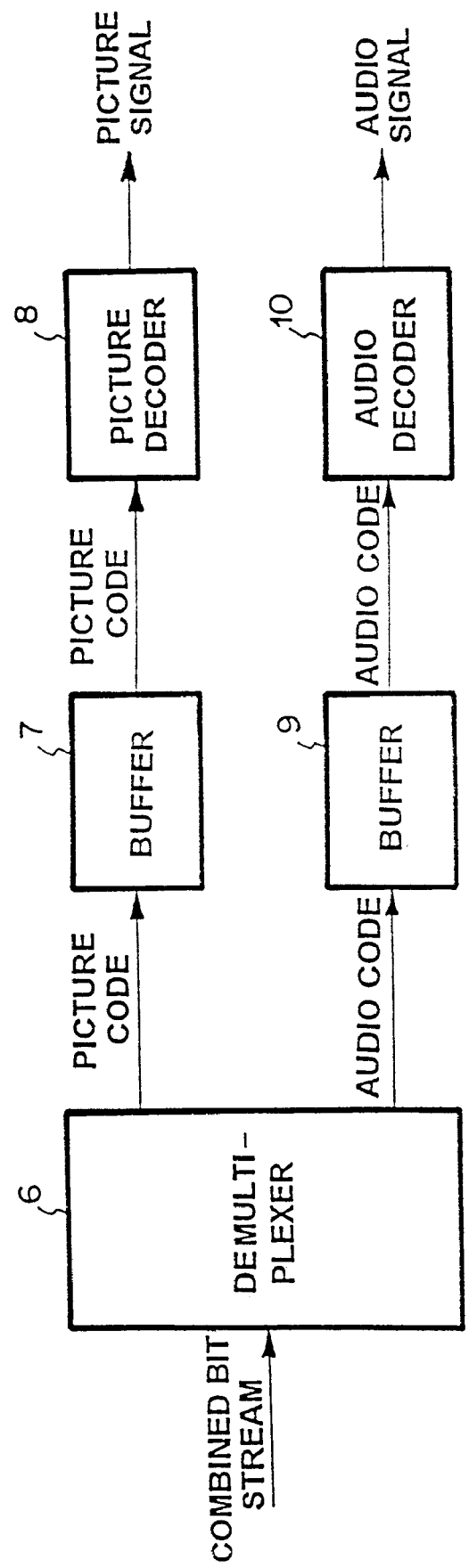
FIG. 67 is a block diagram of an example of a decoder of a conventional picture/audio processing apparatus.

A flow chart for explaining the operation of coded signal quantity control means 41 is shown in FIG. 65.

Step A1 is a branching step according to coded signal quantity distribution information 501.

When code distribution information is inputted at step A1, step A4 is selected.

When code distribution information is not inputted at step A1, step A2 is selected.

When audio presence information indicates that audio signal is absent at step A2, step A1 is selected.

Then, coded picture signal quantity information 401, coded audio signal quantity information 402 and sampling frequency information 403 are outputted in order to distribute the code quantity which has been assigned to audio code newly to picture code.

On the other hand, when audio presence information indicates that audio signal is present at step A2, step A3 is selected.

At step A3, audio characteristics information 206 is read out, then step A4 is selected.

At step A4, when coded signal quantity distribution information 501 exists, a code distribution for picture and audio signals, a format and rate for audio coding are decided on the basis of coded signal quantity distribution information 501.

On the other hand, at step A4, when coded signal quantity distribution information 501 is not inputted, a code distribution for picture and audio signals, a format and rate for audio coding are decided on the basis of audio characteristics information 206.

After the decision of a code distribution for picture and audio signals, a format and rate for audio coding, coded picture signal quantity information 401, coded audio signal quantity information 402 and sampling frequency information 403 are outputted in order to notify of a code distribution for picture and audio signals and a format and rate for audio coding.

Then, after such notification, step A5 is selected. When fluctuations are recognized on the basis of picture quality information 105 and audio quality information 208 at step A5, A6 is selected.

On the contrary such fluctuations are not recognized at step A5, step A7 is selected. Here, concerning the fluctuations, the audio quality is apt to fluctuate more sensitively than the picture quality, under the same variation of codes.

This is because the coding rate for the audio signal is lower in general than that for the picture signal. Further, this is because human auditory sensitivity is keen than the visual sensitivity.

Therefore, the audio quality is carefully controlled, when picture and audio qualities are controlled simultaneously. In other words, efforts are made so as not to degrade the audio quality.

When the picture quality is mainly taken into account, the picture quality can be controlled by coded signal quantity distribution input means 51.

At step A6, the distribution of code for picture and audio signals and the format and rate of audio coding are adjusted on the basis of picture quality information 105 and audio quality information 208. Then, coded picture signal quantity information 401, coded audio signal quantity information 402 and sampling frequency information 403 are outputted in order to notify of a code distribution for picture and audio signals and a format and rate for audio coding. After such notification, step A7 is selected to complete the whole procedure, except returning to step A1.

What is claimed is:

1. A coding apparatus which comprises:
    a picture encoder for compressing and coding a picture signal;
    a rate control means for storing said picture signal coded by said picture encoder and for controlling a quantity of code of said picture signal;
    a frequency conversion means for converting a sampling frequency of an audio signal;
    an audio encoder for compressing and coding said audio signal of which sampling frequency is converted by said frequency conversion means;
    a code quantity control means for executing a distribution of a quantity of code to said picture signal coded by said picture encoder and said audio signal coded by said audio encoder, said code quantity control means executing said distribution on the basis of a quality of said picture signal; and
    a multiplexer for multiplexing said picture signal coded by said picture encoder and said audio signal coded by said audio encoder,
    wherein said code quantity control means outputs a result of said distribution toward said rate control means, said frequency conversion means and said audio encoder.

2. The coding apparatus according to claim 1, which further comprises a audio determination means for determining a characteristic of said audio signal, wherein said code quantity control means executes said distribution on the basis of said characteristic.

3. The coding apparatus according to claim 1, which further comprises a audio detection means for determining presence or absence of said audio signal, wherein said code quantity control means executes said distribution on the basis of said presence or absence.

4. The coding apparatus according to claim 2, which further comprises a audio detection means for determining presence or absence of said audio signal, wherein said code quantity control means executes said distribution on the basis of said presence or absence.

5. The coding apparatus according to claim 1, which further comprises a picture quality determination means for determining said quality of said picture signal coded by said picture encoder.

6. The coding apparatus according to claim 2, which further comprises a picture quality determination means for determining said quality of said picture signal coded by said picture encoder.

7. The coding apparatus according to claim 3, which further comprises a picture quality determination means for determining said quality of said picture signal coded by said picture encoder.

8. The coding apparatus according to claim 4, which further comprises a picture quality determination means for determining said quality of said picture signal coded by said picture encoder.

9. The coding apparatus according to claim 1, which further comprises an audio quality determination means for determining a quality of said audio signal coded by said audio encoder, wherein said code quantity control means executes said distribution on the basis of said quality of said audio signal.

10. The coding apparatus according to claim 2, which further comprises an audio quality determination means for determining a quality of said audio signal coded by said audio encoder, wherein said code quantity control means executes said distribution on the basis of said quality of said audio signal.

11. The coding apparatus according to claim 3, which further comprises an audio quality determination means for determining a quality of said audio signal coded by said audio encoder, wherein said code quantity control means executes said distribution on the basis of said quality of said audio signal.

12. The coding apparatus according to claim 4, which further comprises an audio quality determination means for determining a quality of said audio signal coded by said audio encoder, wherein said code quantity control means executes said distribution on the basis of said quality of said audio signal.

13. The coding apparatus according to claim 5, which further comprises an audio quality determination means for determining a quality of said audio signal coded by said audio encoder, wherein said code quantity control means executes said distribution on the basis of said quality of said audio signal.

14. The coding apparatus according to claim 6, which further comprises an audio quality determination means for determining a quality of said audio signal coded by said audio encoder, wherein said code quantity control means executes said distribution on the basis of said quality of said audio signal.

15. The coding apparatus according to claim 7, which further comprises an audio quality determination means for determining a quality of said audio signal coded by said audio encoder, wherein said code quantity control means executes said distribution on the basis of said quality of said audio signal.

16. The coding apparatus according to claim 8, which further comprises an audio quality determination means for determining a quality of said audio signal coded by said audio encoder, wherein said code quantity control means executes said distribution on the basis of said quality of said audio signal.

17. The coding apparatus according to claim 1, which further comprises a code quantity distribution input means for inputting information of said distribution, wherein said code quantity control means executes said distribution on the basis of said information.

18. The coding apparatus according to claim 2, which further comprises a code quantity distribution input means for inputting information of said distribution, wherein said code quantity control means executes said distribution on the basis of said information.

19. The coding apparatus according to claim 3, which further comprises a code quantity distribution input means for inputting information of said distribution, wherein said code quantity control means executes said distribution on the basis of said information.

20. The coding apparatus according to claim 4, which further comprises a code quantity distribution input means for inputting information of said distribution, wherein said code quantity control means executes said distribution on the basis of said information.

21. The coding apparatus according to claim 5, which further comprises a code quantity distribution input means for inputting information of said distribution, wherein said code quantity control means executes said distribution on the basis of said information.

22. The coding apparatus according to claim 6, which further comprises a code quantity distribution input means for inputting information of said distribution, wherein said code quantity control means executes said distribution on the basis of said information.

23. The coding apparatus according to claim 7, which further comprises a code quantity distribution input means for inputting information of said distribution, wherein said code quantity control means executes said distribution on the basis of said information.

24. The coding apparatus according to claim 8, which further comprises a code quantity distribution input means for inputting information of said distribution, wherein said code quantity control means executes said distribution on the basis of said information.

25. The coding apparatus according to claim 9, which further comprises a code quantity distribution input means for inputting information of said distribution, wherein said code quantity control means executes said distribution on the basis of said information.

26. The coding apparatus according to claim 10, which further comprises a code quantity distribution input means for inputting information of said distribution, wherein said code quantity control means executes said distribution on the basis of said information.

27. The coding apparatus according to claim 11, which further comprises a code quantity distribution input means for inputting information of said distribution, wherein said code quantity control means executes said distribution on the basis of said information.

28. The coding apparatus according to claim 12, which further comprises a code quantity distribution input means for inputting information of said distribution, wherein said code quantity control means executes said distribution on the basis of said information.

29. The coding apparatus according to claim 13, which further comprises a code quantity distribution input means for inputting information of said distribution, wherein said code quantity control means executes said distribution on the basis of said information.

30. The coding apparatus according to claim 14, which further comprises a code quantity distribution input means for inputting information of said distribution, wherein said code quantity control means executes said distribution on the basis of said information.

31. The coding apparatus according to claim 15, which further comprises a code quantity distribution input means for inputting information of said distribution, wherein said code quantity control means executes said distribution on the basis of said information.

32. The coding apparatus according to claim 16, which further comprises a code quantity distribution input means for inputting information of said distribution, wherein said code quantity control means executes said distribution on the basis of said information.

33. The coding apparatus according to claim 1, which further comprises a line capacity monitoring means for monitoring a capacity of transmission channels, and a line capacity changing means for changing said capacity, wherein:
   said code quantity control means executes said distribution on the basis of a result of said monitoring, and outputs, toward said line capacity changing means, information of one or more prescribed capacities of transmission channels to be newly selected; and
   said line capacity changing means changes said capacity on the basis of said information of one or more prescribed capacities.

34. The coding apparatus according to claim 2, which further comprises a line capacity monitoring means for monitoring a capacity of transmission channels, and a line capacity changing means for changing said capacity, wherein:
   said code quantity control means executes said distribution on the basis of a result of said monitoring, and outputs, toward said line capacity changing means, information of one or more prescribed capacities of transmission channels to be newly selected; and
   said line capacity changing means changes said capacity on the basis of said information of one or more prescribed capacities.

35. The coding apparatus according to claim 3, which further comprises a line capacity monitoring means for monitoring a capacity of transmission channels, and a line capacity changing means for changing said capacity, wherein:
   said code quantity control means executes said distribution on the basis of a result of said monitoring, and outputs, toward said line capacity changing means, information of one or more prescribed capacities of transmission channels to be newly selected; and
   said line capacity changing means changes said capacity on the basis of said information of one or more prescribed capacities.

36. The coding apparatus according to claim 4, which further comprises a line capacity monitoring means for monitoring a capacity of transmission channels, and a line capacity changing means for changing said capacity, wherein:
   said code quantity control means executes said distribution on the basis of a result of said monitoring, and outputs, toward said line capacity changing means, information of one or more prescribed capacities of transmission channels to be newly selected; and
   said line capacity changing means changes said capacity on the basis of said information of one or more prescribed capacities.

37. The coding apparatus according to claim 5, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

38. The coding apparatus according to claim 6, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

39. The coding apparatus according to claim 7, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

40. The coding apparatus according to claim 8, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

41. The coding apparatus according to claim 9, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

42. The coding apparatus according to claim 10, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

43. The coding apparatus according to claim 11, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected: and said line capacity changing means changes said capacity on the basis of said information of one or more prescribed capacities.

44. The coding apparatus according to claim 12, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

45. The coding apparatus according to claim 13, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

46. The coding apparatus according to claim 14, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

47. The coding apparatus according to claim 15, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

48. The coding apparatus according to claim 16, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

49. The coding apparatus according to claim 17, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

50. The coding apparatus according to claim 18, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

51. The coding apparatus according to claim 19, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

52. The coding apparatus according to claim 20, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

53. The coding apparatus according to claim 21, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

54. The coding apparatus according to claim 22, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

55. The coding apparatus according to claim 23, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

56. The coding apparatus according to claim 24, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

57. The coding apparatus according to claim 25, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

58. The coding apparatus according to claim 26, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

59. The coding apparatus according to claim 27, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

60. The coding apparatus according to claim 28, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected: and said line capacity changing means changes said capacity on the basis of said information of one or more prescribed capacities.

61. The coding apparatus according to claim 29, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

62. The coding apparatus according to claim 30, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

63. The coding apparatus according to claim 31, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

64. The coding apparatus according to claim 32, which further comprises a line capacity monitoring means for monitoring a capacity of transmission channels, and a line capacity changing means for changing said capacity, wherein:

said code quantity control means executes said distribution on the basis of a result of said monitoring, and outputs, toward said line capacity changing means, information of one or more prescribed capacities of transmission channels to be newly selected; and said line capacity changing means changes said capacity on the basis of said information of one or more prescribed capacities.

* * * * *

UNITED STATES PATENT AND TRADEMARK OFFICE
CERTIFICATE OF CORRECTION

PATENT NO. : 6,741,649 B1
DATED : May 25, 2004
INVENTOR(S) : Kiyoshi Ishiyama et al.

It is certified that error appears in the above-identified patent and that said Letters Patent is hereby corrected as shown below:

<u>Title page,</u>
Item [30], Foreign Application Priority Data, should read
-- February 10, 1999   (JP) ……………………. 11-032789 --

Signed and Sealed this

Third Day of August, 2004

JON W. DUDAS
*Acting Director of the United States Patent and Trademark Office*